US012717059B2

(12) United States Patent
Maejima et al.

(10) Patent No.: US 12,717,059 B2
(45) Date of Patent: Aug. 25, 2026

(54) ESTIMATION DEVICE, ESTIMATION METHOD AND ESTIMATION PROGRAM

(71) Applicant: NTT, Inc., Tokyo (JP)

(72) Inventors: Sotaro Maejima, Tokyo (JP); Keisuke Tsunoda, Tokyo (JP); Midori Kodama, Tokyo (JP); Naoki Arai, Tokyo (JP); Kazuaki Obana, Tokyo (JP)

(73) Assignee: NTT, Inc., Tokyo (JP)

( * ) Notice: Subject to any disclaimer, the term of this patent is extended or adjusted under 35 U.S.C. 154(b) by 420 days.

(21) Appl. No.: 18/278,818

(22) PCT Filed: Feb. 25, 2021

(86) PCT No.: PCT/JP2021/007208
§ 371 (c)(1),
(2) Date: Aug. 24, 2023

(87) PCT Pub. No.: WO2022/180750
PCT Pub. Date: Sep. 1, 2022

(65) Prior Publication Data

US 2024/0125968 A1 Apr. 18, 2024

(51) Int. Cl.
*G01V 3/38* (2006.01)
*G06N 20/00* (2019.01)

(52) U.S. Cl.
CPC ............... *G01V 3/38* (2013.01); *G06N 20/00* (2019.01)

(58) Field of Classification Search
CPC ................................ G01V 3/38; G06N 20/20
See application file for complete search history.

(56) References Cited

U.S. PATENT DOCUMENTS 11,848,091 B2 * 12/2023 Uno ....................... G16H 20/30

FOREIGN PATENT DOCUMENTS

JP 2020106359 A 7/2020

OTHER PUBLICATIONS

Irfan et al., "A Simple Foot Plantar Pressure Measurement Platform System Using Force-Sensing Resistors", Aug. 2020, MDPI Publication, pp. 1-22 (Year: 2020).*
Matsueda et al., "People Count System Using Multi-Sensing Application", 1997, Mastsushita Corporation Publication, pp. 1291-1294 (Year: 1997).*
Sivakumar, , "Crowd Safety: a Real Time System for Counting People", Jan. 2011, IJOITCE Publication, vol. 1, pp. 6-11 (Year: 2011).*
Wu et al., "Inhabitants Tracking System in a Cluttered Home Environment Via Floor Load Sensors", Jan. 2008, IEEE Publication , vol. 5, No. 1, pp. 10-20 (Year: 2008).*
Konishi et al. (2019) "Tracking Multiple Pedestrians Using the Network of Human Detectors", IEICE Technical Report vol. 118, No. 468, ASN2018-112, pp. 203-208, Mar. 2019, with English Abstract.

(Continued)

*Primary Examiner* — Elias Desta

(57) ABSTRACT

An estimation device collects sensor data representing a change in a load along a time series as a change in a voltage value from a sensor that generates a voltage when a load applied to an area changes, and estimates a matter related to a measurement target passing through a predetermined area by using sensor data collected from the sensor installed in the predetermined area.

10 Claims, 72 Drawing Sheets

(56) References Cited

OTHER PUBLICATIONS

Ke et al. (2017) "LightBGM: A Highly Efficient Gradient Boosting Decision Tree" In Advances in Neural Information Processing Systems, pp. 3149-3157.
LeCun et al. (1998) "Gradiend-Based Learning Applied to Document Recognition" Proc. of the IEEE, pp. 2278-2324.

* cited by examiner

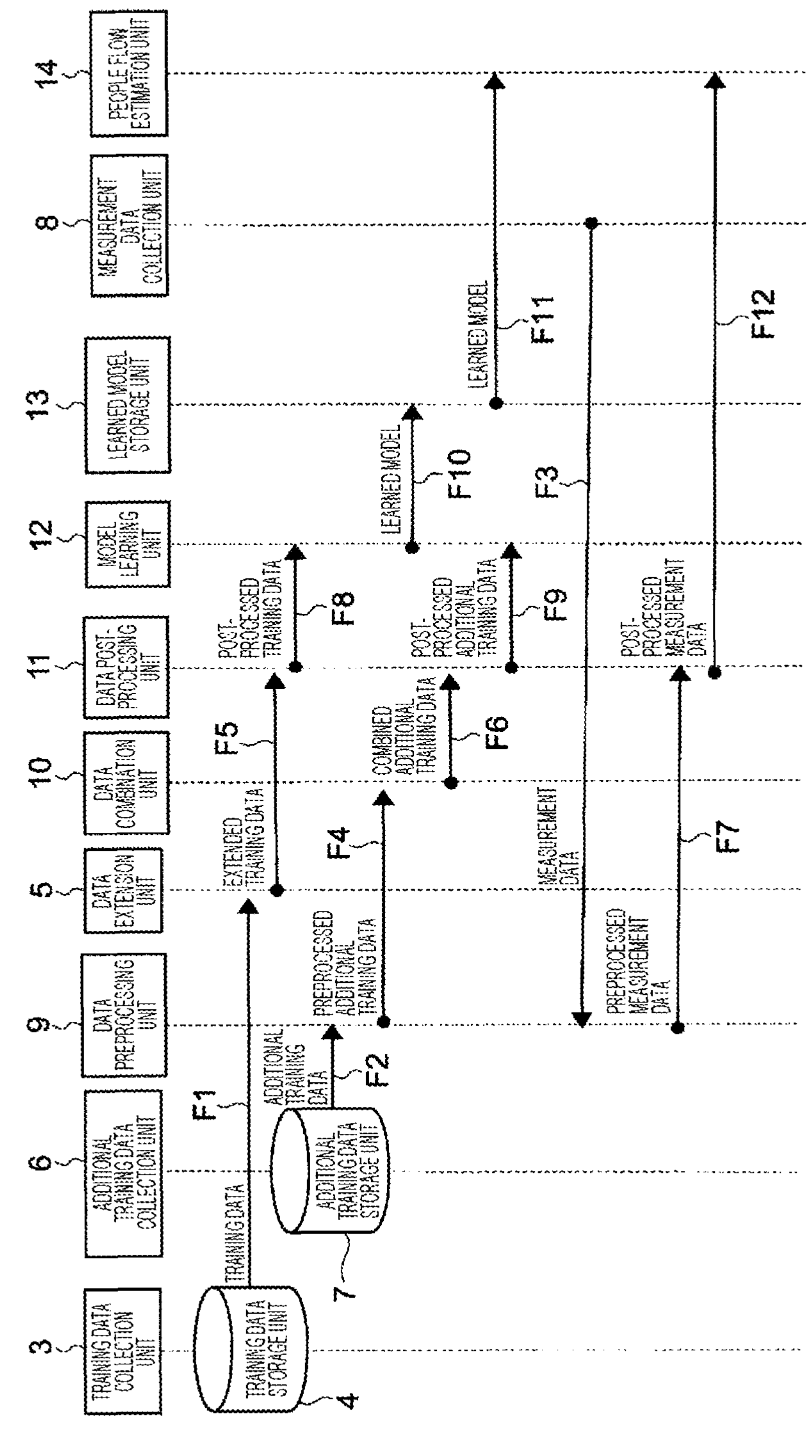
FIG.2
3
TRAINING DATA COLLECTION UNIT
4
TRAINING DATA STORAGE UNIT
6
ADDITIONAL TRAINING DATA COLLECTION UNIT
7
ADDITIONAL TRAINING DATA STORAGE UNIT
9
DATA PREPROCESSING UNIT
5
DATA EXTENSION UNIT
10
DATA COMBINATION UNIT
11
DATA POST-PROCESSING UNIT
12
MODEL LEARNING UNIT
13
LEARNED MODEL STORAGE UNIT
8
MEASUREMENT DATA COLLECTION UNIT
14
PEOPLE FLOW ESTIMATION UNIT
TRAINING DATA
F1
ADDITIONAL TRAINING DATA
F2
PREPROCESSED ADDITIONAL TRAINING DATA
F4
EXTENDED TRAINING DATA
F5
COMBINED ADDITIONAL TRAINING DATA
F6
POST-PROCESSED TRAINING DATA
F8
POST-PROCESSED ADDITIONAL TRAINING DATA
F9
LEARNED MODEL
F10
LEARNED MODEL
F11
MEASUREMENT DATA
F3
PREPROCESSED MEASUREMENT DATA
F7
POST-PROCESSED MEASUREMENT DATA
F12

FIG.3

| INDEX j | AMPLITUDE V | WAVEFORM LABEL b | CORRECT NUMBER OF PEOPLE |
|---|---|---|---|
| 1 | 0.0 | 1 | 2 |
| 2 | -1.0 | | |
| ⋮ | ⋮ | | |
| 3000 | -0.001 | | |
| 3001 | -0.002 | 2 | 3 |
| ⋮ | ⋮ | | |
| ⋮ | | | |

FIG.4

| INDEX j | TIME t | AMPLITUDE V |
|---|---|---|
| 1 | 2020-01-02 09:00:0.000 | 0.0 |
| 2 | 2020-01-02 09:00:0.001 | 0.19 |
| ⋮ | ⋮ | ⋮ |
| J | 2020-01-02 18:00:0.000 | 0.0 |

FIG.5

| DATA NUMBER k | TIME t | CORRECT NUMBER OF PEOPLE |
|---|---|---|
| 1 | 2020-01-02 09:00:01.000 | 2 |
| 2 | 2020-01-02 09:00:20.000 | 1 |
| ⋮ | ⋮ | ⋮ |
| K | 2020-01-02 17:59:55.000 | 3 |

FIG.6

| INDEX j | TIME t | AMPLITUDE V |
|---|---|---|
| 1 | 2020-01-03 09:00:0.000 | 0.0 |
| 2 | 2020-01-03 09:00:0.001 | -2.2 |
| ⋮ | ⋮ | ⋮ |
| $J_1$ | 2020-01-03 18:00:0.000 | 0.1 |

FIG.7

| INDEX j | TIME t | AMPLITUDE V | WAVEFORM LABEL b |
|---|---|---|---|
| 2 | 2020-01-02 09:00:0.001 | -0.29 | 1 |
| ⋮ | ⋮ | ⋮ | |
| 1000 | 2020-01-02 09:01:0.00 | 0.002 | |
| ⋮ | ⋮ | ⋮ | ⋮ |
| Ja-20000 | 2020-01-02 17:59:50.00 | 0.1 | Ba |
| ⋮ | ⋮ | ⋮ | |
| Ja | 2020-01-02 18:00:0.000 | 0.0 | |

FIG.8

| INDEX j | AMPLITUDE V | WAVEFORM LABEL b | CORRECT NUMBER OF PEOPLE |
|---|---|---|---|
| 2 | -0.29 | 1 | 2 |
| ⋮ | ⋮ | | |
| 1000 | 0.002 | | |
| ⋮ | ⋮ | ⋮ | ⋮ |
| Ja-20000 | 0.1 | Ba | 3 |
| ⋮ | ⋮ | | |
| Ja | 0.0 | | |

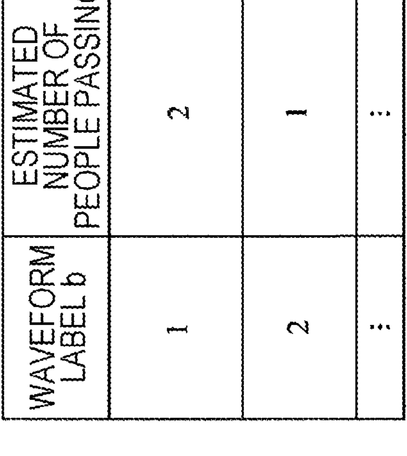
| WAVEFORM LABEL b | ESTIMATED NUMBER OF PEOPLE PASSING |
| --- | --- |
| 1 | 2 |
| 2 | 1 |
| ⋮ | ⋮ |
FIG.9
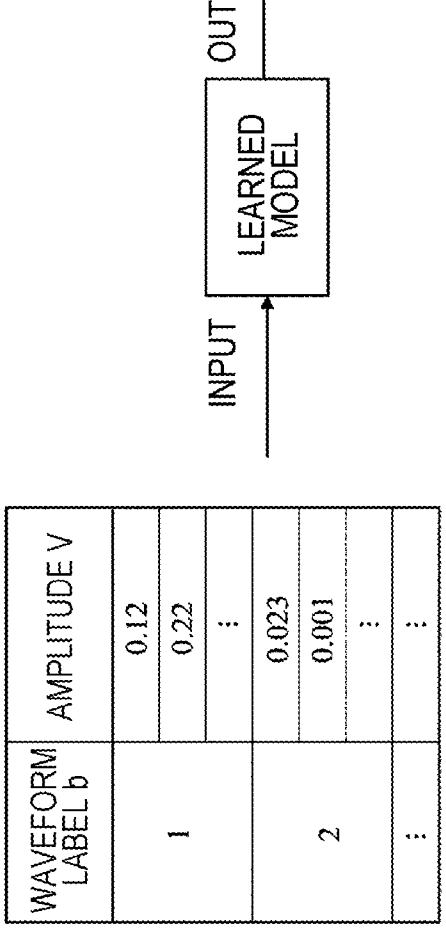
| WAVEFORM LABEL b | AMPLITUDE V |
| --- | --- |
| 1 | 0.12 |
| | 0.22 |
| | ⋮ |
| 2 | 0.023 |
| | 0.001 |
| | ⋮ |
| ⋮ | ⋮ |

| INDEX j | TIME t | AMPLITUDE V |
|---|---|---|
| 1 | 2020-01-02 09:00:0.000 | 0.0 |
| 2 | 2020-01-02 09:00:0.001 | 0.19 |
| ⋮ | ⋮ | ⋮ |
| J | 2020-01-02 18:00:0.000 | 0.0 |

| INDEX j | TIME t | AMPLITUDE V | ON | OFF |
|---|---|---|---|---|
| 1 | 2020-01-02 09:00:0.000 | 0.0 | – | – |
| 2 | 2020-01-02 09:00:0.001 | 0.09 | 1 | – |
| ⋮ | ⋮ | ⋮ | ⋮ | ⋮ |
| 10 | 2020-01-02 09:02:0.00 | 0.005 | – | 1 |
| ⋮ | ⋮ | ⋮ | ⋮ | ⋮ |
| J | 2020-01-02 18:10:0.000 | 0.0 | – | – |

FIG.22

| INDEX j | TIME t | AMPLITUDE V | ON | OFF |
|---|---|---|---|---|
| ⋮ | ⋮ | ⋮ | ⋮ | ⋮ |
| j1n | 2020-01-02 10:10:37.000 | -0.02 | n | — |
| ⋮ | ⋮ | ⋮ | ⋮ | ⋮ |
| j2n | 2020-01-02 10:10:38.00 | 0.01 | — | n |
| ⋮ | ⋮ | ⋮ | ⋮ | ⋮ |

FIG.24

| INDEX j | TIME t | AMPLITUDE V | ON | OFF |
|---|---|---|---|---|
| ⋮ | ⋮ | ⋮ | ⋮ | ⋮ |
| j1n | 2020-01-02 10:10:37.000 | -0.02 | n | — |
| ⋮ | ⋮ | ⋮ | ⋮ | ⋮ |
| j2n | 2020-01-02 10:10:39.00 | 0.001 | — | n |
| ⋮ | ⋮ | ⋮ | ⋮ | ⋮ |

| INDEX j | TIME t | AMPLITUDE V | ON | OFF | EXTREME LABEL r |
|---|---|---|---|---|---|
| ⋮ | ⋮ | ⋮ | ⋮ | ⋮ | ⋮ |
| j1n | 2020-01-02 10:10:37.000 | 0.02 | n | — | 0 |
| ⋮ | ⋮ | ⋮ | ⋮ | ⋮ | ⋮ |
| j2n | 2020-01-02 10:10:39.00 | 0.025 | — | n | 0 |
| ⋮ | ⋮ | ⋮ | ⋮ | ⋮ | ⋮ |
| j3 | 2020-01-02 10:10:39.20 | 0.03 | — | — | 1 |
| ⋮ | ⋮ | ⋮ | ⋮ | ⋮ | ⋮ |
| j4 | 2020-01-02 10:10:39.40 | 0.025 | — | — | 0 |
| ⋮ | ⋮ | ⋮ | ⋮ | ⋮ | ⋮ |

| INDEX j | TIME t | AMPLITUDE V | ON | OFF | MAXIMUM MINIMUM LABEL r |
|---|---|---|---|---|---|
| ⋮ | ⋮ | ⋮ | ⋮ | ⋮ | ⋮ |
| j1 | 2020-01-02 10:10:37.000 | 0.02 | n | — | 0 |
| ⋮ | ⋮ | ⋮ | ⋮ | ⋮ | ⋮ |
| j2 | 2020-01-02 10:10:39.00 | 0.025 | — | — | 0 |
| ⋮ | ⋮ | ⋮ | ⋮ | ⋮ | ⋮ |
| j3 | 2020-01-02 10:10:39.20 | 0.03 | — | — | 1 |
| ⋮ | ⋮ | ⋮ | ⋮ | ⋮ | ⋮ |
| j4(=j2n) | 2020-01-02 10:10:39.40 | 0.025 | — | n | 0 |
| ⋮ | ⋮ | ⋮ | ⋮ | ⋮ | ⋮ |

FIG.32

| INDEX j | TIME t | AMPLITUDE V | ON | OFF |
| --- | --- | --- | --- | --- |
| ⋮ | ⋮ | ⋮ | ⋮ | ⋮ |
| $j1_n$ | 2020-01-02 09:20:37.000 | 0.02 | n | — |
| ⋮ | ⋮ | ⋮ | ⋮ | ⋮ |
| $j2_n$ | 2020-01-02 09:20:39.00 | 0.005 | — | n |
| ⋮ | ⋮ | ⋮ | ⋮ | ⋮ |
| $j1_{n+1}$ | 2020-01-02 09:20:40.00 | 0.15 | n+1 | — |
| ⋮ | ⋮ | ⋮ | ⋮ | ⋮ |
| $j2_{n+1}$ | 2020-01-02 09:20:41.000 | 0.002 | — | n+1 |
| ⋮ | ⋮ | ⋮ | ⋮ | ⋮ |

FIG.34

| INDEX j | TIME t | AMPLITUDE V | ON | OFF |
|---|---|---|---|---|
| ⋮ | ⋮ | ⋮ | ⋮ | ⋮ |
| j1n | 2020-01-02 09:10:41.000 | 0.02 | n | — |
| ⋮ | ⋮ | ⋮ | ⋮ | ⋮ |
| ORIGINAL j2n | 2020-01-02 09:20:39.00 | 0.005 | — | — |
| ⋮ | ⋮ | ⋮ | ⋮ | ⋮ |
| ORIGINAL $j1_{n+1}$ | 2020-01-02 09:20:40.00 | 0.15 | — | — |
| ⋮ | ⋮ | ⋮ | ⋮ | ⋮ |
| $j2_{n+1}$ (NEW j2n) | 2020-01-02 09:20:41.000 | 0.002 | — | n |
| ⋮ | ⋮ | ⋮ | ⋮ | ⋮ |

| INDEX j | TIME t | AMPLITUDE V | ON | OFF |
|---|---|---|---|---|
| 1 | 2020-01-02 09:00:0.000 | 0.0 | — | — |
| 2 | 2020-01-02 09:00:0.001 | -0.29 | 1 | — |
| ⋮ | ⋮ | ⋮ | ⋮ | ⋮ |
| 2000 | 2020-01-02 09:02:0.00 | 0.005 | — | 1 |
| ⋮ | ⋮ | ⋮ | ⋮ | ⋮ |
| J | 2020-01-02 18:00:0.000 | 0.0 | — | — |

FIG.38

| INDEX j | TIME t | AMPLITUDE V | PROVISIONAL WAVEFORM LABEL a |
|---|---|---|---|
| 2 | 2020-01-02 09:00:0.001 | -0.29 | 1 |
| ⋮ | ⋮ | ⋮ | |
| 2000 | 2020-01-02 09:02:0.00 | 0.005 | |
| ⋮ | ⋮ | ⋮ | ⋮ |
| J-6000 | 2020-01-02 17:59:58.00 | 0.15 | Na |
| ⋮ | ⋮ | ⋮ | |
| Ja | 2020-01-02 18:00:0.000 | 0.0 | |

FIG.41

| INDEX j | TIME t | AMPLITUDE V | PROVISIONAL WAVEFORM LABEL a |
|---|---|---|---|
| ⋮ | ⋮ | ⋮ | ⋮ |
| j1a | 2020-01-02 09:30:0.001 | 0.07 | a |
| ⋮ | ⋮ | ⋮ | |
| j2a | 2020-01-02 09:30:0.300 | 0.002 | |
| ⋮ | ⋮ | ⋮ | ⋮ |
| $J1_{Na}$ | 2020-01-02 09:35:18.200 | 0.1 | Na |
| ⋮ | ⋮ | ⋮ | |
| $J2_{Na}$ | 2020-01-02 09:35:23.000 | 0.05 | |

FIG.42

| INDEX j | TIME t | AMPLITUDE V | PROVISIONAL WAVEFORM LABEL a |
|---|---|---|---|
| ⋮ | ⋮ | ⋮ | ⋮ |
| j1 | 2020-01-02 09:30:0.001 | 0.07 | — |
| ⋮ | ⋮ | ⋮ | ⋮ |
| j2 | 2020-01-02 09:30:0.300 | 0.002 | — |
| ⋮ | ⋮ | ⋮ | ⋮ |
| $J1_{Na}$ | 2020-01-02 09:35:18.200 | 0.1 | $Na_1$ |
| ⋮ | ⋮ | ⋮ | |
| $J2_{Na}$ | 2020-01-02 09:35:23.000 | 0.05 | |

FIG.46

| INDEX j | TIME t | AMPLITUDE V | PROVISIONAL WAVEFORM LABEL a |
|---|---|---|---|
| 2 | 2020-01-02 09:00:0.001 | 0.2 | 1 |
| ⋮ | ⋮ | ⋮ | |
| 2000 | 2020-01-02 09:02:0.00 | 0.007 | |
| ⋮ | ⋮ | ⋮ | ⋮ |
| J-6000 | 2020-01-02 17:59:58.00 | 0.17 | $Na_1$ |
| ⋮ | ⋮ | ⋮ | |
| Ja | 2020-01-02 18:00:0.000 | 0.0 | |

FIG.53

| INDEX j | TIME t | AMPLITUDE V | WAVEFORM LABEL b |
|---|---|---|---|
| 2 | 2020-01-02 09:00:0.001 | 0.2 | I |
| ⋮ | ⋮ | ⋮ | |
| 1000 | 2020-01-02 09:01:0.00 | 0.004 | |
| ⋮ | ⋮ | ⋮ | ⋮ |
| J-6000 | 2020-01-02 17:59:58.00 | 0.17 | B |
| ⋮ | ⋮ | ⋮ | |
| $J_B$ | 2020-01-02 18:00:0.000 | 0.0 | |

FIG.55

| INDEX j | TIME t | AMPLITUDE V | WAVEFORM LABEL b |
|---|---|---|---|
| 2 | 2020-01-02 09:00:0.001 | -0.29 | |
| ⋮ | ⋮ | ⋮ | 1 |
| 1000 | 2020-01-02 09:01:0.00 | 0.002 | |
| ⋮ | ⋮ | ⋮ | ⋮ |
| 24000 | 2020-01-02 17:59:54.000 | 0.15 | |
| ⋮ | ⋮ | ⋮ | B |
| $J_B$ | 2020-01-02 18:00:0.000 | 0.0 | |

FIG.57

| INDEX j | TIME t | AMPLITUDE V | WAVEFORM LABEL b |
|---|---|---|---|
| 2 | 2020-01-02 09:00:0.001 | -0.29 | 1 |
| ⋮ | ⋮ | ⋮ | |
| 1000 | 2020-01-02 09:01:0.00 | 0.002 | |
| ⋮ | ⋮ | ⋮ | ⋮ |
| 20000 | 2020-01-02 17:59:50.00 | 0.1 | Ba |
| ⋮ | ⋮ | ⋮ | |
| $J_B$ | 2020-01-02 18:00:0.000 | 0.0 | |

FIG.60

| INDEX j | TIME t | AMPLITUDE V | WAVEFORM LABEL b |
|---|---|---|---|
| 2 | 2020-01-02 09:00:0.001 | -0.29 | 1 |
| ⋮ | ⋮ | ⋮ | |
| 1000 | 2020-01-02 09:01:0.00 | 0.002 | |
| ⋮ | ⋮ | ⋮ | ⋮ |
| J-20000 | 2020-01-02 17:59:50.00 | 0.1 | Ba |
| ⋮ | ⋮ | ⋮ | |
| Ja | 2020-01-02 18:00:0.000 | 0.0 | |

| DATA NUMBER k | TIME t | CORRECT NUMBER OF PEOPLE |
|---|---|---|
| 1 | 2020-01-02 09:00:01.000 | 2 |
| 2 | 2020-01-02 09:00:20.000 | 1 |
| ⋮ | ⋮ | ⋮ |
| K | 2020-01-02 17:59:55.000 | 3 |

| INDEX j | AMPLITUDE V | WAVEFORM LABEL b | CORRECT NUMBER OF PEOPLE |
|---|---|---|---|
| 2 | 0.12 | 1 | 2 |
| 3 | 0.2 | | |
| ⋮ | ⋮ | | |
| 2999 | 0.023 | | |
| 3000 | 0.001 | | |

| INDEX j | AMPLITUDE V | WAVEFORM LABEL b | CORRECT NUMBER OF PEOPLE |
|---|---|---|---|
| 2 | 0.12 | 1 | 2 |
| 4 | 0.22 | | |
| ⋮ | ⋮ | | |
| 2999 | 0.023 | | |
| 3000 | 0.001 | | |

FIG.64

| INDEX j | AMPLITUDE V | WAVEFORM LABEL b | CORRECT NUMBER OF PEOPLE |
|---|---|---|---|
| 2 | 0.12 | 1 | 2 |
| 4 | 0.22 | | |
| ⋮ | ⋮ | | |
| 2999 | 0.023 | | |
| 3000 | 0.001 | | |
| 3001 | 0 | | |
| ⋮ | ⋮ | | |
| 3000+(DL-W1) | 0 | | |

FIG.65

| CORRECT ANSWER LABEL | NUMBER OF PIECES OF DATA | | | ESTIMATED NUMBER BY LABEL | | | | | NUMBER OF PEOPLE ESTIMATION ERROR | | |
|---|---|---|---|---|---|---|---|---|---|---|---|
| | TRUE VALUE (COUNT OF PEOPLE) | NUMBER OF WAVEFORM LABELS (DIVISION BY PREPROCESSING) | ERROR | 1 PERSON | 2 PEOPLE | 3 PEOPLE | 4 PEOPLE | CORRECT ANSWER RATE | TRUE VALUE | ESTIMATED VALUE | ERROR (RATE) |
| 1 PERSON | 422 | 390 | 32(8%) | 357 | 33 | 0 | 0 | 85% | 422 | 423 | 1(%) |
| 2 PEOPLE | 20 | 14 | 6(30%) | 5 | 6 | 2 | 1 | 43% | 40 | 27 | 13(33%) |
| 3 PEOPLE | 7 | 7 | 0(0%) | 0 | 0 | 7 | 0 | 100% | 21 | 21 | 0(0%) |
| 4 PEOPLE | 4 | 4 | 0(0%) | 0 | 0 | 0 | 4 | 100% | 16 | 16 | 0(0%) |

| | TRUE VALUE | NUMBER OF WAVEFORM LABELS | ERROR (RATE) |
|---|---|---|---|
| TOTAL ERROR IN NUMBER OF PIECES OF DATA | 453 | 415 | 38(8%) |

| | TRUE VALUE | ESTIMATED VALUE | ERROR (RATE) |
|---|---|---|---|
| TOTAL ERROR IN NUMBER OF PEOPLE | 499 | 487 | 12(3%) |

FIG.67

| INDEX j | AMPLITUDE V | WAVEFORM LABEL b | CORRECT ANSWER |
|---|---|---|---|
| 1 | 0.0 | 1 | ONE NON-ELDERLY PERSON ONE ELDERLY PERSON |
| 2 | -1.0 | | |
| ⋮ | ⋮ | | |
| 3000 | -0.001 | | |
| 3001 | -0.002 | 2 | TWO ELDERLY PERSONS |
| ⋮ | ⋮ | | |
| ⋮ | | | |

FIG.68

| INDEX j | AMPLITUDE V | WAVEFORM LABEL b | CORRECT ANSWER |
|---|---|---|---|
| 1 | 0.0 | 1 | [1,0,1,0] |
| 2 | -1.2 | | |
| ⋮ | ⋮ | | |
| 3000 | -0.01 | | |
| 3001 | -0.002 | 2 | [0,1,1,0] |
| ⋮ | ⋮ | | |
| ⋮ | | | |

FIG.69

| INDEX j | AMPLITUDE V | WAVEFORM LABEL b | CORRECT ANSWER |
|---|---|---|---|
| 1 | 0.0 | 1 | ONE NON-ELDERLY PERSON / WEIGHT OF GREATER THAN OR EQUAL TO 50kg<br>ONE ELDERLY PERSON / WEIGHT OF LESS THAN OR EQUAL TO 50kg |
| 2 | -1.0 | | |
| ⋮ | ⋮ | | |
| 3000 | -0.001 | | |
| 3001 | -0.002 | 2 | TWO NON-ELDERLY PERSONS / WEIGHT OF GREATER THAN OR EQUAL TO 50kg |
| ⋮ | ⋮ | | |
| | | ⋮ | |

ESTIMATION DEVICE, ESTIMATION METHOD AND ESTIMATION PROGRAM

CROSS-REFERENCE TO RELATED APPLICATIONS

This application is a U.S. 371 Application of International Patent Application No. PCT/JP2021/007208, filed on 25 Feb. 2021, the disclosure of which is hereby incorporated herein by reference in its entirety.

TECHNICAL FIELD

The present invention relates to an estimation device, an estimation method, and an estimation program.

BACKGROUND ART

In recent years, a technology of measuring a flow of people, that is, a technology of measuring a people flow has attracted attention. The technology of measuring a people flow is used for, for example, people flow control for mitigating congestion in an urban area or an event venue, and an application of floor planning based on the number of people staying in each area of a commercial facility.

There are various sensors for measuring a people flow, such as a camera, a laser sensor, and a measurement device using radio waves and magnetism. However, depending on the type of the sensor, there are problems such as invasion of privacy, restriction of an installation location, and that a people flow cannot be measured unless a person to be measured has a designated device corresponding to the sensor in advance.

On the other hand, there is a people flow measurement method by a tread-type sensor that detects a variation in a load applied on a sensor or a physical parameter caused by the load as a voltage waveform. This method has properties superior to those of other sensors used for people flow measurement, such as excellence in privacy protection, no restriction of installation location, and that any person can be detected as long as the person is a pedestrian.

For example, Non Patent Literature 1 is disclosed regarding measurement of a people flow using the tread-type sensor.

[Non Patent Literature 1]

Kyosuke Konishi, Hiroshi Kameda, "Tracking Multiple Pedestrians Using the Network of Human Detectors", IEICE Technical Report vol. 118, no. 468, ASN2018-112, pp. 203-208, March 2019

SUMMARY OF INVENTION

Technical Problem

In a case where only a tread-type sensor is used for measuring a people flow, it is based on threshold determination that "timing when a change in a load reaches a threshold=a person passes", and it is difficult to correctly measure the number of people passing.

For example, in a case where multiple people form lines lengthways and sideways and pass over the tread-type sensor almost simultaneously, it is difficult to correctly measure the number of people passing by threshold determination uniquely set for a change in a load.

Thus, the present disclosure discloses an estimation device, an estimation method, and an estimation program capable of estimating, with higher accuracy, the number of measurement targets passing over a tread-type sensor only by threshold determination even in a case where the tread-type sensor is used for measurement of a moving body including a person.

Solution to Problem

A first aspect of the present disclosure is an estimation device including: a collection unit that collects sensor data representing a change in a load along a time series as a change in a voltage value from a sensor that generates a voltage when a load applied to an area changes; and an estimation unit that estimates a matter related to a measurement target passing through a predetermined area by using sensor data of the sensor, which is installed in the predetermined area on a ground surface in a real space in which the measurement target moves at random timing, the sensor data being collected by the collection unit.

A second aspect of the present disclosure is an estimation device including: a collection unit that collects sensor data representing a change in a load along a time series as a change in a voltage value from a sensor that generates a voltage when a load applied to an area changes, and an estimation unit that estimates a gender of a person passing through a predetermined area by using sensor data of the sensor, which is installed in the predetermined area in a ground surface in a real space in which a measurement target moves at random timing, the sensor data being collected by the collection unit.

A third aspect of the present disclosure is an estimation method in which a computer includes: a collection step of collecting sensor data representing a change in a load along a time series as a change in a voltage value from a sensor that generates a voltage when a load applied to an area changes; and an estimation step of estimating a matter related to a measurement target passing through a predetermined area by using sensor data of the sensor, which is installed in the predetermined area in a ground surface in a real space in which the measurement target moves at random timing, the sensor data being collected in the collection step.

A fourth aspect of the present disclosure is an estimation program causing a computer to execute processing of: collecting sensor data representing a change in a load along a time series as a change in a voltage value from a sensor that generates a voltage when a load applied to an area changes; and estimating a matter related to a measurement target passing through a predetermined area by using sensor data collected from the sensor, which is installed in the predetermined area in a ground surface in a real space in which the measurement target moves at random timing.

Advantageous Effects of Invention

According to the estimation device, the estimation method, and the estimation program of the present disclosure, there is an effect that, even in a case where a tread-type sensor is used for measurement of a moving body including a person, it is possible to more accurately estimate the number of measurement targets passing over the tread-type sensor only by threshold determination.

BRIEF DESCRIPTION OF DRAWINGS

FIG. 2 is a data flow diagram illustrating an example of a flow of data in the estimation device.

FIG. 3 is a diagram illustrating an example of training data.

FIG. 4 is a diagram illustrating an example of voltage data.

FIG. 5 is a diagram illustrating an example of number-of-people-passing data.

FIG. 6 is a diagram illustrating an example of measurement data.

FIG. 7 is a diagram illustrating an example of voltage data included in preprocessed additional training data.

FIG. 8 is a diagram illustrating an example of combined additional training data.

FIG. 9 is a schematic diagram schematically illustrating a flow of estimating a people flow in a people flow estimation unit.

FIG. 16 is a flowchart illustrating an example of a flow of ON/OFF label setting processing.

FIG. 17 is a diagram illustrating a voltage data example of additional training data before the ON/OFF label setting processing is executed.

FIG. 18 is a diagram illustrating a voltage waveform example obtained from voltage data of the additional training data before the ON/OFF label setting processing is executed.

FIG. 19 is a diagram illustrating a voltage data example of additional training data after the ON/OFF label setting processing is executed.

FIG. 22 is a diagram illustrating an input data example of the afterwave search processing.

FIG. 24 is a diagram illustrating a voltage data example of additional training data after the afterwave search processing is executed.

FIG. 25 is a diagram illustrating a voltage waveform example obtained from voltage data of the additional training data after the afterwave search processing is executed and a setting example of the ON/OFF label.

FIG. 27 is a diagram illustrating an input data example of the extreme value search processing.

FIG. 28 is a diagram illustrating a voltage waveform example obtained from input data of the extreme value search processing.

FIG. 29 is a diagram illustrating a voltage data example of additional training data after the extreme value search processing is executed.

FIG. 32 is a diagram illustrating an input data example of the first adjacent waveform combination processing.

FIG. 34 is a diagram illustrating a voltage data example of additional training data after the first adjacent waveform combination processing is executed.

FIG. 36 is a flowchart illustrating an example of a flow of provisional waveform label setting processing.

FIG. 37 is a diagram illustrating an input data example of the provisional waveform label setting processing.

FIG. 38 is a diagram illustrating an example of preprocessing target data after the provisional waveform label setting processing is executed.

FIG. 41 is a diagram illustrating an input data example of the waveform length correction processing.

FIG. 42 is a diagram illustrating a voltage data example of additional training data after the waveform length correction processing is executed.

FIG. 46 is a diagram illustrating an input data example of the waveform label setting processing.

FIG. 53 is a diagram illustrating an example of preprocessing target data after the waveform label setting processing is executed.

FIG. 55 is a diagram illustrating an input data example of the second adjacent waveform combination processing.

FIG. 57 is a diagram illustrating a preprocessing target data example after the second adjacent waveform combination processing is executed.

FIG. 60 is a diagram illustrating an input data example of the data combination processing.

FIG. 64 is a diagram illustrating an example of a voltage waveform subjected to zero padding.

FIG. 65 is a diagram illustrating a verification result example of people flow estimation accuracy by the estimation device.

FIG. 67 is a diagram illustrating a post-processed training data example in which a generation of people passing over a sensor is associated with the number of people passing as correct answer data.

FIG. 68 is a diagram illustrating a post-processed training data example in which a weight range of a person passing over the sensor is associated with the number of people passing as correct answer data.

FIG. 69 is a diagram illustrating a post-processed training data example in which a generation, a weight range, and the number of people passing of people passing over the sensor are associated with each other as correct answer data.

DESCRIPTION OF EMBODIMENTS

Figure 1:
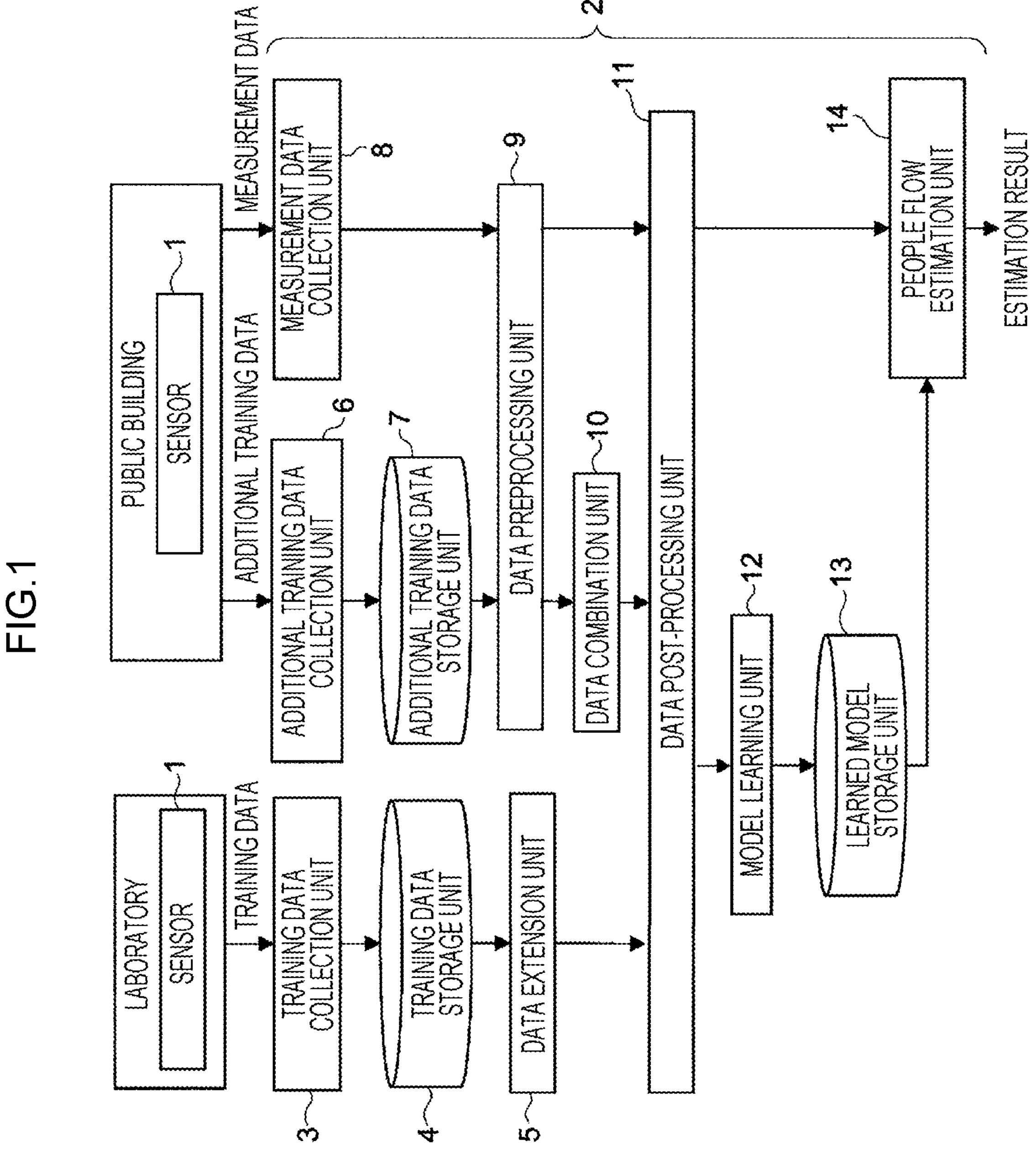
FIG. 1 is a diagram illustrating a functional configuration example of an estimation device.

Hereinafter, a present embodiment will be described below with reference to the drawings. Note that the same components and the same pieces of processing are denoted by the same reference numerals throughout the drawings, and redundant description will be omitted.

A tread-type sensor is a measurement device that detects a variation in a load applied on the tread-type sensor or a physical parameter caused by the load as a waveform. Thus, the tread-type sensor can be used for detection of not only passage of a person but also passage of a moving body moving on a ground surface, such as an automobile or a bicycle, and passage of an animal. Hereinafter, a technology of the disclosure will be described on the basis of an example in which a tread-type sensor is used for detection of the passage of a person.

Note that, in an embodiment of the technology of the disclosure, the tread-type sensor is represented as a "sensor 1". The sensor 1 includes, for example, a rubber having a sheet shape, generates electric power by a change in a load when a person steps on the rubber, and outputs sensor data representing a change in a load along a time series as a change in a voltage value. Although the sensor 1 may output sensor data representing a change in a load as a change in a current value, an example will be described in which the sensor 1 outputs a voltage value as sensor data.

As a matter of course, the sensor 1 may have any configuration as long as a change in a load applied to an area is converted into a comparable physical quantity, and it is not always necessary to generate electric power by the change in the load. The sensor 1 may output the magnitude of vibration generated when a person steps on a ground surface, for example.

The fact that a person passes over the sensor 1 means that the person steps on the rubber of the sensor 1, and the number of people passing through the sensor 1 is the number of people passing over the sensor 1 in a group. Even in a case where one person passes over the sensor 1, the person is recognized as a group of people. In a case where there are multiple people passing over the sensor 1, for example, a group of people that are close enough to touch when a hand is extended is regarded as one group. In addition, a range in which the rubber of the sensor 1 is spread is referred to as an area.

FIG. 1 is a diagram illustrating a functional configuration example of an estimation device 2 that estimates a people flow by using the sensor 1. In addition, FIG. 2 is a data flow diagram illustrating an example of a flow of data in the estimation device 2.

As illustrated in FIG. 1, the estimation device 2 includes functional units of a training data collection unit 3, a training data storage unit 4, a data extension unit 5, an additional training data collection unit 6, an additional training data storage unit 7, a measurement data collection unit 8, a data preprocessing unit 9, a data combination unit 10, a data post-processing unit 11, a model learning unit 12, a learned model storage unit 13, and a people flow estimation unit 14.

The training data collection unit 3 collects training data generated on the basis of sensor data of the sensor 1 installed in an environment, for example, a laboratory where the number of people passing through the sensor 1 can be controlled.

In the environment where the number of people passing through the sensor 1 can be controlled, the timing at which people pass through the sensor 1 can also be controlled, and thus, training data can be obtained in which sensor data from a passage start point to a passage end point at which the people pass through the sensor 1 and the number of people passing over the sensor 1 are associated with each other.

Note that, in the laboratory, people are caused to pass through the sensor 1 while attributes of the people are changed such as a gender, an age, a type of shoes, and a walking speed in addition to the number of people passing through the sensor 1, whereby training data is generated.

FIG. 3 is a diagram illustrating an example of training data collected by the training data collection unit 3.

The training data is associated with an index j representing an arrangement of a measurement point of a voltage waveform along a time series, the magnitude of the sensor data at a time corresponding to the index j, that is, amplitude V of a voltage, a waveform label b that is an identification number of the voltage waveform in a case where the voltage waveform of the sensor data from the passage start point to the passage end point of the people is set as one unit, and a correct number of people representing the number of people passing over the sensor 1 in a passage section represented by the waveform label b.

According to the example of the training data of FIG. 3, the index j=1 to the index j=3000 represent the amplitude V of the voltage waveform collected in the passage section from when two people start passing over the sensor 1 to when they finish passing, and the waveform label b=1 is associated with the voltage waveform in this passage section.

The training data storage unit 4 stores the training data collected by the training data collection unit 3.

The data extension unit 5 uses the training data stored in the training data storage unit 4 (see FIG. 2: F1) to generate new training data having different number of people passing. The training data collected by the training data collection unit 3 and the training data newly added by the data extension unit 5 are collectively referred to as "extended training data".

The additional training data collection unit 6 collects additional training data generated on the basis of sensor data of the sensor 1 installed in a building where an unspecified large number of people come and go, such as a public building, for example, a government office or a library.

Unlike the laboratory, in the building where an unspecified large number of people come and go, it is not possible to control the number of people passing through the sensor 1, passage timing, and the attributes of people passing. Thus, the additional training data collection unit 6 continues to collect sensor data from the sensor 1 over a predetermined period, and collects the number of people passing over the sensor 1 and a time of passing during this collection period visually confirmed by the person in charge of measurement. That is, the additional training data collection unit 6 collects voltage data representing the voltage waveform of the sensor 1 and number-of-people-passing data representing the number of people passing in the voltage data collection period.

Note that a place where movement of people occurs at random timing, and the number of people passing through the sensor 1, the passage timing, and the attributes of the people passing cannot be controlled is referred to as a "real space" in contrast with the laboratory.

FIG. 4 is a diagram illustrating an example of voltage data. The voltage data is associated with the index j, a time t at which the voltage is measured, and the amplitude V of the voltage. The index j is set in ascending order of 1, 2, . . . , and J in order from the oldest voltage data along the voltage measurement order. Here, "J" is a positive integer, and represents a total number of indexes j constituting the voltage data collected by the additional training data collection unit 6, that is, a maximum value of the index j.

On the other hand, FIG. 5 is a diagram illustrating an example of the number-of-people-passing data. The number-of-people-passing data is associated with a data number k for identifying a change in the number of people passing in the voltage data collection period, the time t at which the person in charge of measurement confirms people corresponding to the number of people passing through the sensor 1, and the correct number of people representing the number of people passing through the sensor 1 at the time t. Data numbers k are set in ascending order along the confirmation order of the number of people passing. Here, as an example, the data numbers k=1 to K (K is a positive integer). That is, there are K pieces of number-of-people-passing data.

Hereinafter, the voltage data and the number-of-people-passing data are collectively referred to as "additional training data". Note that, to improve people flow estimation accuracy by the estimation device 2, the additional training data collection unit 6 preferably collects the additional training data including the voltage data of the sensor 1 installed at the same place as a place to be a target for people flow estimation. A range on a ground surface in the real space where the sensor 1 is installed is an example of a predetermined area.

The additional training data storage unit 7 stores the additional training data collected by the additional training data collection unit 6.

The measurement data collection unit 8 collects, as measurement data, the voltage waveform of the sensor 1 installed in the real space to be a target for people flow estimation. Unlike the additional training data, the measurement data does not include the number-of-people-passing data. That is, the estimation device 2 estimates the number of people passing through the sensor 1 from the measurement data collected by the measurement data collection unit 8, and performs people flow estimation.

FIG. 6 is a diagram illustrating an example of the measurement data. Similarly to the voltage data illustrated in FIG. 4, the measurement data is associated with the index j, the time t at which the voltage is measured by the sensor 1, and the amplitude V of the voltage. The index $j=J_1$ in FIG. 6 is a positive integer, and represents a total number of pieces of measurement data collected by the measurement data collection unit 8.

The additional training data and the measurement data are different from the training data, and it is not clear at which time point of the voltage waveform collected from the sensor 1 a person starts passing or ends passing.

Thus, the data preprocessing unit 9 acquires the additional training data from the additional training data storage unit 7 (see FIG. 2. F2), acquires the measurement data from the measurement data collection unit 8 (see FIG. 2: F3), and divides the voltage waveform collected from the sensor 1 for each passage section for people. The additional training data divided for each passage section for people is referred to as "preprocessed additional training data", and the measurement data divided for each passage section for people is referred to as "preprocessed measurement data".

The data combination unit 10 acquires the preprocessed additional training data (FIG. 2: F4), and associates the number of people passing over the sensor 1 installed in the real space, that is, the correct number of people indicated in the number-of-people-passing data with each of the passage sections divided by the data preprocessing unit 9.

The additional training data associated with the correct number of people for each passage section is referred to as "combined additional training data".

FIG. 7 is a diagram illustrating an example of voltage data included in the preprocessed additional training data. As illustrated in FIG. 7, in the voltage data included in the preprocessed additional training data, the waveform label b is set for the voltage data of the additional training data illustrated in FIG. 4, and a range of the voltage waveform corresponding to the passage section for people is indicated by the waveform label b. In FIG. 7, the index $j=J_a$ is an index corresponding to the passage end point in the last passage section obtained from the voltage data of the additional training data by the data preprocessing unit 9, and $J \geq J_a$.

FIG. 8 is a diagram illustrating an example of the combined additional training data in which the voltage data included in the preprocessed additional training data illustrated in FIG. 7 and the number-of-people-passing data illustrated in FIG. 5 are associated with each other by the data combination unit 10. The correct number of people included in the number-of-people-passing data is associated with each of the waveform labels b corresponding to the passage sections for people.

The data post-processing unit 11 acquires the extended training data, the combined additional training data, and the preprocessed measurement data from the data extension unit 5, the data combination unit 10, and the data preprocessing unit 9, respectively (see FIG. 2: F5, F6 and F7), and shapes voltage waveform lengths of the respective acquired data into the same predetermined length.

The voltage waveform lengths of the extended training data, the combined additional training data, and the preprocessed measurement data are set to fixed values, whereby the numbers of dimensions of respective data match. Thus, each data can be used for machine learning of a learning model in the model learning unit 12 and people flow estimation in the people flow estimation unit 14 using the learning model, which are described below.

Note that the extended training data, the combined additional training data, and the preprocessed measurement data in which the voltage waveform length is shaped to a fixed length are referred to as "post-processed training data", "post-processed additional training data", and "post-processed measurement data", respectively.

The model learning unit 12 acquires the post-processed training data and the post-processed additional training data from the data post-processing unit 11 (FIG. 2: F8 and F9). Using the acquired post-processed training data and post-processed additional training data, the model learning unit 12 performs machine learning of a learning model in which a voltage waveform for each passage section included in each data is input and the correct number of people associated with the passage section represented by the input voltage waveform is output.

As a learning algorithm of the learning model, for example, LightGBM disclosed in Non Patent Literature 2 is used.

[Non Patent Literature 2]

G. Ke, Q. Meng, T. Finley, T. Wang, W. Chen, W. Ma, Q. Ye, and T.-Y. Liu. Lightgbm: A highly efficient gradient boosting decision tree. In Advances in Neural Information Processing Systems, pages 3149-3157, 2017.

A learning model for which the machine learning is performed by the model learning unit 12 is referred to as a "learned model". The model learning unit 12 stores the learned model in the learned model storage unit 13 (see FIG. 2: F10).

Since only training data obtained from a specific person (referred to as a "subject") participating in an experiment can be collected in the laboratory, there is a tendency that a variation of the voltage waveform accompanying a change in a load generated when the subject passes over the sensor 1 is biased, and the machine learning of the learning model is overfit.

On the other hand, the additional training data includes, for example, voltage waveforms obtained from an unspecified large number of people having different weights, ways of walking, shapes of shoes, types of shoes, and the like. Thus, the machine learning of the learning model is performed by adding the post-processed additional training data including the voltage waveforms obtained from various people to the post-processed training data, so that generalization performance of the learned model is improved as compared with a case where the machine learning of the learning model is performed only with the post-processed training data.

The people flow estimation unit 14 acquires the learned model from the learned model storage unit 13 (FIG. 2: F11) and acquires the post-processed measurement data from the data post-processing unit 11 (FIG. 2: F12).

The people flow estimation unit 14 outputs the number of people output by the learned model in a case where the voltage waveform divided for each passage section for people included in the post-processed measurement data is input to the learned model, as the estimated number of people passing through the sensor 1 in the passage section input to the learned model. The people flow in the real space where the sensor 1 is installed can be estimated from the estimated number of people passing.

FIG. 9 is a schematic diagram illustrating a flow of people flow estimation in the people flow estimation unit 14.

In the post-processed measurement data, the same waveform label b is set for each passage section for people. Thus, if the people flow estimation unit 14 extracts the amplitude V from the post-processed measurement data in units of the waveform label b and inputs an input vector having the extracted amplitude V as an element to the learned model, the estimated number of people passing in the passage section corresponding to the waveform label b is output from the learned model.

Figure 10:
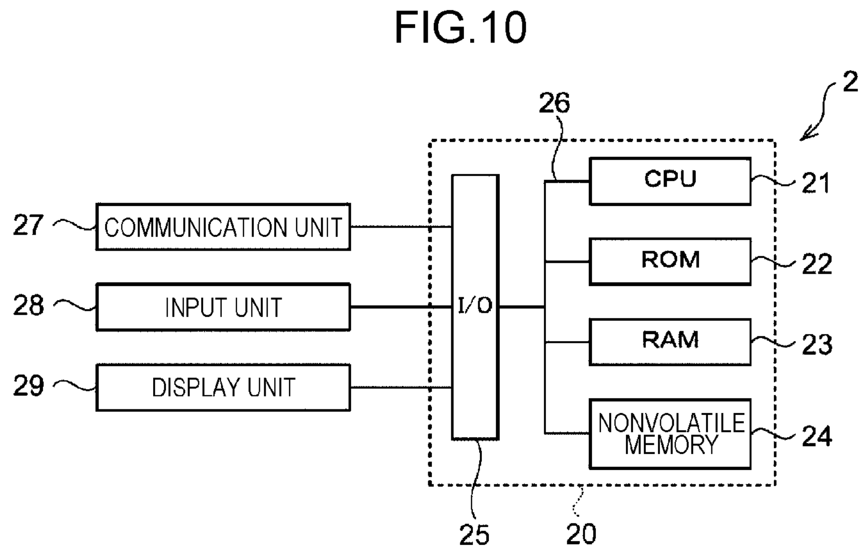
FIG. 10 is a diagram illustrating a configuration example of a main part of a computer applied to the estimation device.

Such estimation device 2 is configured using a computer 20 as an example. FIG. 10 is a diagram illustrating a configuration example of a main part of the computer 20 applied to the estimation device 2.

The computer 20 includes a central processing unit (CPU) 21 that performs processing in each functional unit of the estimation device 2 illustrated in FIG. 1. In addition, the computer 20 includes a read only memory (ROM) 22 that stores an estimation program that causes the computer 20 to function as the estimation device 2, and a random access memory (RAM) 23 that is used as a temporary work area for the CPU 21. Further, the computer 20 includes a nonvolatile memory 24 and an input/output interface (I/O) 25. Then, the CPU 21, the ROM 22, the RAM 23, the nonvolatile memory 24, and the I/O 25 are connected to each other by a bus 26.

The nonvolatile memory 24 is an example of a storage device in which stored information is maintained even if power supplied to the nonvolatile memory 24 is interrupted, and for example, a semiconductor memory is used, but a hard disk may be used. The nonvolatile memory 24 does not have to be included in the computer 20, and for example, a portable storage device detachable from the computer 20 may be used as the nonvolatile memory 24.

For example, a communication unit 27, an input unit 28, and a display unit 29 are connected to the I/O 25.

The communication unit 27 is connected to a communication line such as the Internet or a local area network (LAN), for example, and has a communication protocol for performing data communication with an external device connected to the communication line. Wired communication or wireless communication such as Wi-Fi (registered trademark) is used for the communication line.

The CPU 21 collects training data, additional training data, and measurement data via the communication unit 27, for example.

In FIG. 1, the configuration example has been described in which the estimation device 2 internally includes the training data storage unit 4, the additional training data storage unit 7, and the learned model storage unit 13; however, at least one of the training data storage unit 4, the additional training data storage unit 7, or the learned model storage unit 13 may be included in the external device. In this case, the CPU 21 stores the training data, the additional training data, and the learned model in the training data storage unit 4, the additional training data storage unit 7, and the learned model storage unit 13, respectively, via the communication unit 27, and acquires the training data, the additional training data, and the learned model from the training data storage unit 4, the additional training data storage unit 7, and the learned model storage unit 13.

In the embodiment of the disclosure, as an example, the training data storage unit 4, the additional training data storage unit 7, and the learned model storage unit 13 respectively store the training data, the additional training data, and the learned model in the nonvolatile memory 24.

The input unit 28 is a device that receives a user's instruction and notifies the CPU 21, and for example, a button, a touch panel, a keyboard, and a mouse are used. In a case where the instruction is received by voice, a microphone may be used as the input unit 28.

The display unit 29 is an example of a device that visually displays information processed by the CPU 21, and for example, a liquid crystal display, an organic electro luminescence (EL) display, and a projector are used.

Note that, in a case where the estimation device 2 is installed in an unmanned data center and receives control from a remote place through the communication unit 27, the computer 20 does not necessarily include the input unit 28 and the display unit 29.

Next, a learning method of the learning model in the estimation device 2 will be described.

Figure 11:
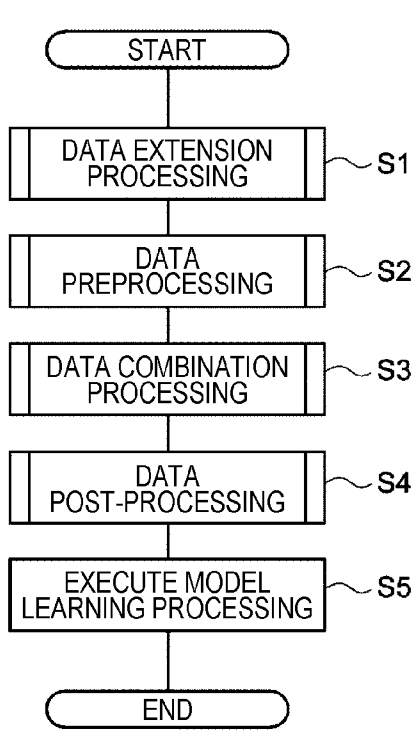
FIG. 11 is a flowchart illustrating an example of a flow of learning processing.

FIG. 11 is a flowchart illustrating an example of a flow of learning processing executed in a case where the estimation device 2 receives a learning start instruction from the user.

The estimation program that defines the learning processing is stored in advance in, for example, the ROM 22 of the estimation device 2. The CPU 21 of the estimation device 2 reads the estimation program stored in the ROM 22 and executes the learning processing.

Note that it is assumed that training data and additional training data are stored in the nonvolatile memory 24 in advance by the training data storage unit 4 and the additional training data storage unit 7, respectively.

First, in step S1, the CPU 21 executes data extension processing on the training data to generate extended training data.

In step S2, the CPU 21 executes data preprocessing on the additional training data to generate preprocessed additional training data.

In step S3, the CPU 21 executes data combination processing on the preprocessed additional training data generated in step S2 to generate combined additional training data.

In step S4, the CPU 21 executes data post-processing on the extended training data generated in step S1 and the combined additional training data generated in step S3, to generate post-processed training data and post-processed additional training data.

In step S5, the CPU 21 executes model learning processing of performing machine learning of the learning model by using the post-processed training data and the post-processed additional training data generated in step S4 to generate a learned model, and stores the learned model in the nonvolatile memory 24.

Thus, the learning processing illustrated in FIG. 11 is ended.

Next, each of pieces of processing of steps S1 to S5 of the learning processing illustrated in FIG. 11 will be described in detail.

Figure 12:
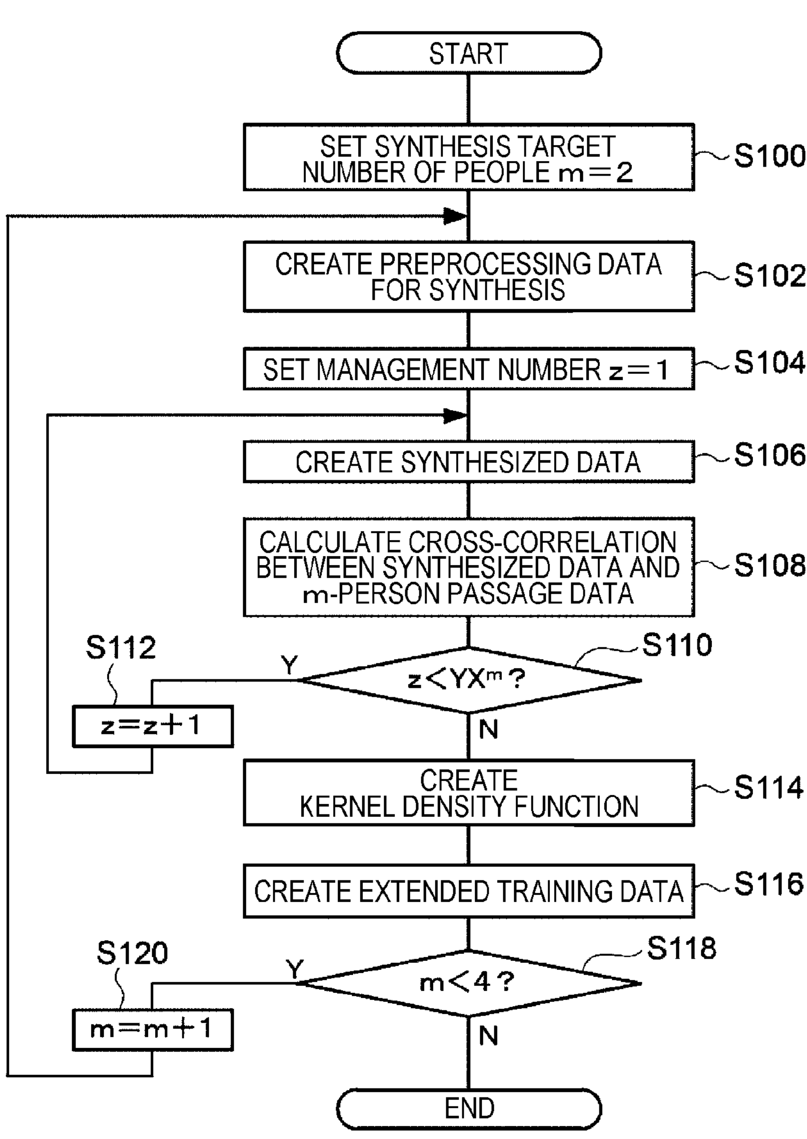
FIG. 12 is a flowchart illustrating an example of a flow of data extension processing.

FIG. 12 is a flowchart illustrating an example of a flow of the data extension processing executed in step S1 of the learning processing illustrated in FIG. 11.

Since the number of subjects participating in the experiment is limited in the laboratory, if the number of people passing desired to be associated with the training data increases, the training data corresponding to the number of people passing may not be generated. In addition, the people flow estimation accuracy by the estimation device 2 increases as the number of pieces of training data to be collected increases, however, since the subject has to pass over the sensor 1 many times for this purpose, time required for collecting the training data also increases.

Thus, in the data extension processing, new training data having different number of people passing is generated by using the collected training data.

The data extension processing illustrated in FIG. 12 illustrates an example in which new training data corresponding to the number of people passing from two to four is generated by using training data corresponding to the number of people passing of one and training data corresponding to the number of people passing of two.

The number of people passing associated with newly generated training data is set as a synthesis target number of people m, the number of pieces of training data corresponding to the number of people passing of one is set as "X", and the number of pieces of training data corresponding to the number of people passing of m is set as "Y", the pieces of training data being stored in the nonvolatile memory 24. Here, as an example, m=2 to 4, but an upper limit of the synthesis target number of people m may be set as necessary. Note that, for convenience of description, training data corresponding to the number of people passing of m is referred to as "m-person passage data".

In step S10, the CPU 21 sets the synthesis target number of people m to a lower limit value of a predetermined range. In the example of the present disclosure, the synthesis target number of people m=2.

In step S102, the CPU 21 extracts one piece of training data from m-person passage data and m pieces of training data from 1-person passage data to generate preprocessing data for synthesis. That is, the preprocessing data for synthesis is a training data group including one piece of m-person passage data and m pieces of 1-person passage data. Note that the CPU 21 may extract 1-person passage data to overlap with 1-person passage data included in the other preprocessing data for synthesis.

When all combinations of m-person passage data and 1-person passage data are extracted, a total number of pieces of preprocessing data for synthesis is $YX^m$. The CPU 21 manages the preprocessing data for synthesis by assigning a management number z (z=1 to $YX^m$) to each of the preprocessing data for synthesis.

In step S104, the CPU 21 sets the management number z to "1".

In step S106, the CPU 21 generates synthesized data in which, among 1-person passage data included in the preprocessing data for synthesis represented by the management number z, with respect to each of the 1-person passage data sequentially selected, voltage waveforms of the remaining 1-person passage data are respectively shifted by waveform shift widths O(1), . . . , and O(m−1), and synthesis is performed. The waveform shift widths O(1), . . . , and O(m−1) are shift widths when the voltage waveforms of the 1-person passage data are shifted in the index j direction. The waveform shift widths O(1), . . . , and O(m−1) can be varied within a range of 0 to 1000, for example, and may be the same or different.

Specifically, the CPU 21 sequentially shifts the (m−1) voltage waveforms among the m pieces of 1-person passage data by the waveform shift widths O(1), . . . , and O(m−1) in a direction in which the index j increases, and sets the amplitude V of each index j to "0" from the head of the shifted voltage waveform toward a direction in which the index j decreases, by the shifted width. In addition, the CPU 21 specifies a voltage waveform having a longest voltage waveform length $L_{max}$ among the m pieces of 1-person passage data, and sets the amplitude V of each index j to "0" from the end of the voltage waveform toward a direction in which the index j increases until the voltage waveform length of the other 1-person passage data reaches the voltage waveform length $L_{max}$. Then, the CPU 21 adds the amplitudes V of the same indexes j of the m pieces of 1-person passage data together to generate synthesized data.

In step S108, the CPU 21 executes Bayesian optimization on a regression model in which the waveform shift widths O(1), . . . , and O(m−1) are explanatory functions and a cross-correlation of the voltage waveform between the synthesized data generated in step S106 and m-person passage data included in the preprocessing data for synthesis represented by the management number z is an objective function, searches for the waveform shift widths O(1), . . . , and O(m−1) at which the cross-correlation is maximized, and stores the waveform shift widths O(1), . . . , and O(m−1) at this time in the RAM 23. The CPU 21 adds the amplitude V having a magnitude of "0" behind the data having the shorter voltage waveform length so that the voltage waveform lengths of the m-person passage data and the synthesized data are the same.

Here, as an example, an example has been described in which the cross-correlation of the voltage waveform between the synthesized data of the 1-person passage data and the in-person passage data is used as the objective function of the regression model, but a waveform length difference between the voltage waveforms of respective data may be incorporated into the objective function.

For example, wz_r is set as m-person passage data before zero padding, ws is set as synthesized data of 1-person passage data before zero padding, and c is set as a cross-correlation.

The CPU 21 calculates a maximum value $Vl_{max}$ and a minimum value $Vl_{min}$ of the waveform length difference between wz_r and ws as "max (len(wz_r), len(ws))" and "min(len(wz_r), len(ws))", respectively. A function "len(q)" is for acquiring a waveform length of data q. A function "max($u_1$, $u_2$)" is for comparing a variable $u_1$ with a variable $u_2$ and outputting a larger variable. A function "min($u_1$, $u_2$)" is for comparing the variable $u_1$ and the variable $u_2$ and outputting a smaller variable. In addition, the CPU 21 calculates an error $l_{ratio}$ of the voltage waveform length as "$(Vl_{max}-Vl_{min})/Vl_{max}$".

Further, the CPU 21 calculates a corrected cross-correlation result_cr as "-c $(1.0-l_{ratio})$". A smaller value of the corrected cross-correlation result_cr indicates a higher correlation.

By using the corrected cross-correlation result_cr in this manner, it is possible to perform evaluation in consideration of whether or not the voltage waveform lengths are similar of a comparison source waveform (corresponding to m-person passage data before zero padding) and the synthesized waveform (corresponding to synthesized data of 1-person passage data before zero padding), which has been difficult to perform evaluation only by the cross-correlation.

When the learning model for which the machine learning is performed by using only the actually measured data is analyzed, it is found that the degree of influence of "an amplitude position and amplitude at the amplitude position" and "waveform length" on the learning model is larger than the degree of influence of other elements obtained from the voltage waveform on the learning model. If there is a correlation between synthesized data of 1-person passage data obtained by synthesizing m pieces of 1-person passage data and m-person passage data, the variation tendency of the voltage waveform should be similar between the synthesized data of the 1-person passage data and the m-person passage data, and the amplitude position and the amplitude at the amplitude position and the waveform length particularly tend to be similar in consideration of the degree of influence on the learning model. That is, if the cross-correlation between the synthesized data of the 1-person passage data and the m-person passage data is high, a sufficient condition is recognized that "the amplitude position and the amplitude at the amplitude position" and "the waveform length" of the voltage waveforms in respective data are similar.

Thus, if search is performed for the waveform shift widths O(1), . . . , and O(m−1) at which the cross-correlation between the synthesized data of the 1-person passage data and the m-person passage data is maximized, which are obtained by shifting the sequentially selected (m−1) pieces of 1-person passage data by the waveform shift widths O(1), . . . , and O(m−1) with respect to the m pieces of 1-person passage data included in the preprocessing data for synthesis as described above and then synthesizing m pieces of 1-person passage data, the synthesized data of the 1-person passage data synthesized by using the obtained waveform shift widths O(1), . . . , and O(m−1) approaches the m-person passage data having a feature of the actually measured m-person passage data.

Figure 13:
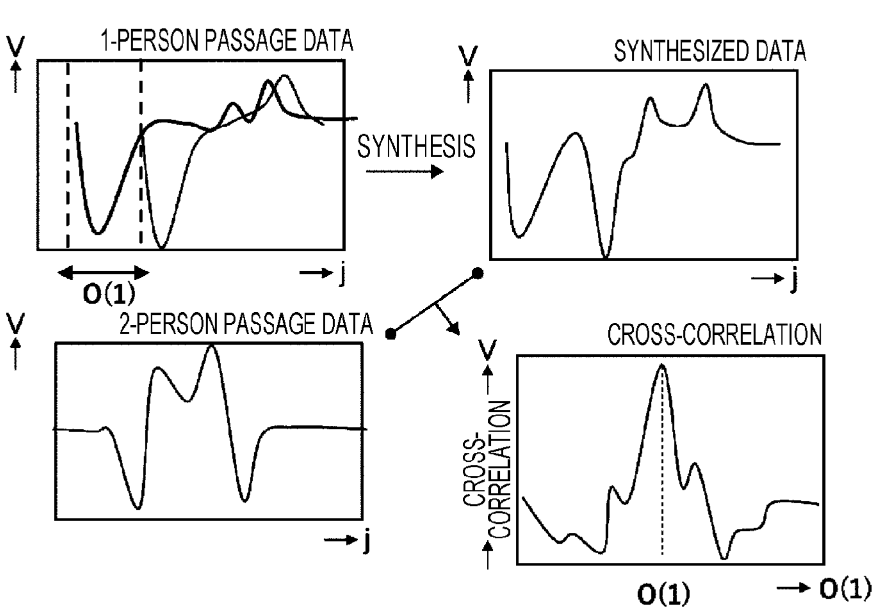
FIG. 13 is a schematic diagram schematically illustrating a flow of the data extension processing.

FIG. 13 is a schematic diagram schematically illustrating the processing of steps S106 and S108 at m=2. FIG. 13 illustrates a state in which the voltage waveforms of two pieces of 1-person passage data included in the same preprocessing data for synthesis are shifted by the waveform shift width O(1) to generate synthesized data, and search is performed for the waveform shift width O(1) at which the cross-correlation with 2-person passage data included in the same preprocessing data for synthesis is maximized.

Note that, with respect to the waveform length of the voltage waveform, since zero padding is performed so that the waveform lengths of the respective pieces of 1-person passage data included in the preprocessing data for synthesis are the same in step S106, the similarity in the waveform length between the synthesized data of the 1-person passage data and the m-person passage data is less likely to be evaluated than the similarity in the amplitude position and the amplitude at the amplitude position. Thus, the CPU 21 may correct the Bayesian optimization by including the waveform length difference between the synthesized data of the 1-person passage data and the m-person passage data as a penalty in the objective function of the regression model.

The similarity between the voltage waveforms having different waveform lengths can be calculated by, for example, dynamic time warping (DTW). However, since the DTW tends to have a larger amount of calculation than calculation of the cross-correlation, it is preferable to calculate the cross-correlation between the synthesized data of the 1-person passage data and the m-person passage data rather than calculating the DTW.

In step S110, the CPU 21 determines whether or not the management number z is less than the total number $YX^m$ of the preprocessing data for synthesis. In a case where the management number z is less than the total number $YX^m$ of the preprocessing data for synthesis, the processing proceeds to step S112.

In step S112, the CPU 21 adds "1" to the management number z to update the management number z, and proceeds to step S106.

The CPU 21 repeatedly executes steps S106 to S112 until the management number z reaches the total number $YX^m$ of the preprocessing data for synthesis in the determination processing of step S110, thereby calculating the waveform shift widths O(1), . . . , and O(m−1) at which the cross-correlation is maximized from each of the preprocessing data for synthesis and storing the calculated waveform shift widths in the RAM 23.

On the other hand, in a case where it is determined in the determination processing of step S110 that the management number z has reached the total number $YX^m$ of the preprocessing data for synthesis, the processing proceeds to step S114.

In step S114, the CPU 21 generates an m-dimensional kernel density function by using all the waveform shift widths O(1), . . . , and O(m−1) stored in the RAM 23 in step S108.

Figure 14:
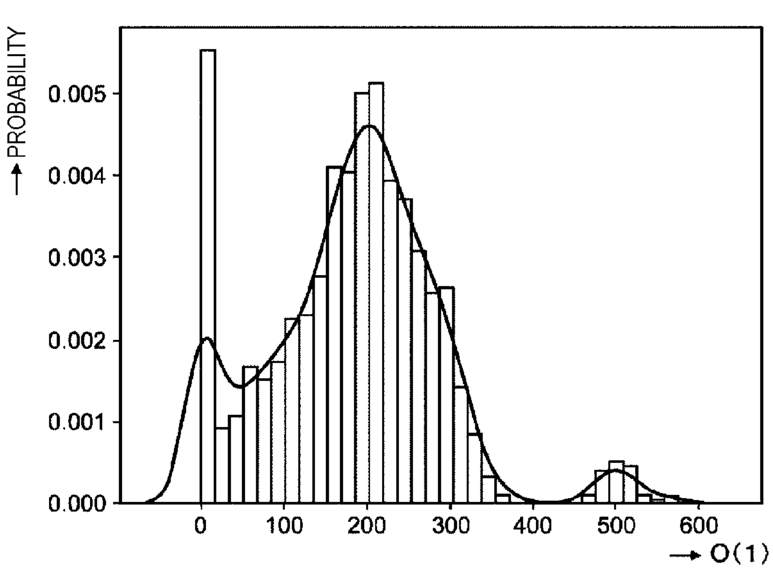
FIG. 14 is a diagram illustrating an example of a kernel density function.

FIG. 14 is a diagram illustrating an example of the kernel density function at m=2. In FIG. 14, the horizontal axis of the kernel density function represents the waveform shift width O(1), and the vertical axis represents the probability.

In step S116, the CPU 21 synthesizes m-person passage data for each of the total number $YX^m$ of the preprocessing data for synthesis by using the waveform shift widths O(1), . . . , and O(m−1) probabilistically sampled from the kernel density function generated in step S114 and m pieces of 1-person passage data included in the preprocessing data for synthesis. The CPU 21 associates anew waveform label b with the synthesized m-person passage data, adds new training data in a case where m people pass over the sensor 1, and generates extended training data.

In step S118, the CPU 21 determines whether or not a current synthesis target number of people m is less than the upper limit of four. If the synthesis target number of people m is less than four, the processing proceeds to step S120.

In step S120, the CPU 21 adds "1" to the synthesis target number of people m to update the synthesis target number of people m, and proceeds to step S102.

By repeatedly executing steps S102 to S120 until the synthesis target number of people m reaches the upper limit of four in the determination processing of step S120, the CPU 21 adds new training data in a case where m people pass over the sensor 1 on the basis of the waveform shift widths O(1), . . . , and O(m−1) sampled from the kernel density function, for each of the synthesis target number of people in.

On the other hand, in a case where it is determined in the determination processing of step S118 that the synthesis target number of people in has reached four, the data extension processing illustrated in FIG. 12 is ended.

After completion of the data extension processing, the CPU 21 executes data preprocessing as illustrated in FIG. 11.

Figure 15:
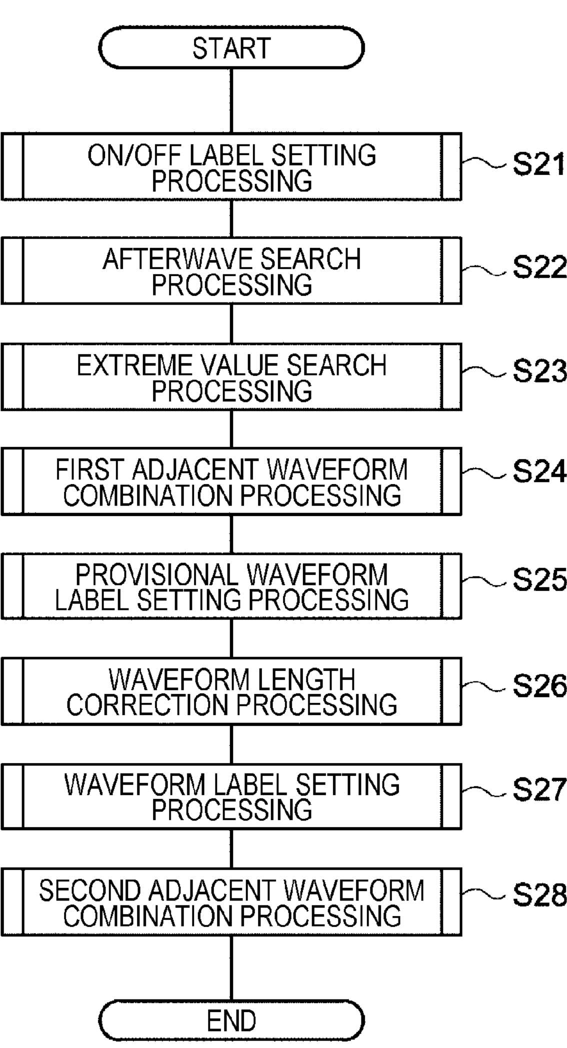
FIG. 15 is a flowchart illustrating an example of a flow of data preprocessing.

FIG. 15 is a flowchart illustrating an example of a flow of the data preprocessing. In the data preprocessing, the additional training data is divided for each passage section for people.

First, in step S21, the CPU 21 executes ON/OFF label setting processing.

In step S22, the CPU 21 executes afterwave search processing on the additional training data on which the ON/OFF label setting processing is performed.

In step S23, the CPU 21 executes extreme value search processing on the additional training data on which the afterwave search processing is performed.

In step S24, the CPU 21 executes first adjacent waveform combination processing on the additional training data on which the extreme value search processing is performed.

In step S25, the CPU 21 executes provisional waveform label setting processing on the additional training data on which the first adjacent waveform combination processing is performed.

In step S26, the CPU 21 executes waveform length correction processing on the additional training data on which the provisional waveform label setting processing is performed.

In step S27, the CPU 21 executes waveform label setting processing on the additional training data on which the waveform length correction processing is performed.

In step S28, the CPU 21 executes second adjacent waveform combination processing on the additional training data on which the waveform label setting processing is performed.

Next, each of pieces of processing of steps S21 to S28 constituting the data preprocessing will be described in detail.

Figure 16:
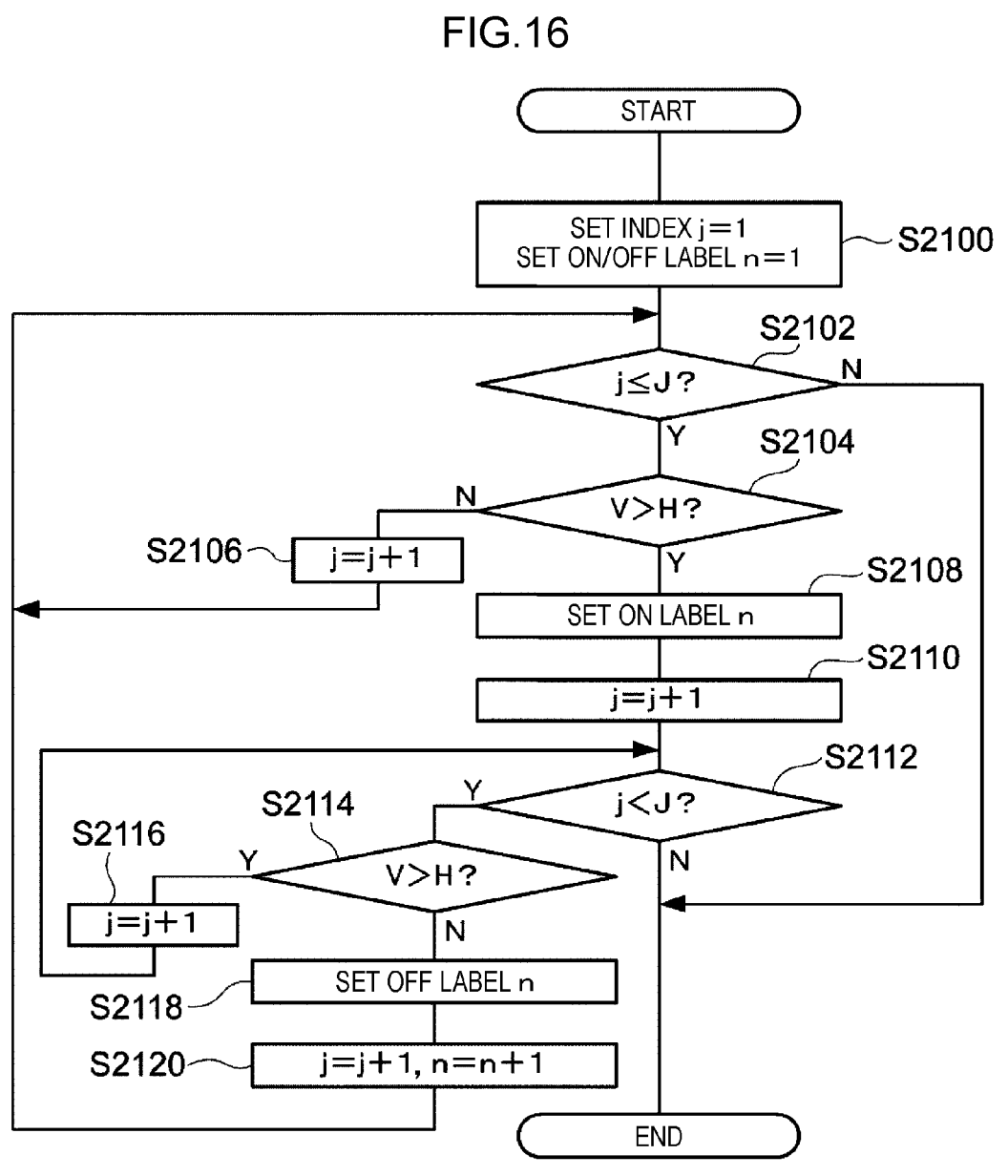

FIG. 16 is a flowchart illustrating an example of a flow of the ON/OFF label setting processing of step S21 of FIG. 15.

Since noise is mixed in the voltage waveform of the additional training data, it is difficult to determine whether or not a person has passed over the sensor 1 on the basis of whether or not the amplitude V of the raw voltage waveform output by the sensor 1 is less than or equal to a threshold.

Thus, in the ON/OFF label setting processing, the entire voltage waveform is normalized to reduce the noise component mixed in the voltage waveform, and then the index j corresponding to the passage start point and the passage end point of the person passing over the sensor 1 is determined from the voltage waveform.

Figure 18:
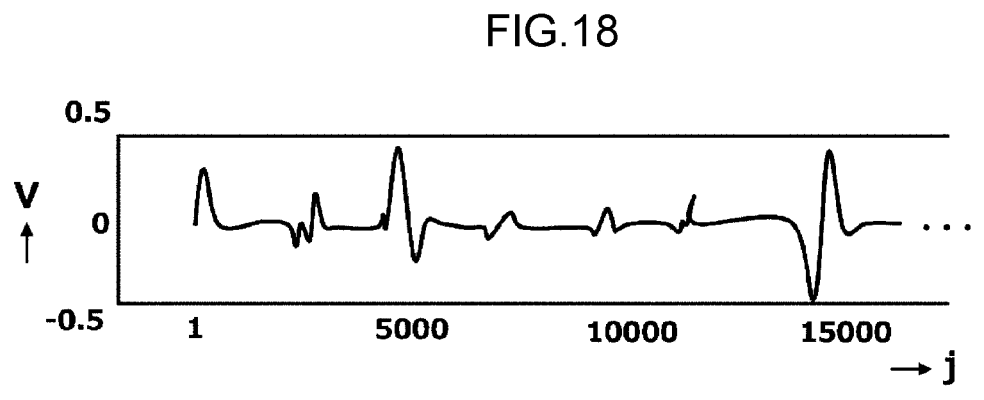

FIG. 17 is a diagram illustrating a voltage data example of additional training data before the ON/OFF label setting processing is executed, and is input data of the ON/OFF label setting processing. FIG. 18 is a diagram illustrating a voltage waveform example obtained from the voltage data of the additional training data illustrated in FIG. 17.

Note that the CPU 21 normalizes the amplitude V of each index j in advance so that the amplitude V of the entire voltage waveform of the additional training data falls within a range of greater than or equal to 0 and less than or equal to 1.

In step S2100 of FIG. 16, the CPU 21 executes initial processing of setting the index j to "1" and setting an ON/OFF label n to "1".

The ON/OFF label n is a label for associating positions of the passage start point and the passage end point of the person passing over the sensor 1 with the voltage waveform, and the ON label n is set for the index j corresponding to the passage start point, and the OFF label n is set for the index j corresponding to the passage end point. Since the passage start point and the passage end point exist in pairs, the same label number n (n is a positive integer) is set for each of the passage start point and the passage end point forming a pair.

In step S2102, the CPU 21 determines whether or not the index j is less than or equal to a total number of indexes J. In a case where the index j is less than or equal to the total number of indexes J, the processing proceeds to step S2104.

In step S2104, the CPU 21 determines whether or not the amplitude V at the index j is greater than a predetermined threshold H. The threshold H is set to a value with which a person can be regarded as passing over the sensor 1 if the amplitude V exceeds this value. In a case where the amplitude V is less than or equal to the threshold H, the processing proceeds to step S2106.

In step S2106, the CPU 21 adds "1" to the index j to update the index j, and proceeds to step S2102. That is, the CPU 21 searches for the index j at which the amplitude V is greater than the threshold H while increasing the index j by one until it is determined that the amplitude V at the index j is greater than the threshold H in the determination processing of step S2104.

In a case where it is determined in the determination processing of step S2104 that the amplitude V is greater than the threshold H, the processing proceeds to step S2108.

The fact that the amplitude V exceeds the threshold H at a position of a current index j means that the index j is the passage start point. Thus, in step S2108, the CPU 21 sets the ON label n for the index j.

In step S2110, the CPU 21 adds "1" to the index j to update the index j.

In step S2112, the CPU 21 determines whether or not the index j is less than the total number of indexes J. In a case where the index j is less than the total number of indexes J, the processing proceeds to step S2114.

In step S2114, the CPU 21 determines whether or not the amplitude V at the index j is greater than the threshold H. In a case where the amplitude V is greater than the threshold H, the processing proceeds to step S2116.

In step S2116, the CPU 21 adds "1" to the index j to update the index j, and proceeds to step S2112. That is, while the index j is less than the total number of indexes J, the CPU 21 searches for the index j at which the amplitude V is less than the threshold H while increasing the index j by one until it is determined in the determination processing of step S2114 that the amplitude V at the index j is less than the threshold H.

In a case where it is determined in the determination processing of step S2114 that the amplitude V is less than the threshold H, the processing proceeds to step S2118.

The fact that the amplitude V exceeding the threshold H at a position of a current index j is decreased to less than the threshold H means that the index j is the passage end point. Thus, in step S2118, the CPU 21 sets the OFF label n for the index j.

Since the ON label n and the OFF label n forming a pair are set, to determine whether there are the next passage start point and passage end point in the voltage waveform of the additional training data, the CPU 21 updates the index j by adding "1" to the index j and updates the ON/OFF label n by adding "1" to the ON/OFF label n in step S2120, and proceeds to step S2102. That is, until it is determined in the determination processing of step S2102 that the index j has reached the total number of indexes J or it is determined in the determination processing of step S2112 that the index j has reached the total number of indexes J, the CPU 21 searches for the passage start point and the passage end point from the voltage waveform of the additional training data while increasing the index j by one.

On the other hand, in a case where the index j exceeds the total number of indexes J in the determination processing of step S2102, or in a case where it is determined that the index j has reached the total number of indexes J in the determination processing of step S2112, the ON/OFF label setting processing illustrated in FIG. 16 is ended.

Figure 20:
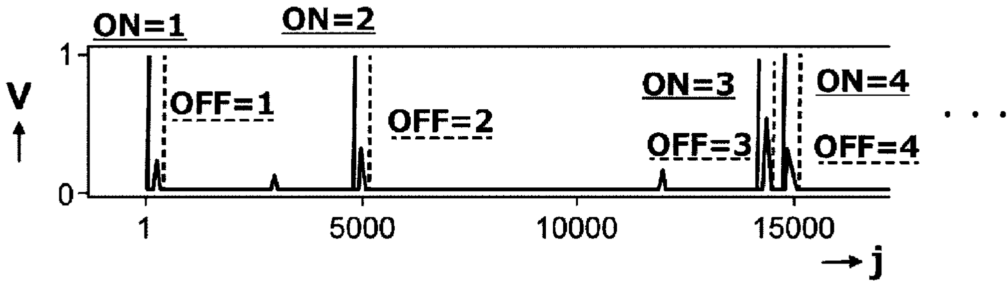
FIG. 20 is a diagram illustrating a voltage waveform example obtained from voltage data of the additional training data after the ON/OFF label setting processing is executed and a setting example of an ON/OFF label.

FIG. 19 is a diagram illustrating a voltage data example of additional training data after the ON/OFF label setting processing is executed, and FIG. 20 is a diagram illustrating a voltage waveform example obtained from the voltage data of the additional training data illustrated in FIG. 19 and a setting example of the ON/OFF label n.

As illustrated in FIG. 19, the ON label n is set for the index j corresponding to the passage start point, and the OFF label n is set for the index j corresponding to the passage end point.

In the ON/OFF label setting processing, the passage start point and the passage end point are determined from the voltage waveform depending on whether or not the amplitude V exceeds the threshold H in a state where the entire voltage waveform of the additional training data is normalized. For that reason, since the amplitude V generated at a portion such as immediately before the passage end point is relatively small due to the normalization of the voltage waveform, the amplitude V at the portion is less than the threshold H, and a position of the OFF label n may deviate from the actual passage end point.

Thus, in the afterwave search processing of step S22 in FIG. 15, the normalization of the voltage waveform is canceled and the amplitude V is returned to the original scale, and in a case where the amplitude V of the index j with which the OFF label n is associated exceeds the threshold H, the position of the OFF label n is shifted backward to the index j at which the amplitude V is less than or equal to the threshold H, whereby the position of the OFF label n is corrected so that the passage end point is associated with the correct index j.

Figure 21:
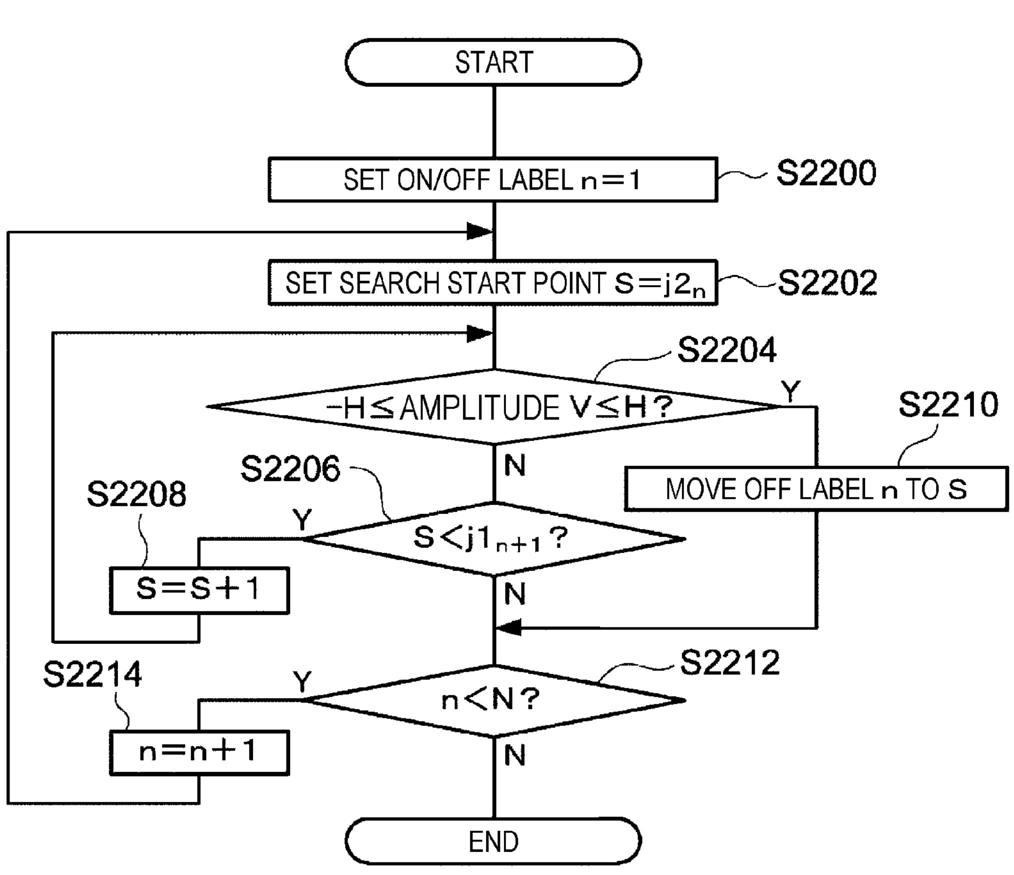
FIG. 21 is a flowchart illustrating an example of a flow of afterwave search processing.

FIG. 21 is a flowchart illustrating an example of the afterwave search processing. Note that the CPU 21 cancels the normalization of the voltage waveform performed in the ON/OFF label setting processing, and then executes the afterwave search processing.

Figure 23:
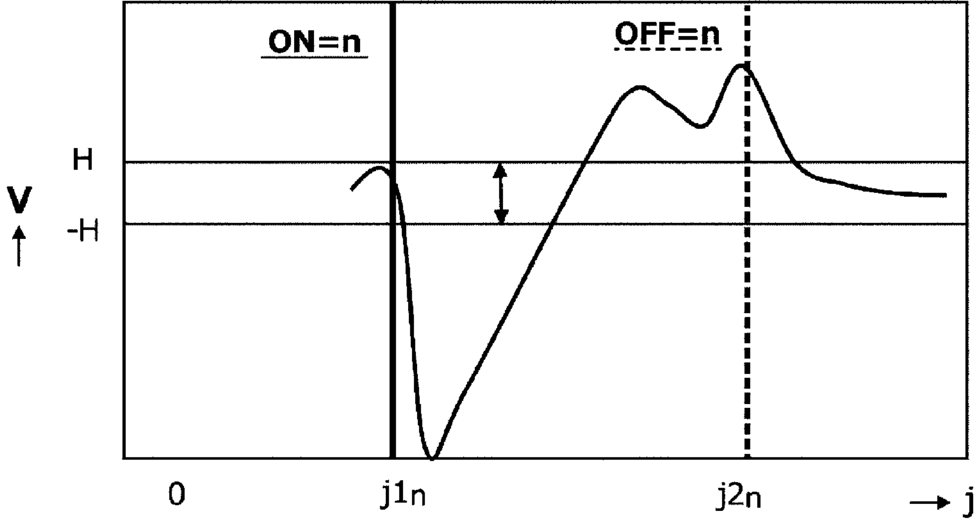
FIG. 23 is a diagram in which an ON label and an OFF label are associated with a voltage waveform obtained from an input data example of the afterwave search processing.

FIG. 22 is a diagram illustrating a voltage data example of the additional training data on which the ON/OFF label setting processing is executed, and is input data of the afterwave search processing. FIG. 23 is a diagram illustrating the positions of the indexes j with which the ON label n and the OFF label n are associated, in the voltage waveform obtained from the voltage data of the additional training data illustrated in FIG. 22. A maximum value of the ON/OFF label n set in the voltage data is set as "N".

For convenience of description, hereinafter, the index j with which the ON label n is associated is represented as "$j1_n$", and the index j with which the OFF label n is associated is represented as "$j2_n$".

In step S2200 of FIG. 21, the CPU 21 executes initial processing of setting the ON/OFF label n to "1".

In step S2202, the CPU 21 sets the search start point S to "$j2_n$".

In step S2204, the CPU 21 determines whether or not the amplitude V at the search start point S is included in a range surrounded by thresholds H having different signs, that is, whether or not −H≤V≤H. In a case where the amplitude V at the search start point S is not −H≤V≤H, the processing proceeds to step S2206.

In step S2206, it is determined whether or not the search start point S is less than $j1_{n+1}$, that is, whether or not the search start point S has not reached the passage start point of the next passage section. If the search start point S has not reached the passage start point of the next passage section, the processing proceeds to step S2208.

In step S2208, the CPU 21 adds "1" to the search start point S to update the search start point S, and proceeds to step S2204. That is, while it is determined in the determination processing of step S2206 that the search start point S has not reached the passage start point of the next passage section, the CPU 21 searches for the index j in which the amplitude V at the index j corresponding to the search start point S is −H≤V≤H in the determination processing of step S2204, while shifting the search start point S backward by one from the position of the index $j2_n$.

In a case where it is determined in the determination processing of step S2204 that the amplitude V at the index j corresponding to the search start point S is −H≤V≤H, the processing proceeds to step S2210.

The fact that the amplitude V is −H≤V≤H at a position of a current search start point S means that the search start point S is the passage end point. Thus, in step S2210, the CPU 21 resets the OFF label n set for the index $j2_n$, for the index j represented by the search start point S. That is, the CPU 21 moves the OFF label n set for the index $j2_n$ to the index j represented by the search start point S, and proceeds to step S2212.

Note that, in a case where it is determined in the determination processing of step S2206 that the search start point S has reached $j1_{n+1}$, the index $j2_n$ is the passage end point as it is, so that the OFF label n already set for the index $j2_n$ is not moved, and the processing proceeds to step S2212.

In step S2212, the CPU 21 determines whether or not the ON/OFF label n is less than the maximum value N of the ON/OFF label n. If the ON/OFF label n is less than the maximum value N of the ON/OFF label n, the next passage section still exists in the voltage waveform, and thus the processing proceeds to step S2214.

In step S2214, the CPU 21 adds "1" to the ON/OFF label n to update the ON/OFF label n, and proceeds to step S2202. That is, until it is determined in the determination processing of step S2212 that the ON/OFF label n has reached the maximum value N of the ON/OFF label n, the CPU 21 repeats processing of moving the position of the passage end point in each passage section included in the voltage waveform to the index j represented by the search start point S at the time when the amplitude V is −H≤V≤H.

In a case where it is determined in the determination processing of step S2212 that the ON/OFF label n has reached the maximum value Nn of the ON/OFF label n, the CPU 21 ends the afterwave search processing illustrated in FIG. 21.

Figure 25:
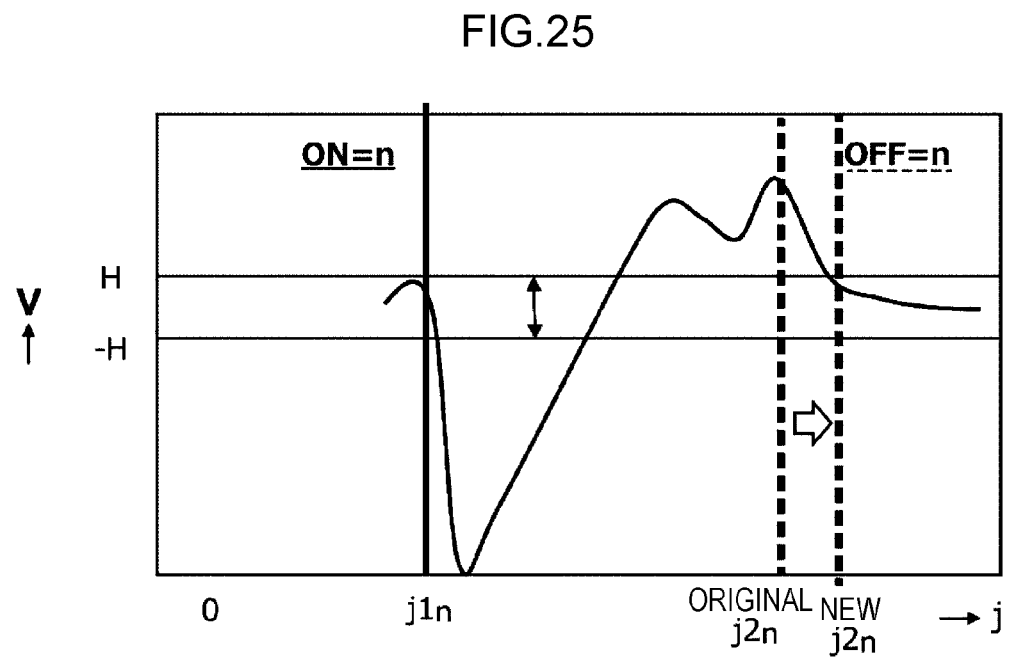

FIG. 24 is a diagram illustrating a voltage data example of additional training data after the afterwave search processing is executed, and FIG. 25 is a diagram illustrating a voltage waveform example obtained from the voltage data of the additional training data illustrated in FIG. 24 and a setting example of the ON/OFF label n.

As illustrated in FIG. 25, the index $j2_n$ corresponding to the passage end point of the passage section represented by the ON/OFF label n moves backward from the position set in the ON/OFF label setting processing by the afterwave search processing.

In correction of the passage end point by the afterwave search processing, when there is an extreme value in a voltage waveform whose amplitude range is equivalent to that of noise but whose shape is different from that of noise, the OFF label n may be set for the index j before the index j corresponding to the actual passage end point.

Figure 28:
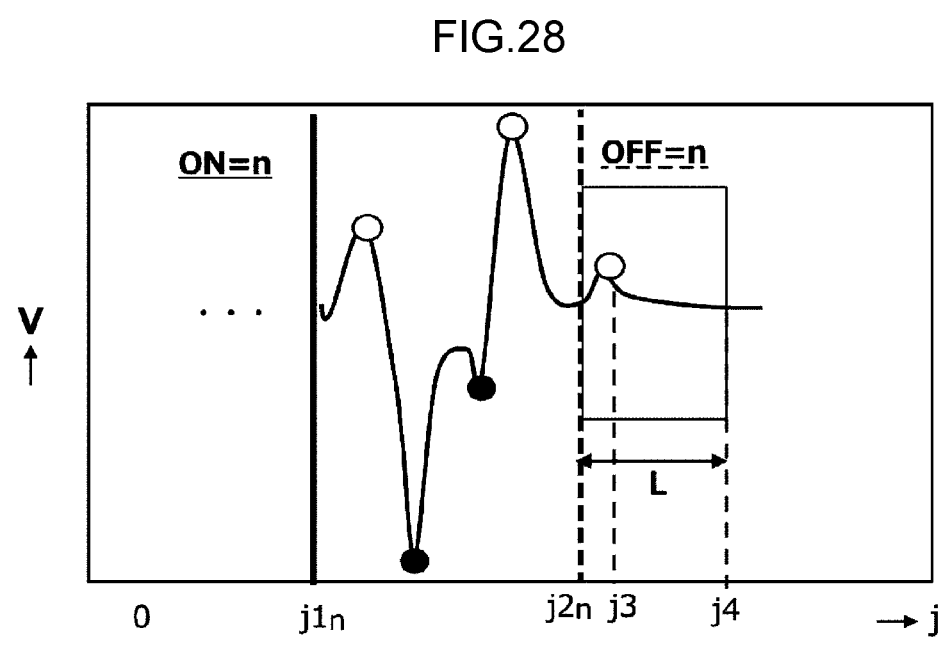

For example, FIG. 27 is a diagram illustrating a voltage data example in which an extreme value label r is set for the voltage data of the additional training data after the afterwave search processing is executed, and FIG. 28 is a diagram illustrating a voltage waveform example obtained from the voltage data of the additional training data illustrated in FIG. 27. The extreme value label r is a label indicating whether or not the amplitude V of the corresponding index j indicates an extreme value, and the extreme value label r=1 is set for the index j in which the amplitude V is the extreme value, and the extreme value label r=0 is set for the index j in which the amplitude V is not the extreme value. Note that, the extreme value is a generic term for a maximum value and a minimum value.

In the voltage data of FIG. 27, the OFF label n is set for the index $j2_n$, but a situation in which the index j corresponding to the actual passage end point is an index j4 may occur. As illustrated in FIG. 28, this occurs because the amplitude V of the index $j2_n$ at the time point when a person has not passed over the sensor 1 temporarily decreases to a range of greater than or equal to −H and less than or equal to H, so that even if the amplitude V shows a maximum value at an index j3 in a period in which the same person is considered to be still passing over the sensor 1 provided behind the index j2, the CPU 21 ignores the maximum value.

If the threshold H is lowered, a probability of occurrence of such erroneous determination can be lowered, but this makes it more susceptible to noise.

Thus, in the extreme value search processing of step S23 of FIG. 15, in a case where the extreme value exists in a section L provided behind the index $j2_n$ for which the OFF label n is set and corresponding to a time required for one person to pass over the sensor 1, it is determined that there is an overlooked actual passage end point behind the index $j2_n$ for which the OFF label n is set, and correction is performed by shifting the position of the OFF label n backward so that the passage end point is associated with the correct index j.

Figure 26:
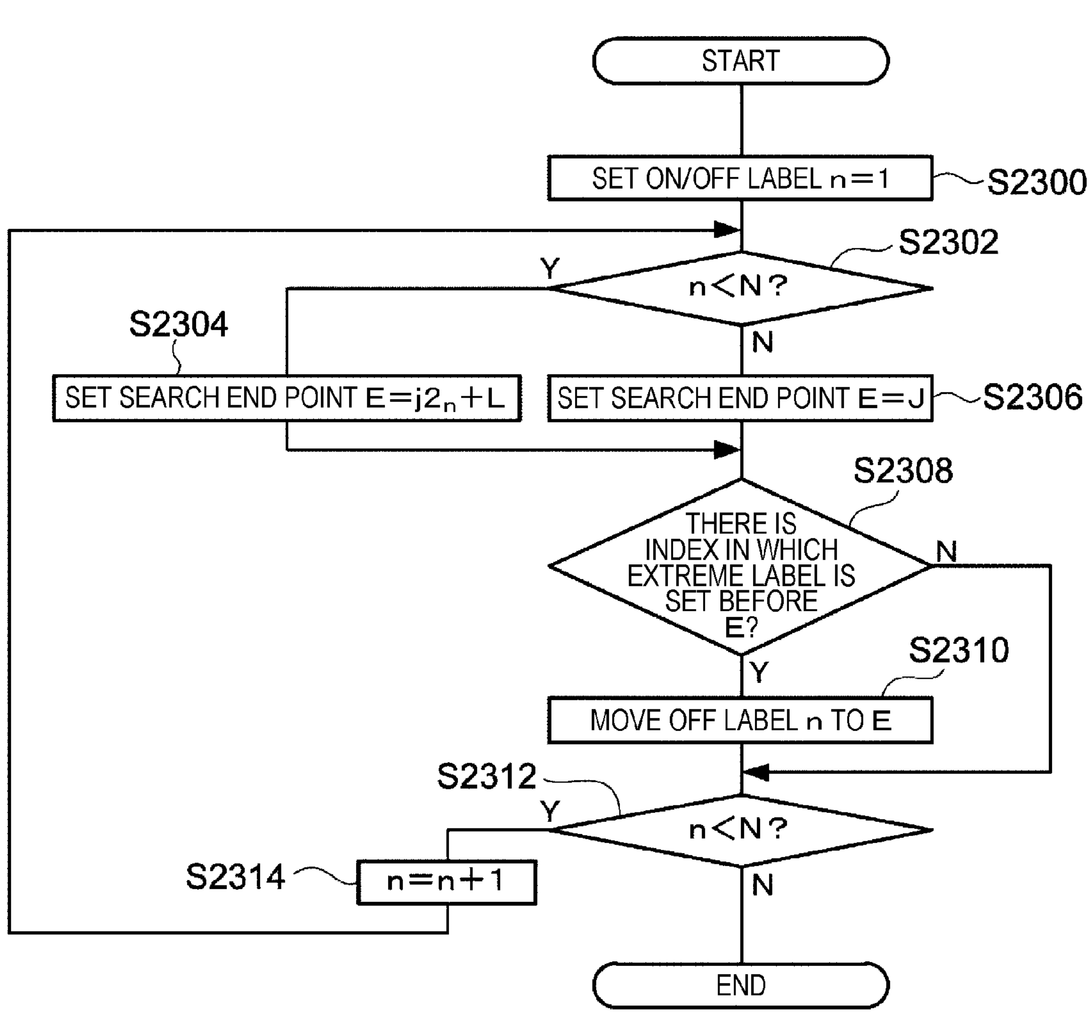
FIG. 26 is a flowchart illustrating an example of a flow of extreme value search processing.

FIG. 26 is a flowchart illustrating an example of a flow of the extreme value search processing. As illustrated in FIG. 27, the CPU 21 sets the extreme value label r in advance in the voltage data of the additional training data after the afterwave search processing is executed that is the input data of the extreme value search processing.

In step S2300, the CPU 21 executes initial processing of setting the ON/OFF label n to "1".

In step S2302, the CPU 21 determines whether or not the ON/OFF label n is less than the maximum value N of the ON/OFF label n. In a case where the ON/OFF label n is less than the maximum value N of the ON/OFF label n, the processing proceeds to step S2304.

In step S2304, the CPU 21 sets a search end point E to "$j2_n$+L". "L" is the section L already described, and is also referred to as "waveform length for one person".

On the other hand, in a case where it is determined in the determination processing of step S2302 that the ON/OFF label n has reached the maximum value N of the ON/OFF label n, the processing proceeds to step S2306.

In step S2306, the CPU 21 sets the search end point E to the total number of indexes J.

In step S2308, the CPU 21 determines whether or not there is the index j in which the extreme value label r is set to "1" in the section L from the index $j\mathbf{2}_n$ to the search end point E.

In a case where the index j in which the extreme value label r is set to "1" exists in the section L, the processing proceeds to step S2310.

The fact that there is an extreme value in the voltage waveform means that it is highly probable that a person is still passing over the sensor 1. Thus, in step S2310, the CPU 21 moves the OFF label n set for the index $j\mathbf{2}_n$ to the index j represented by the search end point E. and proceeds to step S2312.

On the other hand, in a case where it is determined in the determination processing of step S2308 that the index j in which the extreme value label r is set to "1" does not exist in the section L, the processing proceeds to step S2312 without execution of the processing of step S2310. That is, in a case where the index j in which the extreme value label r is set to "1" does not exist in the section L, the OFF label n set for the index $j\mathbf{2}_n$ is not moved, and the OFF label n is set for the index $j\mathbf{2}_n$ as it is.

In step S2312, the CPU 21 determines again whether or not the ON/OFF label n is less than the maximum value N of the ON/OFF label n. In a case where the ON/OFF label n is less than the maximum value N of the ON/OFF label n, the processing proceeds to step S2314.

In step S2314, the CPU 21 adds "1" to the ON/OFF label n to update the ON/OFF label n, and proceeds to step S2302. That is, until it is determined in the determination processing of step S2312 that the ON/OFF label n has reached the maximum value N of the ON/OFF label n, the CPU 21 repeats processing of moving the OFF label n set for the index $j\mathbf{2}_n$ to the index j represented by the search end point E if there is the index j in which the extreme value label r is set to "1" in the section L starting from the index $j\mathbf{2}_n$ for each index $j\mathbf{2}_n$.

On the other hand, in a case where it is determined in the determination processing of step S2312 that the ON/OFF label n has reached the maximum value N of the ON/OFF label n, the extreme value search processing illustrated in FIG. 26 is ended.

Figure 30:
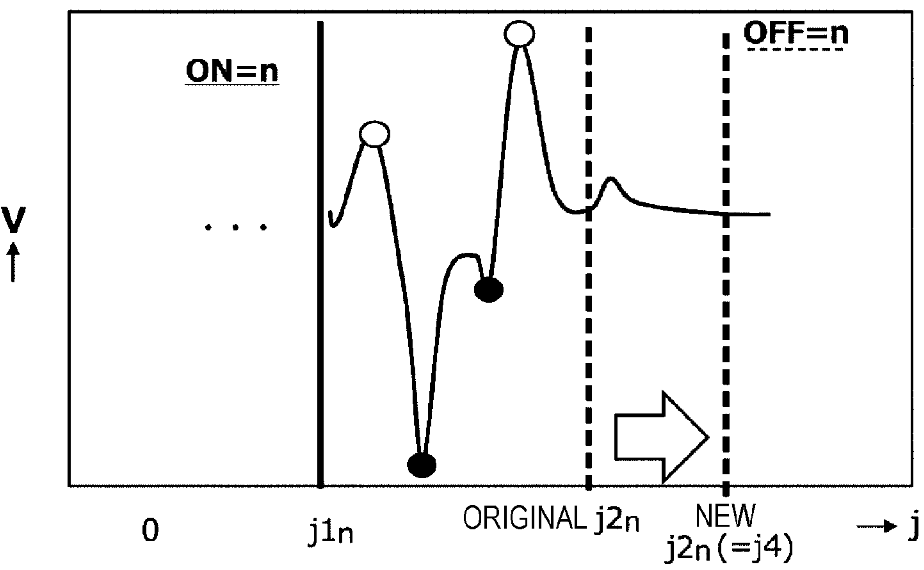
FIG. 30 is a diagram illustrating a voltage waveform example obtained from voltage data of the additional training data after the extreme value search processing is executed and a setting example of the ON/OFF label.

FIG. 29 is a diagram illustrating a voltage data example of additional training data after the extreme value search processing is executed, and FIG. 30 is a diagram illustrating a voltage waveform example obtained from the voltage data of the additional training data illustrated in FIG. 29 and a setting example of the ON/OFF label n.

As illustrated in FIG. 30, in the voltage waveform represented by the voltage data of the additional training data before the extreme value search processing is executed, in a case where an extreme value exists in the section L from the original index $j\mathbf{2}_n$ to the search end point E, the OFF label n moves to the index j (in this case, the index j4) represented by the search end point E by the extreme value search processing.

So far, a range corresponding to the passage section is specified from the voltage data of the additional training data by focusing on a change in the voltage waveform in each passage section. However, in a case where multiple people pass over the sensor 1, even if the people are actually passing over the sensor 1, a minute time may occur in which the amplitude V of the voltage waveform momentarily decreases to less than or equal to the threshold H and then increases due to a difference in timing at which each of the people steps on the sensor 1. When such a minute time occurs, the CPU 21 determines that no one passes through the predetermined area during the minute time, and thus sets the OFF label n for the index j corresponding to a start point of the minute time and sets the ON label n for the index j corresponding to an end point of the minute time.

On the other hand, the number-of-people-passing data of the additional training data is a value measured visually by the person in charge of measurement, and it is difficult for the person in charge of measurement to grasp the occurrence of the minute time. Thus, the ON/OFF label n representing the number of voltage waveforms corresponding to the passage section may be different from a value K representing the number of pieces of the number-of-people-passing data.

Thus, in the first adjacent waveform combination processing of step S24 of FIG. 15, the minute time generated when multiple people pass over the sensor 1 is detected from the voltage waveform represented by the voltage data of the additional training data, and the voltage waveforms adjacent to each other with the minute time interposed therebetween are combined together.

Figure 31:
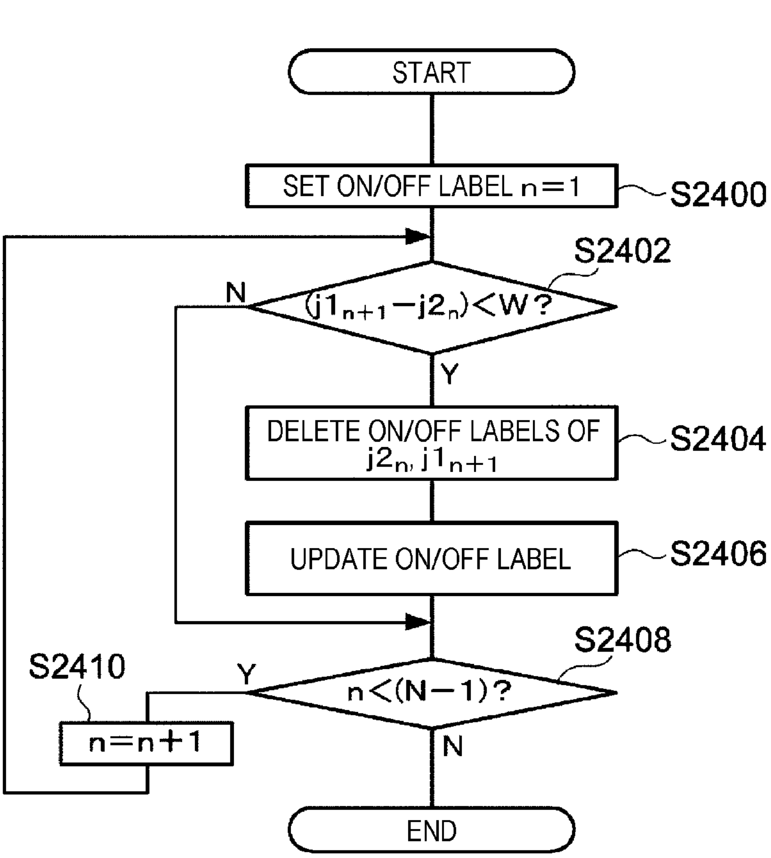
FIG. 31 is a flowchart illustrating an example of a flow of first adjacent waveform combination processing.

FIG. 31 is a flowchart illustrating an example of a flow of the first adjacent waveform combination processing. The CPU 21 deletes all the extreme value labels r set in the voltage data of the additional training data in the extreme value search processing from the voltage data, and then executes the first adjacent waveform combination processing.

Figure 33:
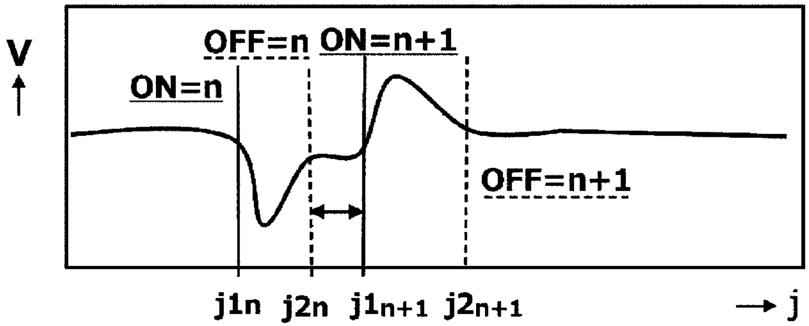
FIG. 33 is a diagram in which the ON label and the OFF label are associated with a voltage waveform obtained from input data of the first adjacent waveform combination processing.

FIG. 32 is a diagram illustrating a voltage data example of the additional training data on which the extreme value search processing is executed, and is input data of the first adjacent waveform combination processing. FIG. 33 is a diagram illustrating the positions of the indexes j with which the ON label n and the OFF label n are associated, in the voltage waveform obtained from the voltage data of the additional training data illustrated in FIG. 32.

In step S2400 of FIG. 31, the CPU 21 executes initial processing of setting the ON/OFF label n to "1".

In step S2402, the CPU 21 determines whether or not an interval between the passage end point of the passage section represented by the OFF label n and the passage start point of the adjacent next passage section represented by an ON label n+1, that is, an inter-adjacent-waveform distance ($j\mathbf{1}_{n+1}-j\mathbf{2}_n$) is less than a minimum inter-waveform distance W.

The minimum inter-waveform distance W is a distance set in advance on the basis of a finding that, if the passage section represented by the ON/OFF label n is a passage section corresponding to a series of passing actions from when a person start passing over the sensor 1 to when the person finish passing, a distance between adjacent voltage waveforms corresponding to each passage section should be at least greater than or equal to this value. The minimum inter-waveform distance W is stored in advance in the nonvolatile memory 24, for example.

If the inter-adjacent-waveform distance ($j\mathbf{1}_{n+1}-j\mathbf{2}_n$) is less than the minimum inter-waveform distance W, the processing proceeds to step S2404.

In this case, the passage section associated with the OFF label n and the passage section associated with the ON label n+1 each represent a part of the same passage section corresponding to a series of passing actions in which a person passes over the sensor 1. Thus, in step S2404, the CPU 21 deletes the OFF label n set for the index $j\mathbf{2}_n$ and the ON label n+1 set for the index $j\mathbf{1}_{n+1}$. Then, the CPU 21 updates an OFF label n+1 set for an index $j\mathbf{2}_{n+1}$ to the OFF label n, and sets a section from the index $j\mathbf{1}_n$ to the original index $j\mathbf{2}_{n+1}$ before updating the OFF label n as one passage section.

Since the ON/OFF label n+1 is absent as the ON/OFF label n is updated, the CPU 21 subtracts one from values of the ON/OFF label n+2 and subsequent ON/OFF labels in step S2406, updates the values of the ON/OFF labels so that the values of the ON/OFF labels are sequentially continued from 1, and then proceeds to step S2408. Note that, as the value of each ON/OFF label n is updated, the maximum value N of the ON/OFF label is also updated. Specifically, the maximum value N of the ON/OFF label is decreased by one.

On the other hand, in a case where it is determined in the determination processing of step S2402 that the inter-adjacent-waveform distance ($j\mathbf{1}_{n+1}-j\mathbf{2}_n$) is greater than or equal to the minimum inter-waveform distance W, the passage section represented by the ON/OFF label n and the passage section represented by the ON/OFF label n+1 are passage sections corresponding to respective passing actions. Thus, the CPU 21 proceeds to step S2408 without executing the processing of steps S2404 and S2406.

In step S2408, the CPU 21 determines whether or not the ON/OFF label n is less than (N−1). If the ON/OFF label n is less than (N−1), the processing proceeds to step S2410.

In step S2410, the CPU 21 adds "1" to the ON/OFF label n to update the ON/OFF label n, and proceeds to step S2402. That is, until it is determined in the determination processing of step S2408 that the ON/OFF label n has reached (N−1), the CPU 21 compares the inter-adjacent-waveform distance ($j\mathbf{1}_{n+1}-j\mathbf{2}_n$) between adjacent voltage waveforms corresponding to the respective passage sections with the minimum inter-waveform distance W, and combines the voltage waveforms of which the inter-adjacent-waveform distance ($j\mathbf{1}_{n+1}-j\mathbf{2}_n$) is less than the minimum inter-waveform distance W together to obtain a voltage waveform corresponding to one continuous passage section.

On the other hand, in a case where it is determined in the determination processing of step S2408 that the ON/OFF label n has reached (N−1), the first adjacent waveform combination processing illustrated in FIG. 31 is ended.

Figure 35:
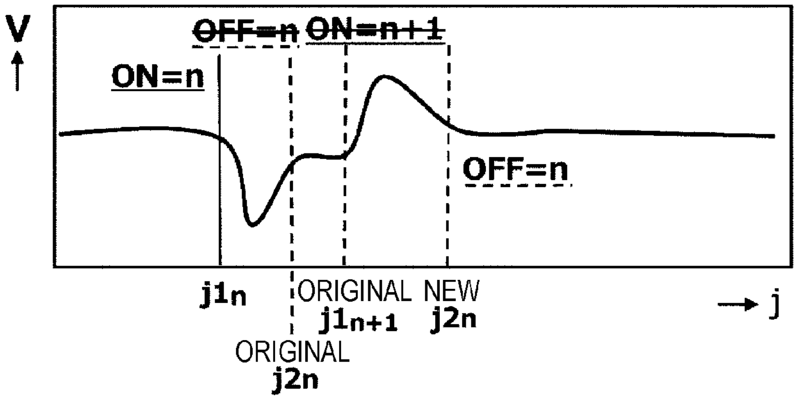
FIG. 35 is a diagram illustrating a voltage waveform example obtained from voltage data of the additional training data after the first adjacent waveform combination processing is executed and a setting example of the ON/OFF label.

FIG. 34 is a diagram illustrating a voltage data example of additional training data after the first adjacent waveform combination processing is executed, and FIG. 35 is a diagram illustrating a voltage waveform example obtained from the voltage data of the additional training data illustrated in FIG. 34 and a setting example of the ON/OFF label n.

As illustrated in FIG. 35, in a case where the inter-adjacent-waveform distance (original $j\mathbf{1}_{n+1}$−original $j\mathbf{2}_n$) is less than the minimum inter-waveform distance W, the ON label n+1 and the OFF label n respectively set for the original index $j\mathbf{1}_{n+1}$ and the original index $j\mathbf{2}_n$ are deleted, and the original index $j\mathbf{2}_{n+1}$ becomes a new index $j\mathbf{2}_n$ corresponding to the passage end point of the passage section represented by the ON/OFF label n.

By each of pieces of processing from step S21 to step S24 in FIG. 15 so far, the passage start point and the passage end point at which a person passes over the sensor 1 are determined from the voltage data of the normalized additional training data on the basis of the threshold H, and the position of the passage end point is corrected on the basis of the presence or absence of the extreme value and the inter-adjacent-waveform distance so that the determined passage end point approaches the actual passage end point.

On the other hand, in a case where a person steps on an end of the sensor 1 when the person starts passing over the sensor 1, a voltage waveform (referred to as a "minute voltage waveform at time of passing") is generated in which a rise of the amplitude V is smaller than the amplitude V in a case where the person steps on the sensor 1 over the entire sole. In such a portion, if the voltage data is normalized by the ON/OFF label setting processing, the ON label n is not set because the amplitude V does not exceed the threshold H, and as a result, the passage section may not be recognized.

If the threshold H is lowered, a probability of occurrence of such erroneous determination can be lowered, but this makes it more susceptible to noise.

Thus, in the provisional waveform label setting processing of step S25 of FIG. 15, not to miss such a minute voltage waveform at time of passing, first, a "provisional waveform label a" representing a provisional passage section is set for each section from the OFF label n to the OFF label n+1 in adjacent passage sections existing between the first passage section and the last passage section.

Figure 36:
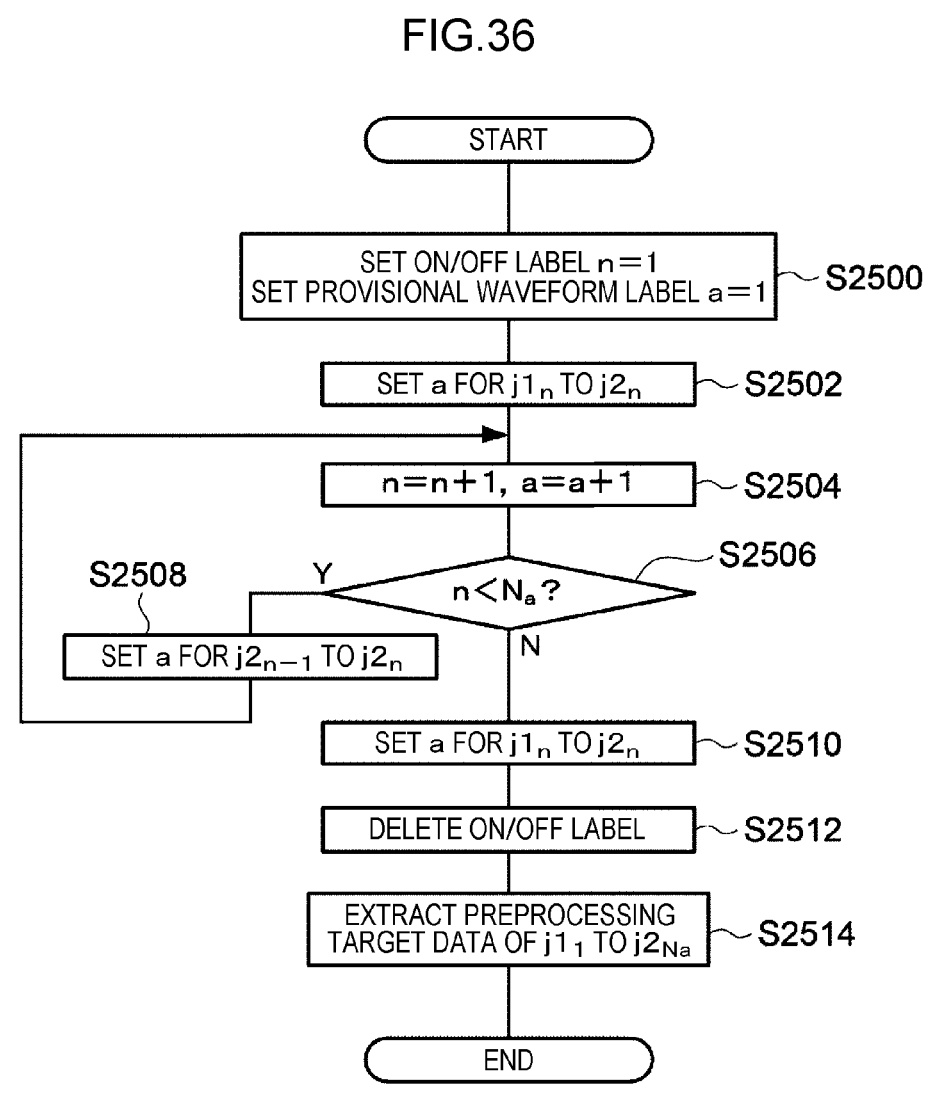

FIG. 36 is a flowchart illustrating an example of a flow of the provisional waveform label setting processing. Note that a maximum value of the ON/OFF label n after the execution of the first adjacent waveform combination processing illustrated in FIG. 31 is $N_a$ ($N_a$ is a positive integer and $N_a \leq N$).

FIG. 37 is a diagram illustrating a voltage data example of the additional training data on which the first adjacent waveform combination processing is executed, and is input data of the provisional waveform label setting processing.

In step S2500 of FIG. 36, the CPU 21 executes initial processing of setting the ON/OFF label n to "1" and setting the provisional waveform label a to "l".

In step S2502, the CPU 21 sets the provisional waveform label a (in this case, the provisional waveform label a=1) for the head passage section from the index $j\mathbf{1}_n$ to the index $j\mathbf{2}_n$.

In step S2504, the CPU 21 adds "1" to the ON/OFF label n to update the ON/OFF label n, adds "1" to the provisional waveform label a to update the provisional waveform label a, and proceeds to step S2506.

In step S2506, the CPU 21 determines whether or not the ON/OFF label n is less than the maximum value $N_a$ of the ON/OFF label n. If the ON/OFF label n is less than the maximum value $N_a$ of the ON/OFF label n, the processing proceeds to step S2508.

In step S2508, the CPU 21 sets the ON label n for an index $j\mathbf{2}_{n-1}$, sets the OFF label n for the index $j\mathbf{2}_n$, and sets the provisional waveform label a for the provisional passage section from the index $j\mathbf{2}_{n-1}$ to the index $j\mathbf{2}_n$. Thereafter, the processing proceeds to step S2504. That is, until it is determined in the determination processing of step S2506 that the ON/OFF label n has reached the maximum value $N_a$ of the ON/OFF label n, the CPU 21 repeats processing of setting the provisional waveform label a for the provisional passage section from the index $j\mathbf{2}_{n-1}$ to the index $j\mathbf{2}_n$ while updating the ON/OFF label n.

On the other hand, in a case where it is determined in the determination processing of step S2506 that the ON/OFF label n has reached the maximum value $N_a$ of the ON/OFF label n, the processing proceeds to step S2510.

In step S2510, the CPU 21 sets the provisional waveform label a (in this case, the provisional waveform label a=$N_a$) for the last passage section from the index $j\mathbf{1}_n$ to the index $j\mathbf{2}_n$.

In step S2512, the CPU 21 deletes all the ON/OFF labels n set for the index j so far.

In step S2514, the CPU 21 extracts the voltage data corresponding to the index j in a range from an index $j\mathbf{1}_1$ to an index $j\mathbf{2}_{Na}$ from the voltage data of the additional training data, and ends the provisional waveform label setting processing illustrated in FIG. 36. The voltage data extracted from the voltage data of the additional training data in step S2514 is referred to as "preprocessing target data".

Figure 39:
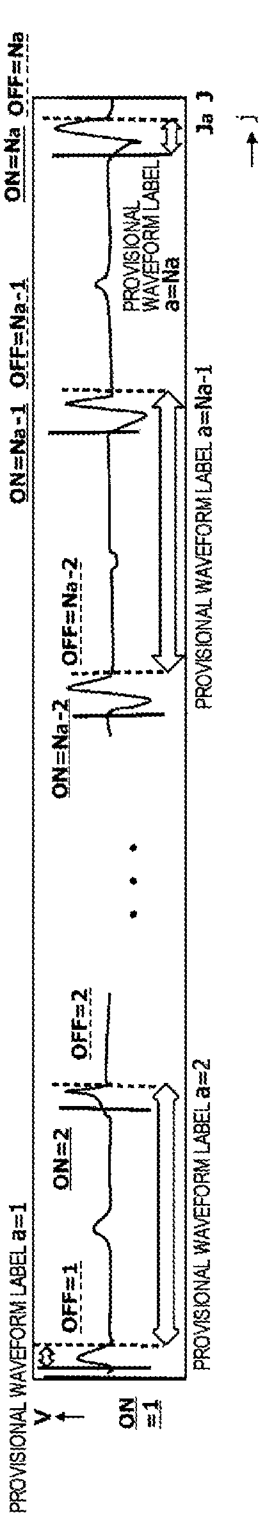
FIG. 39 is a diagram illustrating an example in which ranges of the ON/OFF label and a provisional waveform label are associated with a voltage waveform obtained from input data of the provisional waveform label setting processing.

FIG. 38 is a diagram illustrating an example of the preprocessing target data obtained in a case where the provisional waveform label setting processing is executed on the voltage data example of the additional training data on which the first adjacent waveform combination processing is executed illustrated in FIG. 37. FIG. 39 is a diagram illustrating an example in which the positions of the indexes j for which the ON/OFF label n is set, and the range of the provisional waveform label a set in the preprocessing target data are associated with the voltage waveform obtained from the voltage data example of the additional training data on which the first adjacent waveform combination processing is executed illustrated in FIG. 37.

As a result, it can be seen that the minute voltage waveform at time of passing existing in a section from the OFF label n to the OFF label n+1 is included in the provisional passage section represented by the provisional waveform label a.

As described above, each voltage waveform in the provisional passage section with which the provisional waveform label a is associated may include a voltage waveform (referred to as "afterwave voltage waveform") separated from a voltage waveform representing the same passage section originally corresponding to a series of passing actions, which has not been picked up by the afterwave search processing, the extreme value search processing, and the first adjacent waveform combination processing.

For example, in a case where the voltage waveform of 4-person passage data is separated into the first half 95% and the second half 5%, and the voltage waveform of the first half includes more information indicating a feature at the time of passing through the sensor 1 than the voltage waveform of the second half, the additional training data generated from the voltage waveform of the second half has a lower contribution to the learning model than the additional training data generated from the voltage waveform of the first half.

Further, in the additional training data, number-of-people-passing data with a correct number of people of four is generated for the 4-person passage data, but in a case where the time t in the number-of-people-passing data is included in a section of the voltage waveform of the second half, the correct number of people of four is associated with the voltage waveform of the second half. However, since the voltage waveform of the second half does not include information indicating a feature of the 4-person passage data as much as the voltage waveform of the first half, if machine learning of the learning model is performed by using the additional training data generated from the voltage waveform of the second half, it is conceivable that the people flow estimation accuracy using the learned model decreases.

Thus, in the waveform length correction processing of step S26 in FIG. 15, in a case where the voltage waveform length in the provisional passage section in which the provisional waveform label a is set is less than a minimum waveform length ML, the voltage waveform having the voltage waveform length is determined as the afterwave voltage waveform, and the provisional waveform label a associated with the afterwave voltage waveform is deleted.

Figure 40:
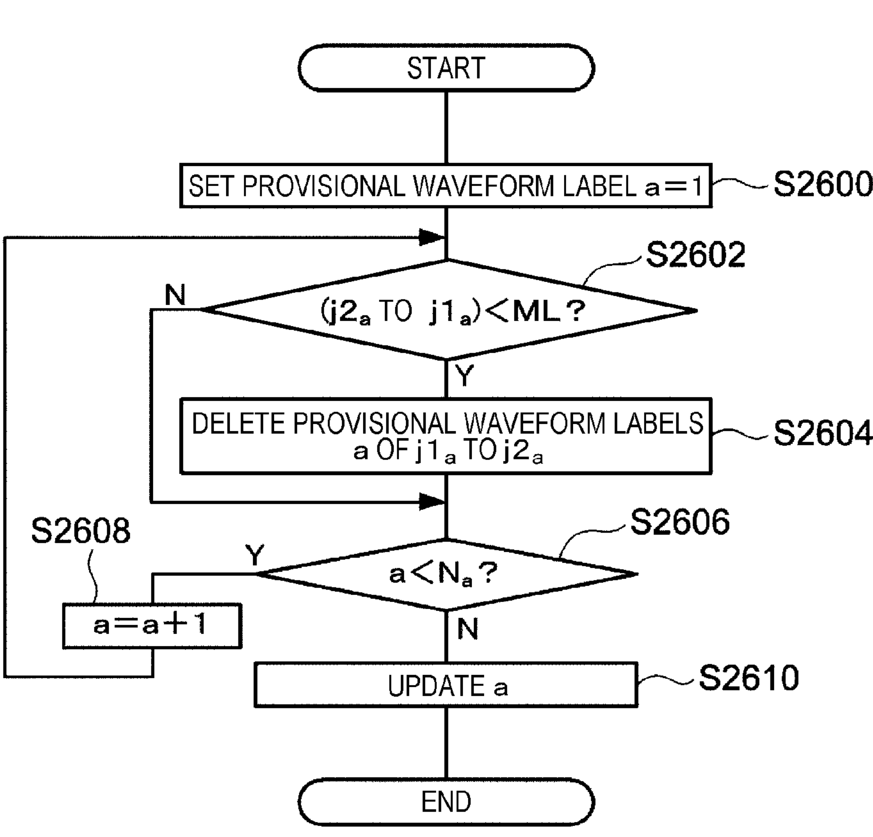
FIG. 40 is a flowchart illustrating an example of a flow of waveform length correction processing.

FIG. 40 is a flowchart illustrating an example of a flow of the waveform length correction processing. For convenience of description, hereinafter, among the indexes j with which the provisional waveform labels a (a=1 to $N_a$) are associated, the top index j, that is, the index j corresponding to the passage start point of the provisional passage section, is represented as "$j1_a$", and the last index j, that is, the index j corresponding to the passage end point of the provisional passage section, is represented as "$j2_a$".

FIG. 41 is a diagram illustrating an example of the preprocessing target data obtained by the provisional waveform label setting processing, and is input data of the waveform length correction processing.

In step S2600 of FIG. 40, the CPU 21 executes initial processing of setting the provisional waveform label a to "1".

In step S2602, the CPU 21 determines whether or not an interval between the passage start point and the passage end point of the provisional passage section represented by the provisional waveform label a, that is, a waveform length ($j2_a$−$j1_a$) is less than the minimum waveform length ML.

The minimum waveform length ML is a voltage waveform length set in advance on the basis of a finding that the voltage waveform length should be at least greater than or equal to this value if the voltage waveform is not the afterwave voltage waveform. The minimum waveform length ML is stored in the nonvolatile memory 24, for example.

If the waveform length ($j2_a$−$j1_a$) is less than the minimum waveform length ML, the processing proceeds to step S2604.

In this case, since the voltage waveform for which the provisional waveform label a is set is the afterwave voltage waveform, the CPU 21 deletes the provisional waveform labels a set for the index $j2_a$ to the index $j1_a$ of the preprocessing target data in step S2604.

On the other hand, in a case where the waveform length ($j2_a$−$j1_a$) is greater than or equal to the minimum waveform length ML, the processing proceeds to step S2606 without execution of the processing of step S2604.

In step S2606, the CPU 21 determines whether or not the provisional waveform label a is less than the maximum value $N_a$ of the provisional waveform label a. If the provisional waveform label a is less than the maximum value $N_a$ of the provisional waveform label a, the processing proceeds to step S2608.

In step S2608, the CPU 21 adds "1" to the provisional waveform label a to update the provisional waveform label a, and proceeds to step S2602. That is, until it is determined in the determination processing of step S2606 that the provisional waveform label a has reached the maximum value $N_a$ of the provisional waveform label a, the CPU 21 repeatedly executes processing of detecting the provisional waveform label a at which the waveform length ($j2_a$−$j1_a$) is less than the minimum waveform length ML and deleting the provisional waveform label a associated with the voltage waveform having the waveform length ($j2_a$−$j1_a$) less than the minimum waveform length ML.

On the other hand, in a case where it is determined in the determination processing of step S2606 that the provisional waveform label a has reached the maximum value $N_a$ of the provisional waveform label a, the processing proceeds to step S2610.

In a case where the provisional waveform label a is deleted in the processing of step S2604, the arrangement of the provisional waveform labels a arranged in ascending order becomes discontinuous. Thus, in step S2610, the CPU 21 reassigns the provisional waveform label a in ascending order from 1 to $N_{a1}$ from the head to update the provisional waveform label a, and ends the waveform length correction processing illustrated in FIG. 40. Note that $N_{a1}$ is the number of voltage waveforms associated with the provisional waveform label a after the waveform length correction processing is executed, and $N_{a1} \leq N_a$.

FIG. 42 is a diagram illustrating an example of the preprocessing target data after the waveform length correction processing is executed.

Figure 43:
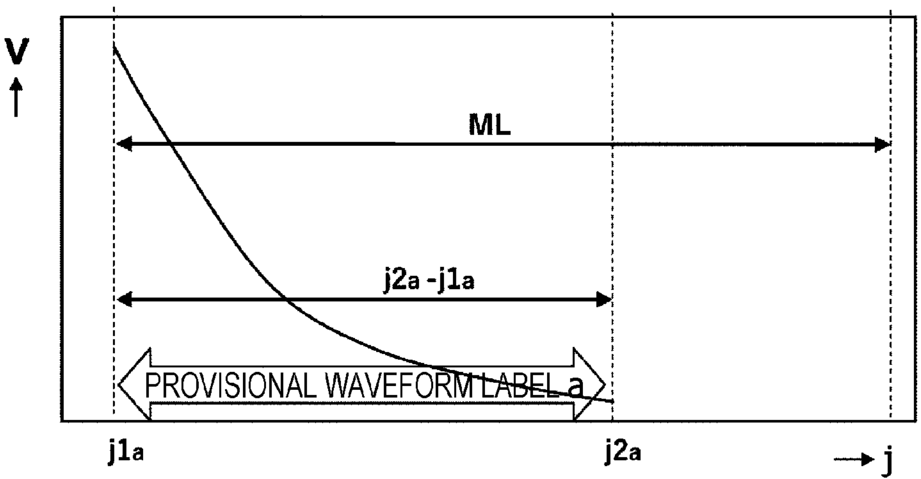
FIG. 43 is a diagram illustrating a voltage waveform example obtained from input data of the waveform length correction processing and a setting example of the provisional waveform label.
Figure 44:
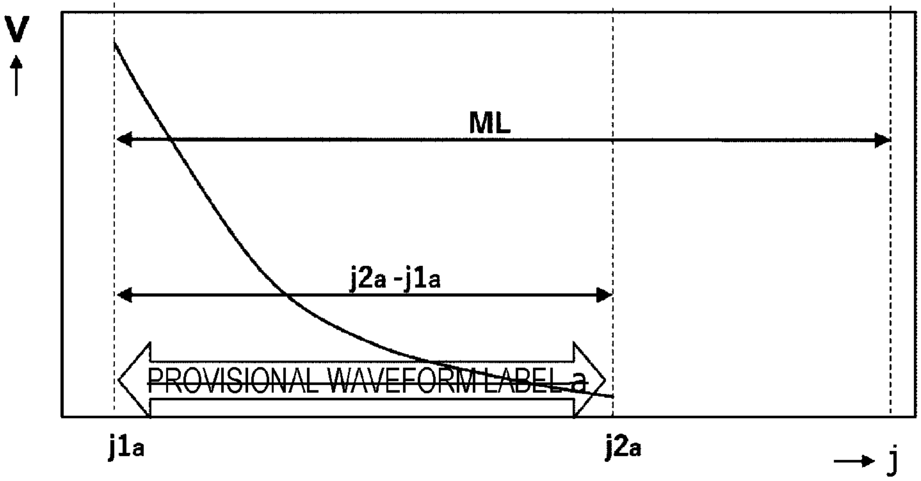
FIG. 44 is a diagram illustrating a state in which the provisional waveform label is deleted as a result of the waveform length correction processing.

In addition, FIG. 43 is a diagram illustrating a voltage waveform example obtained from the preprocessing target data that is the input data of the waveform length correction processing illustrated in FIG. 41 and a setting example of the provisional waveform label a. Since the waveform length ($j2_a - j1_a$) of the voltage waveform for which the provisional waveform label a illustrated in FIG. 43 is set is less than the minimum waveform length ML, the provisional waveform label a is deleted by the waveform length correction processing as illustrated in FIG. 44.

When the amplitude V is normalized with respect to the voltage waveform on which each of pieces of processing from step S21 to step S26 in FIG. 15 is performed, a portion of the voltage waveform where the amplitude V does not exceed the threshold H in the normalization of the amplitude V in the ON/OFF label setting processing of step S21 may exceed the threshold H. Thus, by normalizing the amplitude V of the voltage waveform and comparing the normalized voltage waveform with the threshold H again, it may be possible to determine the passage start point at which a person starts passing over the sensor 1 more correctly than the passage start point of each passage section set at the present time.

Further, by comparing an average value of the amplitudes V of the respective indexes j included in a certain section with the threshold H instead of comparing the amplitude V with the threshold H for each index j, it may be possible to detect the passage end point of the passage section that cannot be detected by the processing from step S21 to step S24 in FIG. 15.

Thus, in the waveform label setting processing of step S27 of FIG. 15, the voltage waveform represented by the preprocessing target data for which the waveform length correction processing has been completed is normalized again and compared with the threshold H, whereby the passage start point of each passage section is re-detected, and the average value of the amplitudes V of the indexes j included in the certain section after the detected passage start point is compared with the threshold H, whereby the passage end point of each passage section is re-detected.

Figure 45:
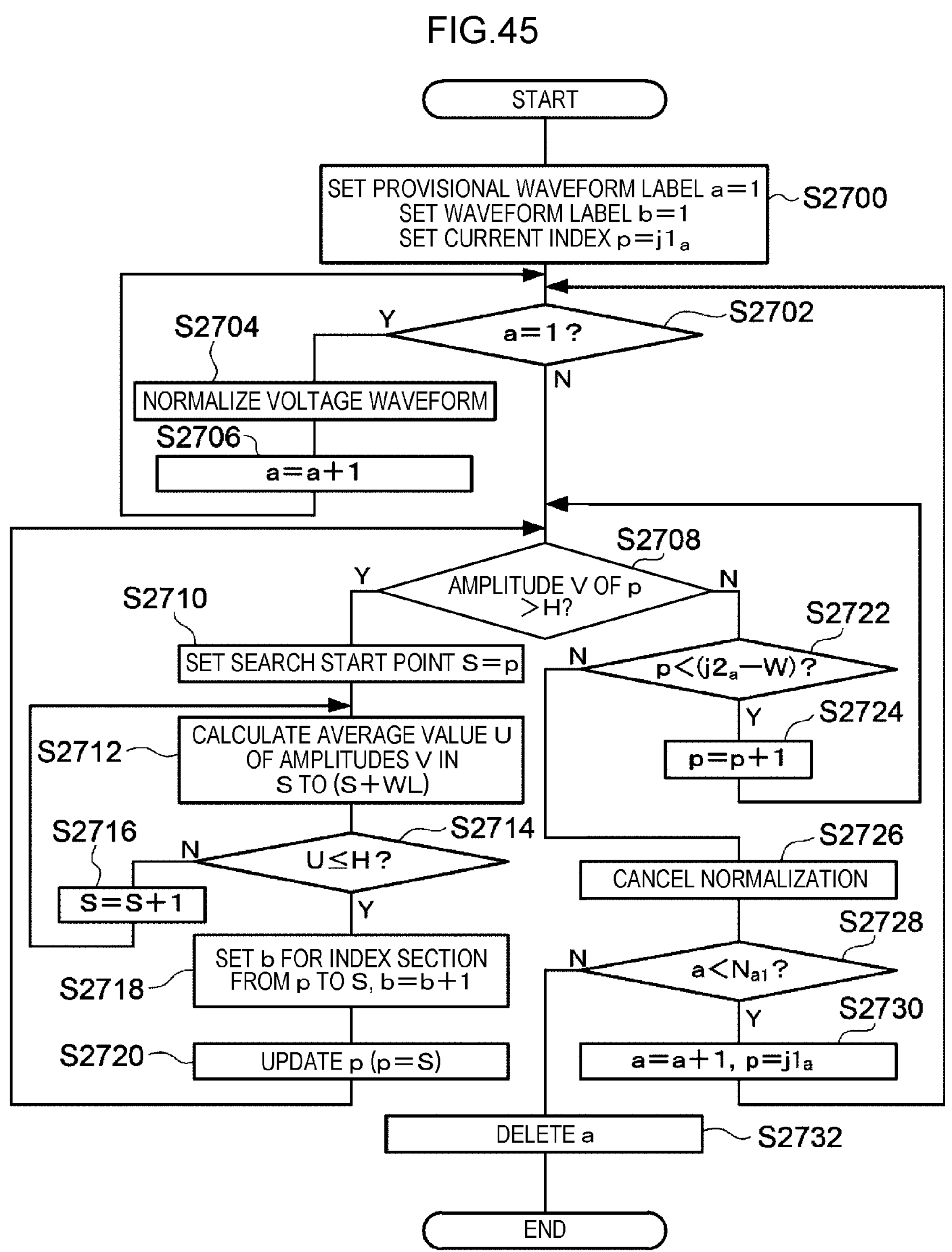
FIG. 45 is a flowchart illustrating an example of a flow of waveform label setting processing.

FIG. 45 is a flowchart illustrating an example of a flow of the waveform label setting processing.

FIG. 46 is a diagram illustrating an example of the preprocessing target data on which the waveform length correction processing is performed, and is input data of the waveform label setting processing.

In step S2700 of FIG. 45, the CPU 21 executes initial processing of setting the provisional waveform label a to "1", the waveform label b to "1", and a current index p to "$j1_a$". The current index p is a variable that temporarily stores the designated index j.

Figure 47:
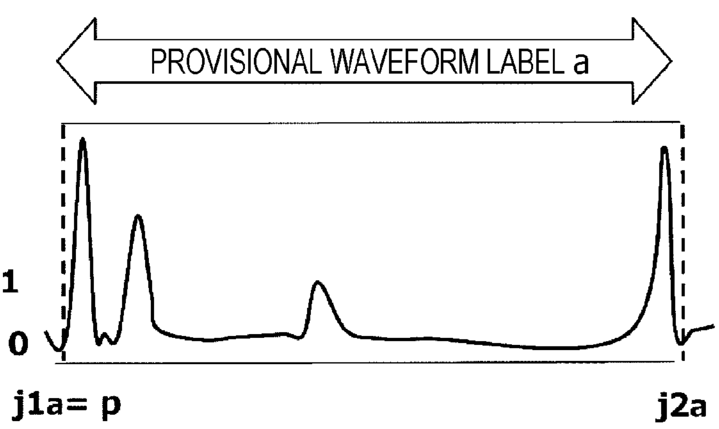
FIG. 47 is a diagram illustrating a situation example after initial processing of the waveform label setting processing is executed.

FIG. 47 is a diagram illustrating a position of the current index p after the processing of step S2700 is executed.

In step S2702, the CPU 21 determines whether or not the provisional waveform label a is "1". In a case where the provisional waveform label a is "1", the processing proceeds to step S2704.

In step S2704, the CPU 21 normalizes the voltage waveform in units of sections of the provisional waveform label a so that the amplitude V of the voltage waveform falls within the range of greater than or equal to 0 and less than or equal to 1 for each of the voltage waveforms with which the provisional waveform labels a=1 to $N_{a1}$ are associated.

In step S2706, the CPU 21 adds "1" to the provisional waveform label a to update the provisional waveform label a, and proceeds to step S2702.

Since it is determined that the provisional waveform label a is not "1" in the determination processing of the next step S2702, the processing proceeds to step S2708.

In step S2708, the CPU 21 determines whether or not the amplitude V at the current index p exceeds the threshold H. In a case where the amplitude V at the current index p exceeds the threshold H, the processing proceeds to step S2710. Note that, in the determination processing of step S2708 executed first, since the index j of the passage start point at the provisional waveform label a=1 is set in the current index p, the amplitude V at the current index p should exceed the threshold H.

In step S2710, the CPU 21 sets the current index p for the search start point S to temporarily store the current index p at the present time.

In step S2712, the CPU 21 calculates an average value U of the amplitudes V at respective indexes j included in a section from the search start point S to the index j separated backward by WL. Hereinafter, a section from the search start point S to the index j separated backward by WL is referred to as a "moving average section WL". The length of the moving average section WL is represented by the number of indexes j included in the section.

In step S2714, the CPU 21 determines whether or not the average value U calculated in step S2712 is less than or equal to the threshold H. In a case where the average value U is not less than or equal to the threshold H, the processing proceeds to step S2716.

Figure 48:
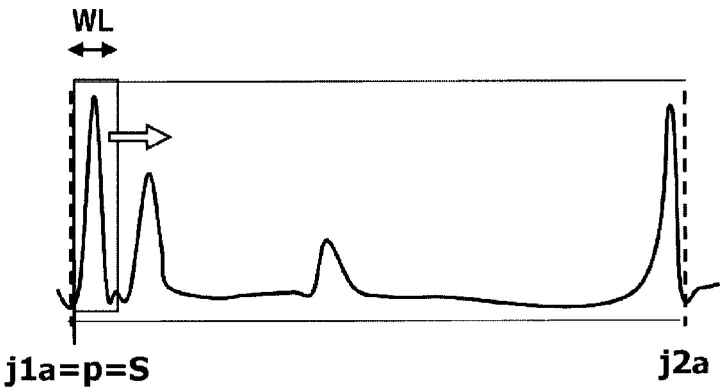
FIG. 48 is a diagram illustrating a state in which a moving average section moves.

In step S2716, the CPU 21 adds "1" to the search start point S to update the search start point S, and proceeds to step S2712. That is, the CPU 21 repeatedly executes processing of calculating the average value U by shifting the moving average section WL backward by one index until it is determined in the determination processing of step S2714 that the average value U is less than or equal to the threshold H. FIG. 48 is a diagram illustrating a state in which the moving average section WL starting from the search start point S moves behind the indexes j arranged in ascending order.

In a case where it is determined in the determination processing of step S2714 that the average value U is less than or equal to the threshold H, the processing proceeds to step S2718.

Figure 49:
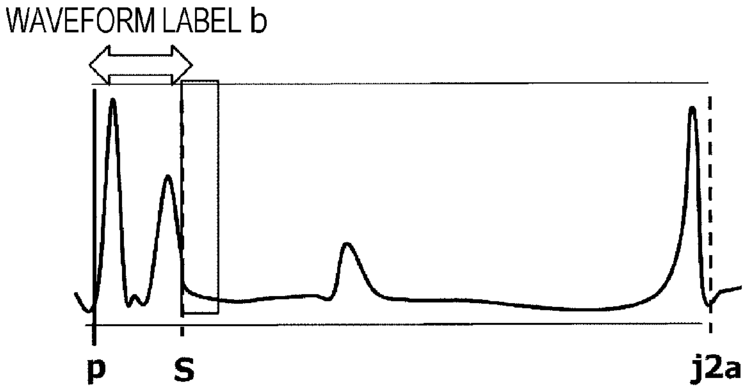
FIG. 49 is a diagram illustrating a state in which a waveform label is set for an index section from a current index to a search start point.

Since the average value U is less than or equal to the threshold H at a position of a current search start point S, in step S2718, the CPU 21 sets the waveform label b by regarding, as the passage section, an index section having the current index p as the passage start point and the search start point S as the passage end point, and adds "1" to the waveform label b. FIG. 49 is a diagram illustrating a state in which the waveform label b is set for an index section from the current index p to the search start point S.

Figure 50:
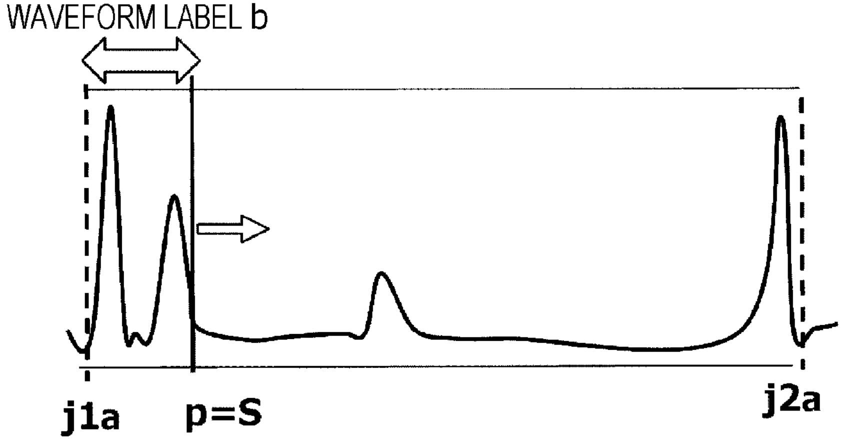
FIG. 50 is a diagram illustrating a state in which a position of the current index is moved to a position of the search start point.

In step S2720, the CPU 21 sets the search start point S for the current index p to update the current index p. As a result, the position of the current index p moves to the position of the search start point S. FIG. 50 is a diagram illustrating a state in which the position of the current index p illustrated in FIG. 49 is moved to the position of the search start point S.

After executing the processing of step S2720, the CPU 21 proceeds to step S2708.

Since the passage end point of the waveform label b is detected by the above processing, the passage start point of the next passage section is detected this time.

The amplitude V of the index j after the passage end point of the waveform label b is detected is less than or equal to the threshold H until the passage start point of the next passage section is detected. Thus, in a case where it is determined in the determination processing of step S2708 that the amplitude V at the current index p is less than or equal to the threshold H, the processing proceeds to step S2722.

In step S2722, the CPU 21 determines whether or not the current index p is less than ($j\mathbf{2}_a$−W). In a case where the current index p is less than ($j\mathbf{2}_a$−W), the processing proceeds to step S2724.

The fact that the current index p is less than ($j\mathbf{2}_a$−W) means that the current index p has not moved to the position of the index j that is forward from the passage end point of the provisional waveform label a by the minimum inter-waveform distance W. Thus, in step S2724, the CPU 21 adds "1" to the current index p to update the current index p, and proceeds to step S2708. That is, in a case where it is determined in the determination processing of step S2708 that the amplitude V at the current index p is less than or equal to the threshold H, the CPU 21 increases the current index p by one until the current index p reaches the index j represented by ($j\mathbf{2}_a$−W).

Figure 51:
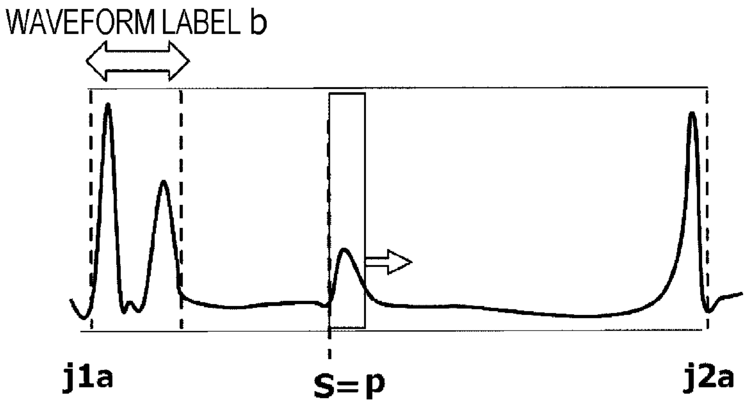
FIG. 51 is a diagram illustrating a state in which a passage start point of a passage section is recorded.
Figure 52:
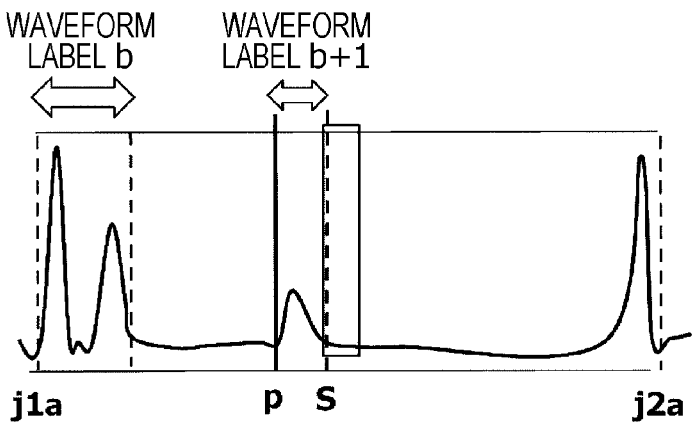
FIG. 52 is a diagram illustrating a state in which a next waveform label is set.

While the current index p is increased by one, when the current index p at which the amplitude V exceeds the threshold H is detected in the determination processing of step S2708, the CPU 21 executes the processing of steps S2710 to S2720 already described. As a result, the CPU 21 sets the current index p for the search start point S, records the passage start point of the passage section (see FIG. 51), detects the search start point S at which the average value U of the amplitudes V in the moving average section WL is less than or equal to the threshold H, and sets the waveform label b+1 for the index section from the current index p to the search start point S (see FIG. 52).

On the other hand, in a case where it is determined in the determination processing of step S2722 that the current index p has reached ($j\mathbf{2}_a$−W), the processing proceeds to step S2726.

In step S2726, the CPU 21 cancels the normalization of the voltage waveform in one provisional waveform label a from the index $j\mathbf{1}_a$ to the index $j\mathbf{2}_a$, and returns the voltage waveform for which the provisional waveform label a is set to the voltage waveform of the original scale.

In step S2728, the CPU 21 determines whether or not the provisional waveform label a is less than $N_{a1}$. If the provisional waveform label a is less than $N_{a1}$, the processing proceeds to step S2730.

In this case, since the provisional passage section for which the provisional waveform label a is set still exists, in step S2730, the CPU 21 adds "1" to the provisional waveform label a to update the provisional waveform label a, sets the passage start point $j\mathbf{1}_a$ of the passage section represented by the updated provisional waveform label a for the current index p, and proceeds to step S2702. That is, until it is determined in the determination processing of step S2728 that the value of the provisional waveform label a has reached $N_{a1}$, the CPU 21 repeatedly executes processing of detecting the passage start point and the passage end point from the voltage waveform for which the provisional waveform label a is set and setting the waveform label b.

On the other hand, in a case where it is determined in the determination processing of step S2728 that the provisional waveform label a has reached $N_{a1}$, the processing proceeds to step S2732.

In this case, the CPU 21 has detected the passage start point and the passage end point from all the voltage waveforms with which the provisional waveform labels a are associated. Thus, in step S2732, the CPU 21 deletes the provisional waveform label a from the preprocessing target data, and ends the waveform label setting processing illustrated in FIG. 45.

FIG. 53 is a diagram illustrating an example of the preprocessing target data after the waveform label setting processing is executed. "B" in the waveform label b is the number of voltage waveforms in the passage section with which the waveform label b is associated by the waveform label setting processing. In addition. "$J_B$" is the index j representing the passage end point of the passage section with which the waveform label b=B is associated.

Note that, after executing the waveform label setting processing illustrated in FIG. 45, the CPU 21 may execute the afterwave search processing and the extreme value search processing of steps S22 and S23 in FIG. 15 to adjust the passage end point of the passage section with which the waveform label b is associated.

On the basis of the provisional waveform label a set by the provisional waveform label processing of step S25 in FIG. 15, in the passage section with which the waveform label b is associated by the waveform label setting processing of step S27 in FIG. 15, detection is not performed of the minute time in which the amplitude V of the voltage waveform momentarily decreases to less than or equal to the threshold H and then increases, as performed in the first adjacent waveform combination processing performed in step S24 in FIG. 15.

Thus, in the second adjacent waveform combination processing of step S28 of FIG. 15, the minute time generated when multiple people pass over the sensor 1 is detected from the voltage waveform represented by the preprocessing target data, and the voltage waveforms for which waveform labels b are set adjacent to each other with the minute time interposed therebetween are combined together.

Figure 54:
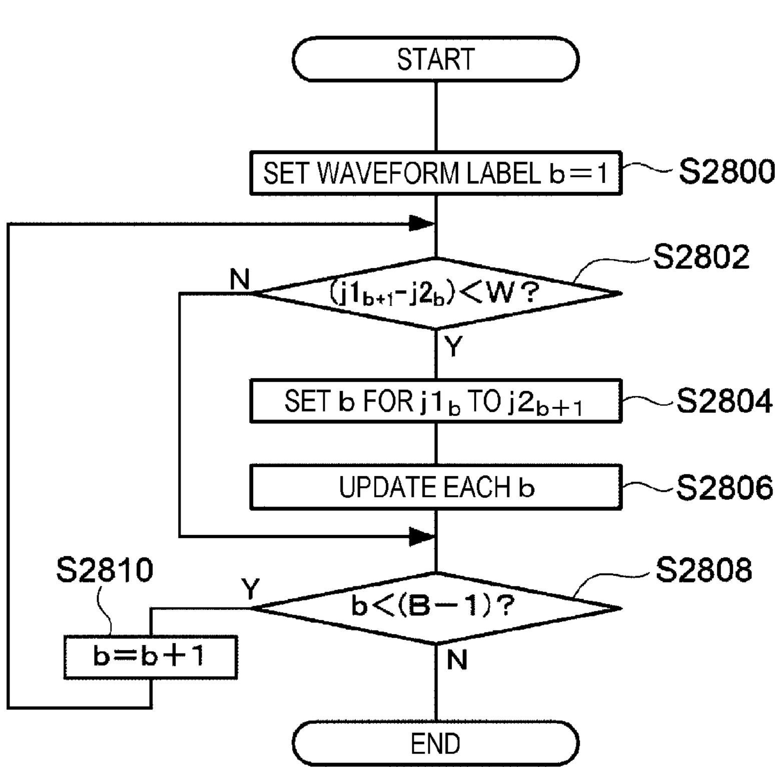
FIG. 54 is a flowchart illustrating an example of a flow of second adjacent waveform combination processing.
Figure 56:
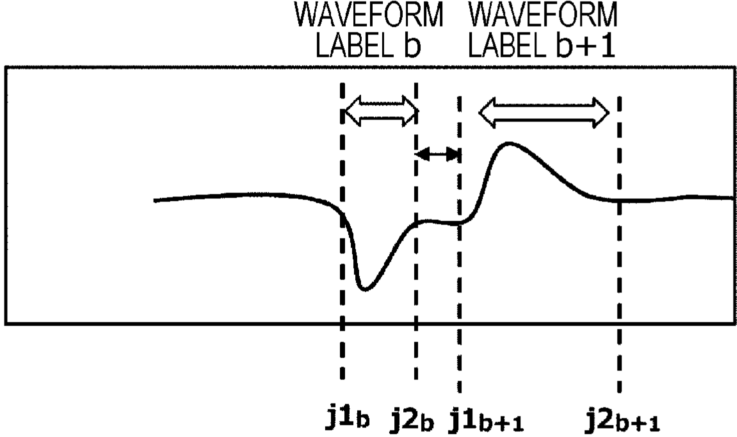
FIG. 56 is a diagram illustrating an example of a waveform label set to a voltage waveform obtained from the input data of the second adjacent waveform combination processing.

FIG. 54 is a flowchart illustrating an example of a flow of the second adjacent waveform combination processing. In addition, FIG. 55 is a diagram illustrating a preprocessing target data example on which the waveform label setting processing is executed, and is input data of the second adjacent waveform combination processing. FIG. 56 is a diagram illustrating, in the voltage waveform obtained from the preprocessing target data illustrated in FIG. 55, positions of indexes $j\mathbf{1}_b$ and $j\mathbf{2}_b$ respectively corresponding to the passage start point and the passage end point of the passage section represented by the waveform label b, and positions of indexes $j\mathbf{1}_{b+1}$ and $j\mathbf{2}_{b+1}$ respectively corresponding to the passage start point and the passage end point of the passage section represented by the waveform label b+1.

In step S2800 of FIG. 54, the CPU 21 executes initial processing of setting the waveform label b to "1".

In step S2802, the CPU 21 determines whether or not an interval between the passage end point $j\mathbf{2}_b$ of the passage section represented by the waveform label b and the passage start point $j\mathbf{1}_{b+1}$ of the adjacent next passage section represented by the waveform label b+1, that is, an inter-adjacent-waveform distance ($j\mathbf{1}_{b+1}$−$j\mathbf{2}_b$) is less than the minimum inter-waveform distance W. If the inter-adjacent-waveform distance ($j\mathbf{1}_{b+1}$−$j\mathbf{2}_b$) is less than the minimum inter-waveform distance W, the processing proceeds to step S2804.

In this case, the passage section represented by the waveform label b and the passage section represented by the waveform label b+1 each represent one section of the same passage section corresponding to a series of passing actions in which a person passes over the sensor 1. Thus, in step S2804, the CPU 21 sets the waveform label b for a section from the index $j1_b$ to the index $j2_{b+1}$, and combines the passage section represented by the waveform label b with the passage section represented by the waveform label b+1.

As the passage sections are combined together, the arrangement of the waveform labels b arranged in ascending order becomes discontinuous, and thus, in step S2806, the CPU 21 updates values of the waveform labels b so that the arrangement of the waveform labels b is continuous in order from 1, and proceeds to step S2808. Note that, as the values of the waveform labels b are updated, the maximum value B of the waveform label is also updated. Specifically, the maximum value B of the waveform label decreases by one.

On the other hand, in a case where it is determined in the determination processing of step S2802 that the inter-adjacent-waveform distance ($j1_{b+1}-j2_b$) is greater than or equal to the minimum inter-waveform distance W, the passage section represented by the waveform label b and the passage section represented by the waveform label b+1 are passage sections corresponding to respective passing actions. Thus, the CPU 21 proceeds to step S2808 without executing the processing of steps S2804 and S2806.

In step S2808, the CPU 21 determines whether or not the waveform label b is less than (B−1). If the waveform label b is less than (B−1), the processing proceeds to step S2810.

In step S2810, the CPU 21 adds "1" to the waveform label b to update the waveform label b, and proceeds to step S2802. That is, until it is determined in the determination processing of step S2808 that the waveform label b reaches (B−1), the CPU 21 compares the inter-adjacent-waveform distance ($j1_{b+1}-j2_b$) between adjacent voltage waveforms corresponding to the respective passage sections with the minimum inter-waveform distance W, sets the same waveform label b for voltage waveforms of which the inter-adjacent-waveform distance ($j1_{b+1}-j2_b$) is less than the minimum inter-waveform distance W. and regards the voltage waveforms as the voltage waveforms corresponding to one continuous passage section.

On the other hand, in a case where it is determined in the determination processing of step S2808 that the waveform label b has reached (B−1), the second adjacent waveform combination processing illustrated in FIG. 54 is ended.

Figure 58:
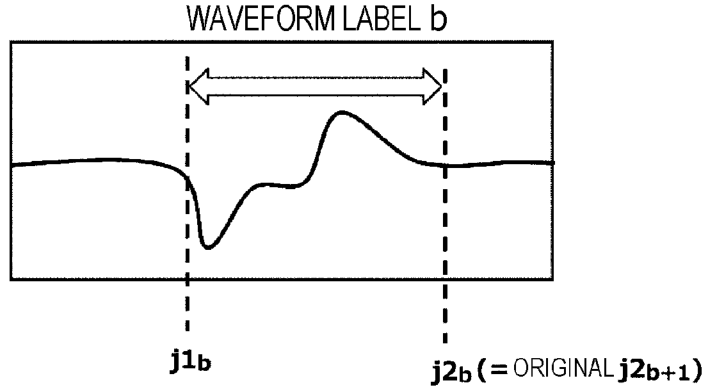
FIG. 58 is a diagram illustrating a voltage waveform example obtained from preprocessing target data after the second adjacent waveform combination processing is executed and an example of setting a waveform label.

FIG. 57 is a diagram illustrating a preprocessing target data example after the second adjacent waveform combination processing is executed on the preprocessing target data illustrated in FIG. 55, and FIG. 58 is a diagram illustrating a voltage waveform example obtained from the preprocessing target data illustrated in FIG. 57 and a setting example of the waveform label b. A value $B_a$ in FIG. 57 represents a maximum value of the waveform label b after the execution of the second adjacent waveform combination processing, and $B_a \leq B$.

In a case where the inter-adjacent-waveform distance ($j1_b+-j2_b$) between the passage section represented by the waveform label b and the passage section represented by the waveform label b+1 illustrated in FIG. 56 is less than the minimum inter-waveform distance W, as illustrated in FIG. 58, the passage section represented by the waveform label b and the passage section represented by the waveform label b+1 are combined together, and the same waveform label b is set for a range from the passage start point $j1_b$ of the passage section represented by waveform label b to the passage end point $j2_{b+1}$ (corresponding to the index $j2_b$ in FIG. 58) of the passage section represented by the original waveform label b+1, and the voltage waveforms are treated as a voltage waveform corresponding to one continuous passage section.

That is, in the data preprocessing, with respect to the voltage waveform represented by the voltage data of the additional training data, the passage start point and the passage end point of the person passing through the predetermined area are set on the basis of the threshold H. and adjustment of bringing the passage start point and the passage end point set by using the threshold H closer to the passage start point and the passage end point of the person actually passing through the predetermined area is performed on the basis of features of the voltage waveform such as the inter-waveform distance between the voltage waveforms corresponding to the passage sections, the waveform length, the presence or absence of the extreme value, and the afterwave.

As described above, the waveform label b is set for the voltage data of the additional training data, whereby the preprocessed additional training data is generated obtained by dividing the voltage waveform represented by the voltage data for each passage section, and the data preprocessing of step S2 illustrated in FIG. 11 is ended.

The voltage waveform divided for each passage section in this manner is not associated with the correct number of people passing over the sensor 1 in the passage section. Thus, in the data combination processing of step S3 illustrated in FIG. 11, the CPU 21 associates the correct number of people in the number-of-people-passing data collected together with the voltage data of the additional training data with each voltage waveform in the preprocessed additional training data divided for each passage section.

Figure 59:
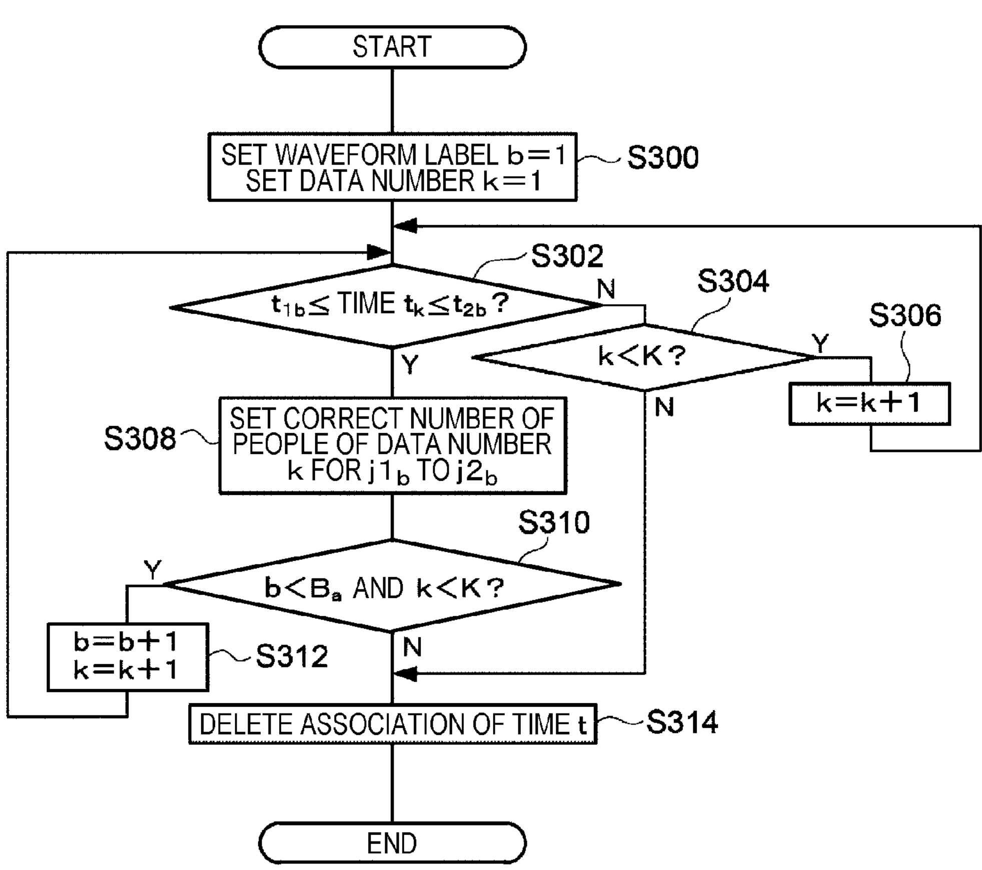
FIG. 59 is a flowchart illustrating an example of a flow of data combination processing.

FIG. 59 is a flowchart illustrating an example of a flow of the data combination processing. FIG. 60 is a diagram illustrating an example of the preprocessed additional training data that is input data of the data combination processing.

For convenience of description, a time of the index $j1_b$ at the passage start point of the waveform label b is "$t1_b$", a time of the index $j2_b$ at the passage end point of the waveform label b is "$t2_b$", and a time set for the data number k is "$t_k$".

In step S300 of FIG. 59, the CPU 21 executes initial processing of setting the waveform label b (b=1 to $B_a$) of the preprocessed additional training data to "1" and setting the data number k (k=1 to K) of the number-of-people-passing data to "1".

In step S302, the CPU 21 determines whether or not the time $t_k$ is after the time $t1_b$ and before the time $t2_b$. In a case where the time $t_k$ is not included in a section (hereinafter, referred to as a "reference section") after the time $t1_b$ and before the time $t2_b$, the processing proceeds to step S304.

In step S304, the CPU 21 determines whether or not the data number k is less than the value K indicating the number of pieces of the number-of-people-passing data. In a case where the data number k is less than the value K, the processing proceeds to step S306.

In step S306, the CPU 21 adds "1" to the data number k to update the data number k, and proceeds to step S302. That is, until it is determined in the determination processing of step S304 that the data number k has reached the value K, the CPU 21 repeatedly determines whether or not the time $t_k$ of the data number k is included in the reference section.

In a case where it is determined in the determination processing of step S302 that the time $t_k$ is included in the reference section, the processing proceeds to step S308.

The fact that the time $t_k$ is included in the reference section means that the number of people passing represented by the correct number of people of the data number k has passed over the sensor 1 in the passage section with which the waveform label b is associated. Thus, in step S308, the CPU 21 sets the correct number of people of the data number k for the passage section from the index $t1_b$ to the index $j2_b$, and associates the correct number of people with the voltage waveform of the passage section for which the waveform label b is set.

In step S310, the CPU 21 determines whether or not the waveform label b is less than the value $B_a$ and the data number k is less than the value K. In a case where the waveform label b is less than the value $B_a$ and the data number k is less than the value K, the processing proceeds to step S312.

In step S312, the CPU 21 adds "1" to the waveform label b to update the waveform label b, adds "1" to the data number k to update the data number k, and proceeds to step S302. That is, the CPU 21 associates the correct number of people with the next passage section.

On the other hand, in a case where it is determined in the determination processing of step S304 that the data number k has reached the value K. or in a case where it is determined in the determination processing of step S310 that the waveform label b has reached the value $B_a$, or the data number k has reached the value K, the processing proceeds to step S314.

In this case, since the correct numbers of people are associated with all the passage sections, in step S314, the CPU 21 deletes the time t set in the preprocessed additional training data and ends the data combination processing illustrated in FIG. 59. By the data combination processing, the combined additional training data as illustrated in FIG. 8 is generated from the preprocessed additional training data illustrated in FIG. 60.

In the voltage waveform for each waveform label b in the combined additional training data, and the voltage waveform for each waveform label b in the extended training data generated in the data extension processing of step S1 illustrated in FIG. 11, with which the correct numbers of people are associated, the waveform lengths are not unified, so that the voltage waveforms cannot be used for machine learning of the learning model as they are.

Thus, in the data post-processing of step S4 illustrated in FIG. 11, the CPU 21 executes down-sampling and zero padding on the voltage waveforms of the extended training data and the combined additional training data for which the waveform labels b are set, and shapes the voltage waveform lengths of the voltage waveforms for which the waveform labels b are set to the same predetermined length.

Figure 61:
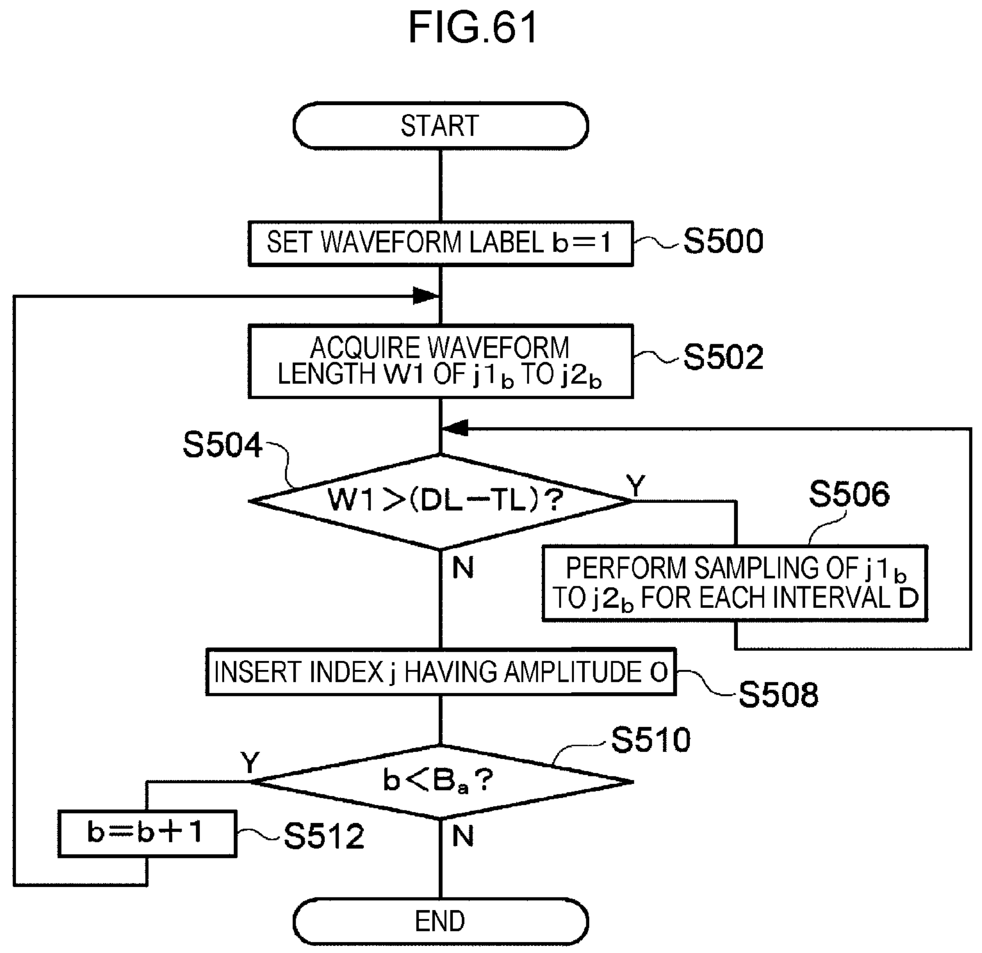
FIG. 61 is a flowchart illustrating an example of a flow of data post-processing.

FIG. 61 is a flowchart illustrating an example of a flow of the data post-processing. The CPU 21 executes the data post-processing illustrated in FIG. 61 for each of the extended training data and the combined additional training data. Here, as an example, an example of executing the data post-processing on the combined additional training data will be described, but the CPU 21 executes the same processing also on the extended training data.

First, in step S500, the CPU 21 executes initial processing of setting the waveform label b to "1".

In step S502, the CPU 21 acquires an interval between the index $j1_b$ corresponding to the passage start point of the passage section represented by the waveform label b of the combined additional training data and the index $j2_b$ corresponding to the passage end point of the passage section, that is, a waveform length W1.

In step S504, the CPU 21 determines whether or not the waveform length W1 acquired in step S502 is longer than (DL−TL). Here, "DL" is a reference waveform length, and "TL" is an additional waveform length for performing zero padding for setting the amplitude V of the corresponding section to 0 V. Both the reference waveform length DL and the additional waveform length TL are waveform lengths common to the combined additional training data and the extended training data, and are stored in the nonvolatile memory 24 in advance. The additional waveform length TL is preferably set to about 5% of the reference waveform length DL. For example, if the reference waveform length DL is "2000", the additional waveform length TL is set to "100", but the lengths of the reference waveform length DL and the additional waveform length TL are not limited thereto.

In a case where the waveform length W1 is longer than (DL−TL), the processing proceeds to step S506.

In this case, it is necessary to shorten the waveform length W1 of the voltage waveform in a range for which the waveform label b is set. Thus, in step S506, the CPU 21 performs down-sampling of the voltage waveform with which the waveform label b is associated at a sampling interval D longer than a sampling interval of the sensor data in the sensor 1 to shorten the waveform length W1.

Figure 62:
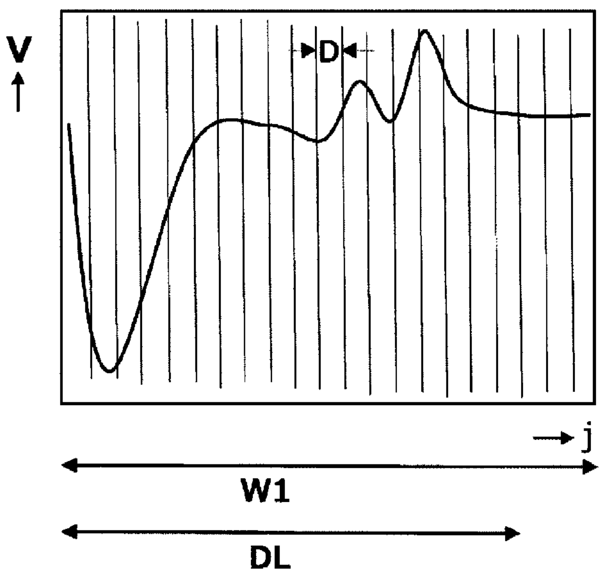
FIG. 62 is a diagram illustrating a state in which down-sampling is performed on a voltage waveform.
Figure 63:
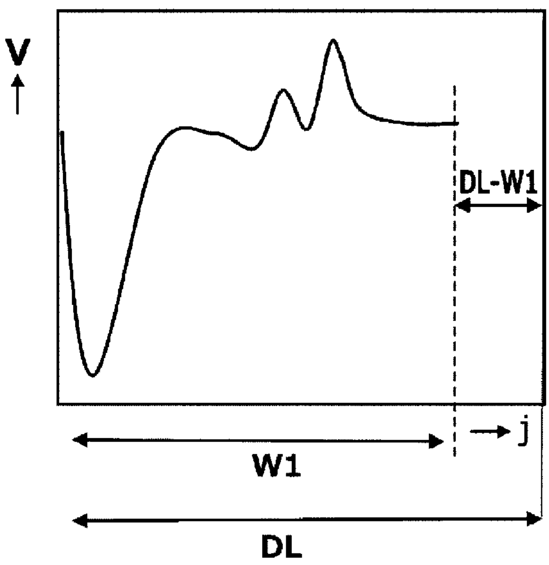
FIG. 63 is a diagram illustrating an example of a voltage waveform subjected to down-sampling.

FIG. 62 is a diagram illustrating a state in which down-sampling is performed on the voltage waveform with which the waveform label b=1 is associated at the sampling interval D and an example of the combined additional training data at this time. In addition, FIG. 63 is a diagram illustrating an example of a voltage waveform in which the waveform length W1 is shorter than the reference waveform length DL by the down-sampling in step S506 and the combined additional training data at this time. In the combined additional training data illustrated in FIG. 63, a state is represented in which the combined additional training data of at least the index j=3 is thinned out by down-sampling, for example.

Then, the CPU 21 shifts the processing to step S504 of FIG. 61. That is, the CPU 21 repeatedly executes the down-sampling until it is determined in the determination processing of step S504 that the waveform length W1 is less than or equal to (DL−TL).

On the other hand, in a case where it is determined in the determination processing of step S504 that the waveform length W1 is less than or equal to (DL−TL), the processing proceeds to step S508.

Figure 64:
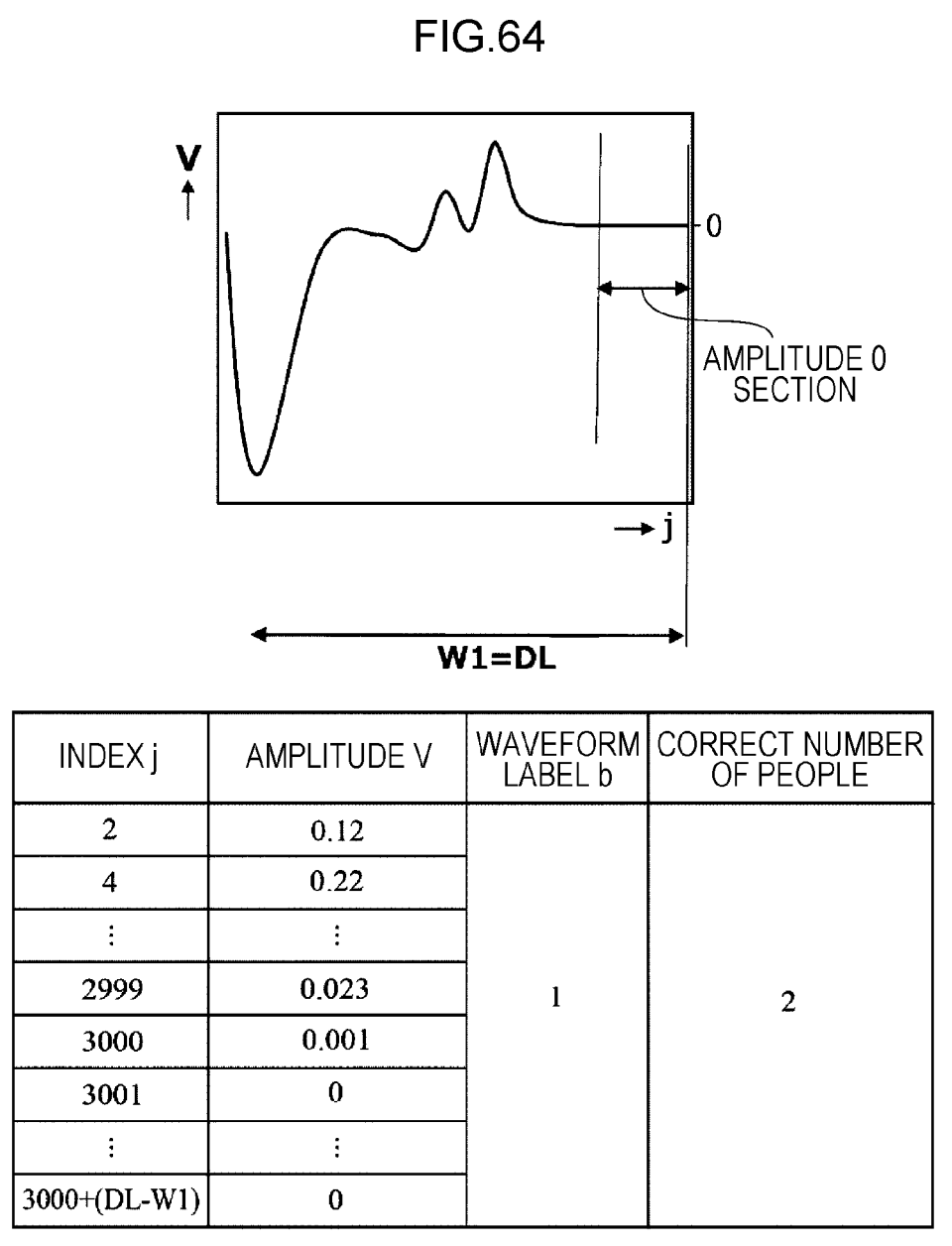

In step S508, the CPU 21 inserts the index j having the amplitude 0 until the waveform length W1 becomes the reference waveform length DL behind the index j2 of the waveform label b in which the waveform length W1 is less than or equal to (DL−TL). FIG. 64 is a diagram illustrating an example of a voltage waveform with which the waveform label b=1 in a case where (DL−W1) indexes j having the amplitude V of 0 V are inserted is associated after the post-processed additional training data illustrated in FIG. 63 and the post-processed additional training data generated for the waveform label b=1. As illustrated in FIG. 64, in the voltage waveform with which the waveform label b=1 is associated, the waveform length W1 is shaped to the reference waveform length DL.

In step S510 of FIG. 61, the CPU 21 determines whether or not the waveform label b is less than the value $B_a$ representing the maximum value of the waveform label b. If waveform label b is less than value $B_a$, the processing proceeds to step S512.

In this case, there is still a voltage waveform associated with the waveform label b in which the waveform length W1 is not shaped to the reference waveform length DL. Thus, in step S512, the CPU 21 adds “1” to the waveform label b to update the waveform label b, and proceeds to step S502. That is, the CPU 21 generates post-processed additional training data in which the waveform length W1 is shaped to the reference waveform length DL for all the voltage waveforms with which the waveform labels b=1 to $B_a$ included in the combined additional training data are associated. In a case where it is determined in the determination processing of step S510 that the waveform label b has reached the value $B_a$, the data post-processing illustrated in FIG. 61 is ended.

In a case where the data post-processing is performed on the extended training data, it is sufficient that the “combined additional training data” is read as the “extended training data” and the “post-processed additional training data” is read as the “post-processed training data” in the description of the flow of the data post-processing performed by using FIG. 61.

The CPU 21 executes the model learning processing of step S5 illustrated in FIG. 11 by using the post-processed training data and the post-processed additional training data generated in the data post-processing.

Input data of the learning model is the amplitude V of each index j constituting the voltage waveform associated with the waveform label b, and the CPU 21 performs machine learning of the learning model so that output data in a case where the input data is input to the learning model approaches the correct number of people associated with the waveform label b, and generates a learned model.

Thus, the learning processing illustrated in FIG. 11 is ended.

Next, a description will be given of estimation processing of estimating a people flow in the real space where the sensor 1 is installed from the measurement data collected by the measurement data collection unit 8 by using the learned model generated in the learning processing. The estimation program that defines the estimation processing is stored in advance in, for example, the ROM 22 of the estimation device 2. The CPU 21 of the estimation device 2 reads the estimation program stored in the ROM 22 and executes the estimation processing.

The CPU 21 executes the data preprocessing of step S2 illustrated in FIG. 11 on the collected measurement data, and generates preprocessed measurement data in which the voltage waveform is divided for each passage section by the waveform label b. Since the voltage waveform lengths for respective waveform labels b are not unified in the preprocessed measurement data similarly to the extended training data and the combined additional training data, the CPU 21 executes the data post-processing of step S4 illustrated in FIG. 11 to generate post-processed measurement data in which the voltage waveform length is shaped to the reference waveform length DL.

The CPU 21 inputs the amplitude V of each index j constituting the voltage waveform associated with the waveform label b of the post-processed measurement data to the learned model generated in the learning processing. As a result, as illustrated in FIG. 9, the estimated number of people passing over the sensor 1 in the real space in the passage section represented by the waveform label b is output for each waveform label b as an output value of the learned model.

FIG. 65 is a diagram illustrating a verification result example of the division accuracy of the voltage waveform divided for each passage section by the data preprocessing, and the people flow estimation accuracy by the learned model obtained by the learning processing, in a case where the measurement data actually collected by the sensor 1 installed in the predetermined area of the real space is used. To verify the division accuracy of the voltage waveform of the sensor 1 and the people flow estimation accuracy, the person in charge of measurement visually has confirmed the number of people passing and the passage time for the measurement data used for verification in the same manner as in the collection of the additional training data, and a true value of the number of passage sections and a true value of the number of people passing for each passage section has been obtained.

As illustrated in FIG. 65, with respect to a true value of 453 of the number of passage sections, the maximum value of the waveform label b of the preprocessed measurement data was 415. That is, 415 passage sections has been extracted from the measurement data by the data preprocessing. This means that the estimation device 2 has extracted the passage sections from the measurement data with an error rate of 8%.

In addition, as illustrated in FIG. 65, with respect to the true value 499 of the number of people passing, the number of people passing estimated by the learned model from the post-processed measurement data was 487. This means that the estimation device 2 has estimated the number of people passing through the sensor 1 from the measurement data with an error rate of 3%.

When the division of the number of passage sections and the estimation of the number of people passing are considered in more detail, for both of them, the error rate is the highest in a case where a correct answer label indicating the correct number of people is two, and the error rate is the second highest in a case where the correct answer label is one. In addition, regarding the division of the number of passage sections and the estimation of the number of people passing in a case where the correct answer label was greater than or equal to three, the error rate was 0%.

As described above, according to the technology of the present disclosure, the estimation device 2 can estimate the people flow more accurately than other estimation devices that estimate the people flow using only the threshold determination for the voltage waveform output by the sensor 1.

<Modification 1 Regarding People Flow Estimation>

In the above description, in a case where the machine learning of the learning model is performed by the model learning unit 12, the vector of the amplitude V whose number of dimensions is the reference waveform length DL is used as the input data; however, the post-processed training data and the post-processed additional training data may be converted into an amplitude image 30 representing a change in amplitude, and the amplitude image may be used as the input data.

For example, the p-th amplitude V from the front of the index j constituting the voltage waveform associated with each waveform label b is set as “$V_p$”, the number of rows of the amplitude image 30 is set as “F”, and the number of columns of the amplitude image 30 is set as the reference waveform length DL. In addition, a maximum value of an absolute value of each amplitude V in the post-processed training data and the post-processed additional training data is set as “$V_{max}$”.

In this case, the CPU 21 converts the voltage waveform associated with each waveform label b included in the post-processed training data and the post-processed additional training data into the amplitude image 30 by setting values of the $F(V_{max}-V_p)/2V_{max}$-th row and the p-th column to "1" and the other values to "0".

The CPU 21 may directly input the amplitude image 30 to the learning model, or may further perform conversion processing on the amplitude image 30.

For example, the CPU 21 may perform wavelet transform on the amplitude image 30 to generate a power spectrogram 31 and a phase spectrogram 32 from the amplitude image 30, and may use the generated spectrograms as input data of the learning model.

Figure 66:
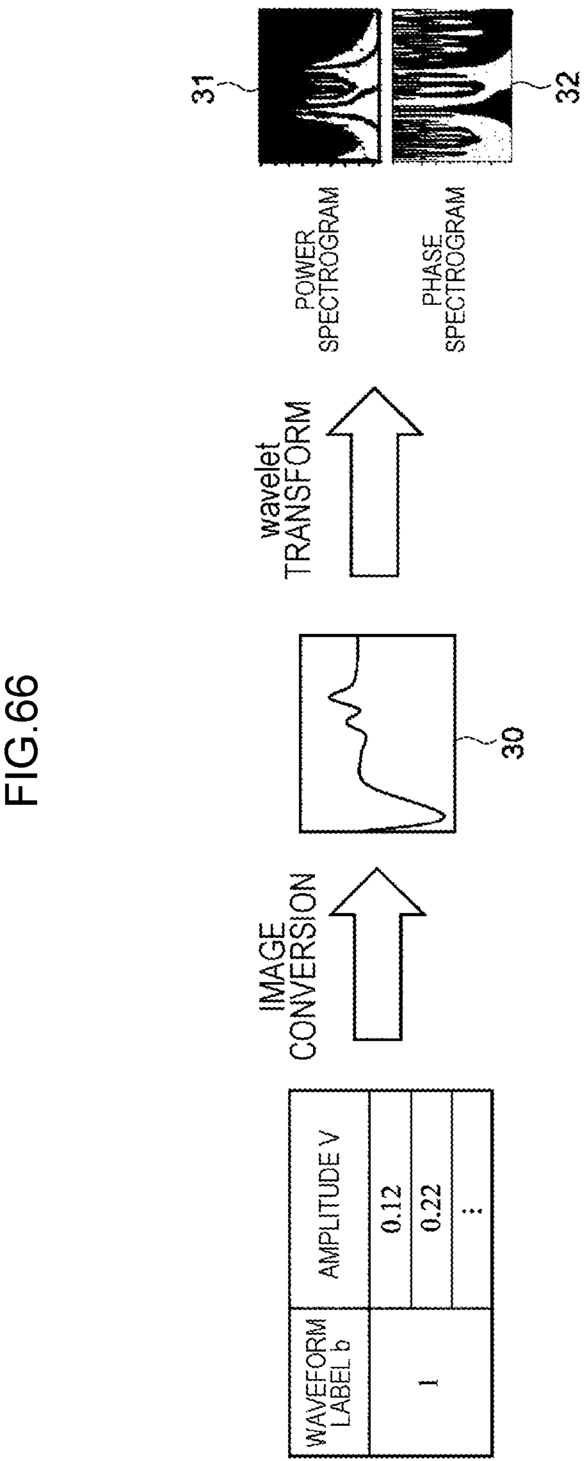
FIG. 66 is a schematic diagram schematically illustrating a flow of imaging a voltage waveform.

FIG. 66 is a diagram illustrating a state in which the amplitude V of the voltage waveform associated with each waveform label b included in the post-processed training data and the post-processed additional training data is converted into the amplitude image 30 and further converted into the power spectrogram 31 and the phase spectrogram 32 by wavelet transform. A line portion in the amplitude image 30 of FIG. 66 corresponds to a portion where the value is set to "1".

In a case where images such as the amplitude image 30, the power spectrogram 31, and the phase spectrogram 32 are used for the machine learning of the learning model, for example, a convolutional neural network (CNN) disclosed in Non Patent Literature 3 can be used.

[Non Patent Literature 3]

Y. LeCun, L. Bottou, Y. Bengio, and P. Haffner. Gradiend-based learning applied to document recognition. Proc. of the IEEE, pages 2278-2324, 1998

As a matter of course, in a case where people flow estimation is performed with a learned model for which machine learning is performed by using an image such as the amplitude image 30, post-processed measurement data is also subjected to similar imaging and input to the learned model.

By imaging the input data used for the machine learning of the learning model in this manner, the learning model learns a feature value of two-dimensional information that cannot be obtained from the vector of the amplitude V. As a result, in a case where people flow estimation is performed with a learned model for which machine learning is performed by using an image, estimation accuracy may be improved as compared with a case where people flow estimation is performed with a learned model for which machine learning is performed by using the vector of the amplitude V.

<Modification 2 Regarding People Flow Estimation>

So far, the example has been described in which the estimation device 2 estimates the people flow from the number of people passing through the predetermined area of the real space: however, the estimation device 2 may estimate an attribute of a person passing through the predetermined area in addition to the number of people passing.

Here, the "attribute of a person" is a factor that affects the voltage waveform output by the sensor 1 due to a feature of a change in a load of stepping on the sensor 1 caused by a difference in conditions, such as an age, a gender, a weight, and a type of shoes being worn. An item indicating a moving situation of a person such as the number of people passing over the sensor 1 or a passage direction and an attribute of the moving person are collectively referred to as a matter related to the person.

In the post-processed training data and the post-processed additional training data, the number of people passing is associated with the voltage waveform of the passage section for which the waveform label b is set, but an attribute of people passing may be associated in addition to the number of people passing.

For example, FIG. 67 is a diagram illustrating an example of the post-processed training data in which people passing over the sensor 1 are classified into generations of "non-elderly person" and "elderly person", and the number of people passing for each generation is associated with each passage section as correct answer data. The generation of the people passing over the sensor 1 may be visually confirmed by the person in charge of measurement, or may be determined by using artificial intelligence from an image obtained by capturing an image of the people passing over the sensor 1.

Note that there are m+1 combination patterns of the generation with respect to the number of people passing of m. For example, in the case of 2-person passage data, there are three patterns of two elderly persons and zero non-elderly persons, one elderly person and one non-elderly person, and zero elderly persons and two non-elderly persons. Thus, the estimation device 2 only needs to perform the machine learning of the learning model as a pattern classification problem.

In a case where the attribute of the person and the number of people passing are associated with the voltage waveform of each passage section for which the waveform label b is set as correct answer data, the correct answer data may be expressed by a one-hot vector.

FIG. 68 is a diagram illustrating an example of the post-processed training data in which people passing over the sensor 1 are classified depending on whether or not the weight is greater than or equal to 50 kg, and each passage section is associated with the number of people passing for each weight range as correct answer data. In a one-hot vector notation $[g_1, g_2, g_3, g_4]$ in a correct answer field of FIG. 68, the label $g_1$ represents whether or not one person having a weight of greater than or equal to 50 kg has passed, the label $g_2$ represents whether or not two persons each having a weight of greater than or equal to 50 kg have passed, the label $g_3$ represents whether or not one person having a weight of less than 50 kg has passed, and the label $g_4$ represents whether or not two persons each having a weight of less than 50 kg have passed. The labels $g_1$ to $g_4$ take binary values of "0" or "1", where "0" represents that the corresponding person has not passed, and "1" represents that the corresponding person has passed. The weight of a person passing over the sensor 1 only needs to be collected by, for example, installing a mat-type scale in a range covered with a rubber of the sensor 1.

Thus, [0, 1, 1, 0] in the correct answer field on the waveform label b=2 in FIG. 68 represents that a total of three persons, that is, two persons each having a weight of greater than or equal to 50 kg and one person having a weight of less than 50 kg pass through the sensor 1.

The estimation device 2 only needs to perform the machine learning of the learning model as a multi-label classification on the correct answer data to which two or more labels are simultaneously assigned, such as the one-hot vector.

Further, the number of people passing and two or more attributes may be set as correct answer data. FIG. 69 is a diagram illustrating an example of the post-processed training data in which correct answer data including the number of people passing and two attributes of the generation and weight range of the people is associated with each passage section.

As described above, in a case where the correct answer data includes the number of people passing over the sensor 1 and the attributes of the people passing, the CPU 21 generates new training data having different numbers of people passing and attributes in the data extension processing illustrated in FIG. 12. For example, if 1-person passage data of the elderly person and 1-person passage data of the non-elderly person are combined together, it is possible to newly generate 2-person passage data obtained in a case where a total of two persons, that is, one elderly person and one non-elderly person pass through the sensor 1. As a matter of course, also in a case where two or more attributes of the person are included in the correct answer data, it is possible to generate m-person passage data in consideration of a combination of the attributes of the person by the same idea.

Note that, the input data of the learning model in which the attribute of the person is also considered has been described with the post-processed training data as an example; however, it goes without saying that the attribute of the person is associated with the post-processed additional training data in the same manner.

Next, a description will be given of a form in which the type of shoes worn by a person passing over the sensor 1 is estimated as the attribute of the person by the estimation device 2.

Figure 70:
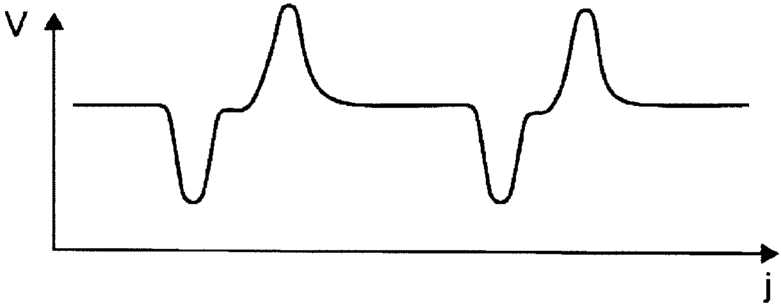
FIG. 70 is a diagram illustrating an example of a voltage waveform when a person wearing leather shoes passes over the sensor.

FIG. 70 is a diagram illustrating an example of the voltage waveform output by the sensor 1 when a person wearing shoes with hard toes such as leather shoes passes over the sensor 1. As illustrated in FIG. 70, in a case where the person passes over the sensor 1 with the leather shoes, the voltage waveforms appear in which absolute values of the amplitudes V in the extreme values of the voltage waveform swinging positive and negative are about the same as each other, and in a portion other than around the extreme value, variation in the voltage waveform is relatively smaller than the voltage waveform in a case where the person passes over the sensor 1 wearing shoes of another type other than the leather shoes illustrated in FIGS. 71 and 72 described later. In addition, every time one foot steps on the sensor 1, the voltage waveform in which one maximum value and one minimum value are combined tends to appear temporally continuously.

This is a feature seen in business shoes and leather shoes with hard toes, and it is considered that this is because it is difficult to apply force to the toes in the case of such shoes, and a change in a load generated when the heel is grounded on a ground surface is mainly reflected in the voltage waveform.

Figure 71:
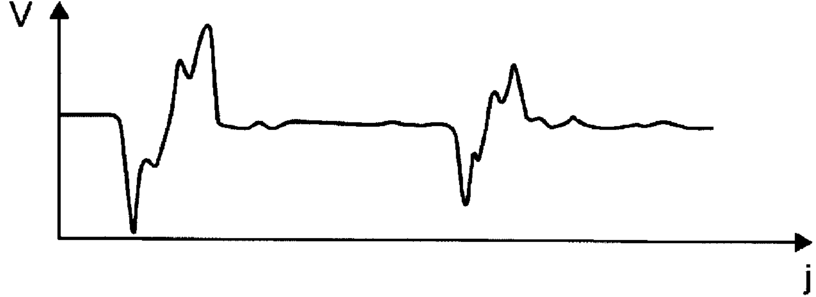
FIG. 71 is a diagram illustrating an example of a voltage waveform when a person wearing sandals passes over the sensor.

FIG. 71 is a diagram illustrating an example of the voltage waveform output by the sensor 1 when a person wearing shoes with soft toes such as sandals passes over the sensor 1. As illustrated in FIG. 71, in a case where the person passes over the sensor 1 with the sandals, the voltage waveforms appear in which the shapes of the voltage waveforms swinging in the positive direction are approximate to each other and the shapes of the voltage waveforms swinging in the negative direction are approximate to each other although the magnitudes of the amplitudes V are different from each other. In addition, after the voltage waveform swinging in the negative direction appears, the voltage waveform swinging in the positive direction in which the amplitude V changes with about the same magnitude appears temporally continuously.

It is considered that this is because a change in a load generated when the toe and the heel are grounded on a ground surface is reflected in the voltage waveform.

Figure 72:
FIG. 72 is a diagram illustrating an example of a voltage waveform when a barefoot person passes over the sensor.

FIG. 72 is a diagram illustrating an example of the voltage waveform output by the sensor 1 when a person passes over the sensor 1 barefoot. As illustrated in FIG. 72, in a case where the person passes over the sensor 1 barefoot, the voltage waveforms appear that varies more irregularly than the person passes over the sensor 1 with leather shoes or sandals. In addition, during transition of the voltage waveform from the extreme value to the amplitude V=0 or during transition of the amplitude V=0 to the extreme value, there is a tendency that a change in the amplitude V stops, the amplitude V changes in a direction opposite to the change in the voltage toward a transition destination, or a degree of change in the voltage waveform, that is, a gradient of a rise in the voltage waveform and a gradient of a fall in the voltage waveform change.

It is considered that this is because, in the case of the bare foot, grounding to a ground surface by only a specific portion does not occur in the same manner as in the case of the leather shoes or sandals, and a grounded portion changes depending on a difference in balance feeling or finger pressure of the body for each individual. Note that, in the technology of the present disclosure, the bare foot is also treated as a type of shoes.

The estimation device 2 can estimate the type of shoes worn by the person passing over the sensor 1 from the voltage waveform output by the sensor 1 by using such change in the load accompanying a grounding state to a ground surface specific to the type of shoes.

In addition, compared to women, men often wear leather shoes or business shoes. Thus, in a case where the estimation device 2 estimates that a person passing over the sensor 1 wears leather shoes or business shoes, the estimation device 2 may estimate the gender of the person passing over the sensor 1 as a male.

In addition, the magnitude of the amplitude V of the voltage waveform output by the sensor 1 tends to increase as the weight of the person passing over the sensor 1 increases. Thus, the estimation device 2 may divide the amplitude V by a first reference threshold and a second reference threshold lower than the first reference threshold, and estimate the gender of the person passing over the sensor 1 such that the person is a male if the amplitude V is greater than or equal to the first reference threshold and the person is a female if the amplitude V is less than or equal to the second reference threshold.

As already described, the sensor 1 outputs sensor data not only for stepping by a person but also for passage of a moving body moving on a ground surface such as an automobile, a two-wheeled vehicle, or a mobile robot, and passage of an animal. Thus, the estimation device 2 can estimate a traffic flow of the moving body if the sensor data output along with the passage of the moving body is used, and it is possible to use the sensor data as a study material on whether or not to perform notification of traffic congestion information or perform traffic regulation. In addition, the estimation device 2 can estimate an activity situation of the animal if the sensor data output along with the passage of the animal is used, and it is possible to estimate ecology of the animal such as the number of individuals of the animal present in a region, grasp of a habitat of the animal, and a time zone in which the animal is active.

As the features of the voltage waveform output by the sensor 1 change due to the difference in the attribute of the person, the features of the voltage waveform output by the sensor 1 also change depending on the type of the moving body, the type of the animal, and the age. Thus, the estimation device 2 can estimate the type of the moving body, the type of the animal, and further the approximate age and gender in the case of the animal from the measurement data if the learned model is used for which the machine learning is performed by using the correct answer data in which the types of the moving body and the animal moving are associated with the number of moving bodies and animals passing over the sensor 1.

Note that, in the estimation device 2 described above, the people flow and the attribute of the person are estimated by the learned model generated by the machine learning using the post-processed training data and the post-processed additional training data with which a relationship between the input and the output is associated, but the method of estimating the people flow and the attribute of the person is not limited thereto. For example, the people flow or the attribute of the person may be estimated by analyzing the voltage waveform by using a heuristic method. Specifically, the estimation device 2 may collate the post-processed measurement data with a database in which the voltage waveforms output by the sensor 1 are classified and stored for each of the number of people passing and the attributes of the person, and estimate the people flow and the attributes of the person from a degree of approximation of the features.

Although one aspect of the estimation device 2 has been described above by using the embodiment, the disclosed form of the estimation device 2 is an example, and the form of the estimation device 2 is not limited to a scope described in the embodiment. Various modifications or improvements can be made to the embodiment without departing from the gist of the present disclosure, and the modified or improved embodiment is also included in the technical scope of the disclosure. For example, the order of each of pieces of processing may be changed without departing from the gist of the present disclosure.

In addition, in the present disclosure, a form in which the learning processing and the estimation processing are implemented by software has been described as an example. However, processing equivalent to the learning processing and the estimation processing may be implemented in, for example, an application specific integrated circuit (ASIC), a field programmable gate array (FPGA), or a programmable logic device (PLD), and may be processed by hardware. In this case, the processing speed is increased as compared with a case where the learning processing and the estimation processing are implemented by software.

As described above, the CPU 21 of the estimation device 2 may be replaced with a dedicated processor specialized for specific processing, such as an ASIC, an FPGA, a PLD, a graphics processing unit (GPU), or a Floating Point Unit (FPU).

The processing of the estimation device 2 may be executed by a combination of two or more processors of the same type or different types, such as a plurality of CPUs 21 or a combination of the CPU 21 and the FPGA, in addition to a form implemented by one CPU 21. Further, the processing of the estimation device 2 may be implemented by cooperation of processors located outside a housing of the estimation device 2 and existing at physically separated places.

In addition, in the embodiment of the disclosure, the example has been described in which the estimation program is stored in the ROM 22 of the estimation device 2, but the storage destination of the estimation program is not limited to the ROM 22. The disclosed estimation program can also be provided in a form recorded in a storage medium readable by the computer 20. For example, the estimation program may be provided in a form of being recorded on an optical disk such as a compact disk read only memory (CD-ROM) or a digital versatile disk read only memory (DVD-ROM). In addition, the estimation program may be provided in a form recorded in a portable semiconductor memory such as a universal serial bus (USB) memory or a memory card. The ROM 22, the nonvolatile memory 24, the CD-ROM, the DVD-ROM, the USB, and the memory card are examples of a non-transitory storage medium.

Further, the estimation device 2 may download the estimation program from the external device through the communication unit 27, and store the downloaded estimation program in, for example, the ROM 22 or the nonvolatile memory 24. In this case, the estimation device 2 reads the estimation program downloaded from the external device and executes the learning processing and the estimation processing.

All documents, patent applications, and technical standards described in this specification are incorporated herein by reference to the same extent as in a case where a case where incorporation by reference of each document, patent application, and technical standard is specifically and individually described.

With regard to the above embodiment, the following supplementary notes are further disclosed.

(Supplementary Item 1)

An estimation device including:

a memory; and at least one processor connected to the memory, in which the processor collects sensor data representing a change in a load along a time series as a change in a voltage value from a sensor that generates a voltage when a load applied to an area changes, and estimates a matter related to a measurement target passing through a predetermined area by using sensor data collected from the sensor, which is installed in the predetermined area on a ground surface in a real space in which the measurement target moves at random timing.

(Supplementary Item 2)

An estimation device including:

a memory; and at least one processor connected to the memory, in which the processor collects sensor data representing a change in a load along a time series as a change in a voltage value from a sensor that generates a voltage when a load applied to an area changes, and estimates a gender of a person passing through a predetermined area by using sensor data collected from the sensor, which is installed in the predetermined area in a ground surface in a real space in which a measurement target moves at random timing.

(Supplementary Item 3)

A non-transitory storage medium storing a program executable by a computer to execute estimation processing, in which the estimation processing collects sensor data representing a change in a load along a time series as a change in a voltage value from a sensor that generates a voltage when a load applied to an area changes, and estimates a matter related to a measurement target passing through a predetermined area by using sensor data collected from the sensor, which is installed in the predetermined area in a ground surface in a real space in which the measurement target moves at random timing.

The invention claimed is:

1. An estimation device, comprising:

a memory; and at least one processor coupled to the memory, the at least one processor being configured to:

collect sensor data representing a change in a load along a time series as a change in a voltage value from a sensor that generates a voltage when a load applied to an area changes; and estimate a matter related to a measurement target passing through a predetermined area by using sensor data of the sensor, which is installed in the predetermined area on a ground surface in a real space in which the measurement target moves at random timing, the sensor data being collected by the at least one processor, wherein the measurement target represents a person, the estimating further comprises estimating, based on the collected sensor data, by using a learned model, the number of people who have passed through the predetermined area, and the learned model is obtained by machine learning an association between (i) a number of people who have passed through the area in which the sensor is installed and (ii) a voltage waveform indicated by the sensor data obtained in a passage section during time lapsing from when the number of people begin passing through the area in which the sensor is installed to when the number of people finish passing through the area.

2. The estimation device according to claim 1, wherein:

the measurement target is a person, and the at least one processor is configured to estimate a number of people passing through the predetermined area from the sensor data of the sensor collected by the at least one processor based on a relationship between the number of people passing through the area in which the sensor is installed and a voltage waveform indicated by the sensor data of the sensor obtained when the number of people passes through the area in which the sensor is installed.

3. The estimation device according to claim 2, wherein:

estimation of the number of people passing through the predetermined area is performed by a learned model obtained by machine learning of an association between the number of people passing through the area in which the sensor is installed and the voltage waveform indicated by the sensor data of the sensor, and the voltage waveform used for machine learning of the learned model includes a synthesized waveform obtained by synthesizing a plurality of voltage waveforms in training data in which association between a number of people passing through another area different from the predetermined area and the voltage waveform obtained by passage through the other area is performed in advance, depending on respective numbers of people passing that are able to be estimated.

4. The estimation device according to claim 3, wherein the at least one processor is configured to divide the voltage waveform into respective passage sections for people with respect to additional training data that is a combination of the number of people passing through the predetermined area and the voltage waveform obtained by passage through the predetermined area, the additional training data being collected in advance before the at least one processor estimates the number of people passing through the predetermined area; and associate the number of people passing through the predetermined area with each of the passage sections as divided by the divide operation, wherein the at least one processor is configured to estimate the number of people passing through the predetermined area from the sensor data of the sensor collected by using a learned model subjected to machine learning with, in addition to the training data, the additional training data in which the number of people passing through the predetermined area is associated with each of the passage sections.

5. The estimation device according to claim 4, wherein the at least one processor is configured to set a passage start point and a passage end point of a person passing through the predetermined area for the voltage waveform in the additional training data based on a predetermined threshold, and adjust the passage start point and the passage end point based on a waveform feature in the voltage waveform such that the passage start point and the passage end point set approach passage circumstances of a person actually passing through the predetermined area.

6. The estimation device according to claim 1, wherein the matter related to a measurement target is a gender of a person.

7. The estimation device according to claim 1, wherein the collected sensor data indicate a predetermined number of people in a predetermined age group passing through the predetermined area.

8. The estimation device according to claim 1, wherein the matter related to the measurement target is based on an age group of people.

9. An estimation method, comprising, by a computer:

a collection step of collecting sensor data representing a change in a load along a time series as a change in a voltage value from a sensor that generates a voltage when a load applied to an area changes; and an estimation step of estimating a matter related to a measurement target passing through a predetermined area by using sensor data of the sensor, which is installed in the predetermined area in a ground surface in a real space in which the measurement target moves at random timing, the sensor data being collected in the collection step, wherein the measurement target represents a person, the estimating further comprises estimating, based on the collected sensor data, by using a learned model, the number of people who have passed through the predetermined area, and the learned model is obtained by machine learning an association between (i) a number of people who have passed through the area in which the sensor is installed and (ii) a voltage waveform indicated by the sensor data obtained in a passage section during time lapsing from when the number of people begin passing through the area in which the sensor is installed to when the number of people finish passing through the area.

10. A non-transitory storage medium storing a program executable by a computer to perform estimation processing, the estimation processing comprising:

collecting sensor data representing a change in a load along a time series as a change in a voltage value from a sensor that generates a voltage when a load applied to an area changes; and estimating a matter related to a measurement target passing through a predetermined area by using sensor data collected from the sensor, which is installed in the predetermined area in a ground surface in a real space in which the measurement target moves at random timing, wherein the measurement target represents a person, the estimating further comprises estimating, based on the collected sensor data, by using a learned model, the number of people who have passed through the predetermined area, and the learned model is obtained by machine learning an association between (i) a number of people who have passed through the area in which the sensor is installed and (ii) a voltage waveform indicated by the sensor data obtained in a passage section during time lapsing from when the number of people begin passing through the area in which the sensor is installed to when the number of people finish passing through the area.

* * * * *